(12) United States Patent
Hamada et al.

(10) Patent No.: US 11,488,633 B2
(45) Date of Patent: Nov. 1, 2022

(54) PLAYBACK DEVICE

(71) Applicant: SONY GROUP CORPORATION, Tokyo (JP)

(72) Inventors: Toshiya Hamada, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/593,971

(22) PCT Filed: Mar. 30, 2020

(86) PCT No.: PCT/JP2020/014482
§ 371 (c)(1),
(2) Date: Sep. 29, 2021

(87) PCT Pub. No.: WO2020/209120
PCT Pub. Date: Oct. 15, 2020

(65) Prior Publication Data
US 2022/0165306 A1    May 26, 2022

(30) Foreign Application Priority Data

Apr. 11, 2019   (JP) .............................. JP2019-075797

(51) Int. Cl.
*H04N 5/775*   (2006.01)
*G11B 27/00*   (2006.01)
(Continued)

(52) U.S. Cl.
CPC .......... *G11B 27/005* (2013.01); *G11B 27/102* (2013.01); *H04N 19/20* (2014.11); *H04N 19/423* (2014.11); *H04N 19/597* (2014.11)

(58) Field of Classification Search
CPC .. G11B 27/005; G11B 27/102; H04N 19/423; H04N 19/597; H04N 19/20
(Continued)

(56) References Cited

FOREIGN PATENT DOCUMENTS

JP      69837868 T2  *  2/2008
JP      4277066 B2   *  6/2009
(Continued)

OTHER PUBLICATIONS

International Search Report and Written Opinion of PCT Application No. PCT/JP2020/014482, dated Jun. 23, 2020, 10 pages of ISRWO.

(Continued)

*Primary Examiner* — Robert Chevalier
(74) *Attorney, Agent, or Firm* — Chip Law Group

(57) ABSTRACT

A playback device of the present disclosure includes a processing unit and a control unit. When having acquired identification information, the control unit calculates, on a playback time axis and based on the acquired identification information, a first point-of-time on the playback time axis, the first point-of-time being a point-of-time turning back a current point-of-time on the playback time axis by a first duration-of-time satisfying a first predetermined condition, and newly sets the calculated first point-of-time in the processing unit. The processing unit generates a video in which frames from the first point-of-time are arranged in chronological order, based on at least a part of acquired 6DoF content, a position and an orientation of a set viewpoint, and the first point-of-time newly set by the control unit.

20 Claims, 29 Drawing Sheets

(51) Int. Cl.
    *H04N 19/20*    (2014.01)
    *H04N 19/423*   (2014.01)
    *H04N 19/597*   (2014.01)
    *G11B 27/10*    (2006.01)
    *H04N 5/77*     (2006.01)

(58) Field of Classification Search
    USPC .................. 386/230, 223, 224, 248, 343
    See application file for complete search history.

(56) References Cited

FOREIGN PATENT DOCUMENTS

JP    2014-071915 A    4/2014
WO    2018/199052 A1   11/2018

OTHER PUBLICATIONS

Iraj Sodagar, "White paper on MPEG-DASH Standard", International Organization for Standardisation, Organisation International De Normalisation, SO/IEC JTC1/SC29/WG11, Coding of Moving Pictures and Audio, Apr. 2012, 6 pages.

MPEG-I, "Information technology—Coded representation of immersive media—Part 5: Visual volumetric video-based coding (V3C) and video-based point cloud compression (V-PCC)", ISO/IEC 23090-5:2021, Jun. 2021, 331 pages.

"Third Working Draft for Video-based Point Cloud Coding", MPEG Contribution w17771, Ljubljana, Slovenia, Jul. 2018.

"PCC Core Experiment on Patch packing", MPEG Contribution w17871, Ljubljana, Slovenia, Jul. 2018.

\* cited by examiner

FIG.12

| SEGMENT IDENTIFICATION INFORMATION | EXTRACTION COUNT INFORMATION |
|---|---|
| s001.m4s | 000000000000000 |
| s002.m4s | 000000000000000 |
| s003.m4s | 000000000000000 |
| s004.m4s | 000000000000000 |

LEFT ←――――――――――――→ RIGHT

FIG.13

| SEGMENT IDENTIFICATION INFORMATION | EXTRACTION COUNT INFORMATION |
|---|---|
| s001.m4s | 010101010101010 |
| s002.m4s | 101010101010101 |
| s003.m4s | 010101010101010 |
| s004.m4s | 101010101010101 |

LEFT ←――――――――――――→ RIGHT

FIG.14

| SEGMENT IDENTIFICA-TION INFORMATION | EXTRACTION COUNT INFORMATION |
|---|---|
| s001.m4s | 2121212121212 |
| s002.m4s | 1212121212121 |
| s003.m4s | 2121212121212 |
| s004.m4s | 1212121212121 |

LEFT ←――――――――→ RIGHT

FIG.15

| SEGMENT IDENTIFICA-TION INFORMATION | EXTRACTION OCCURRENCE INFORMATION |
|---|---|
| s001.m4s | 0000000000000 |
| s002.m4s | 0000000000000 |
| s003.m4s | 0000000000000 |
| s004.m4s | 0000000000000 |

LEFT ←――――――――→ RIGHT

FIG.16

| SEGMENT IDENTIFICATION INFORMATION | EXTRACTION OCCURRENCE INFORMATION |
|---|---|
| s001.m4s | 010101010101010 |
| s002.m4s | 101010101010101 |
| s003.m4s | 010101010101010 |
| s004.m4s | 101010101010101 |

LEFT ⇐===================================⇒ RIGHT

FIG.17

| SEGMENT IDENTIFICATION INFORMATION | EXTRACTION OCCURRENCE INFORMATION |
|---|---|
| s001.m4s | 212121212121212 |
| s002.m4s | 121212121212121 |
| s003.m4s | 212121212121212 |
| s004.m4s | 121212121212121 |

LEFT ⇐===================================⇒ RIGHT

SEGMENT FILE OF SECOND BITRATE + DIFFERENCE FILE = SEGMENT FILE OF FIRST BITRATE

| SEGMENT IDENTIFICATION INFORMATION | TRANSFER COUNT INFORMATION |
|---|---|
| s001.m4s | 2 |
| s002.m4s | 1 |
| s003.m4s | 1 |
| s004.m4s | 0 | ns
PLAYBACK DEVICE

CROSS REFERENCE TO RELATED APPLICATIONS

This application is a U.S. National Phase of International Patent Application No. PCT/JP2020/014482 filed on Mar. 30, 2020, which claims priority benefit of Japanese Patent Application No. JP 2019-075797 filed in the Japan Patent Office on Apr. 11, 2019. Each of the above-referenced applications is hereby incorporated herein by reference in its entirety.

FIELD

The present disclosure relates to a playback device.

BACKGROUND

There is a known content distribution technology using HyperText Transfer Protocol (HTTP), referred to as Moving Picture Experts Group-Dynamic Adaptive Streaming over HTTP (MPEG-DASH) (refer to Non Patent Literature 1).

A playback device that plays content distributed by a content distribution technology using MPEG-DASH acquires streaming data based on a metafile referred to as media presentation description (MPD) and an address of media data. The media data represents chunks of data such as audio, video, subtitles, and the like. The playback device plays the acquired streaming data.

In addition, content distributed by the content distribution technology using MPEG-DASH includes content that is known to display an inner space of a three-dimensional virtual space and give a user a virtual reality experience. In a case where such content is distributed as streaming data, data of a virtual object arranged in the three-dimensional virtual space is often compressed in distribution.

The methods for compressing data of a virtual object includes a known method of compressing a Point Cloud, which is a set of points having position information and attribute information (for example, color information) in a three-dimensional virtual space (refer to Non Patent Literature 2).

In addition, methods of compressing virtual object data include a known compression method in which Point Cloud is divided into a plurality of segments, planar projection is performed for each of the segments to generate a texture image, a geometry image, an occupancy map image, and auxiliary information, and then these three types of generated images are encoded by a video codec (refer to Non Patent Literature 3). Here, the number of projection planes in the case of generating these three types of images is six (four planes in the horizontal direction and two planes in the vertical direction). However, in a case where the number of projection planes is six in the compression method, there are many points that can be lost in conversion from the three-dimensional data to a two-dimensional image, leading to occurrence of holes on a surface of the reconstructed Point Cloud.

To handle this, there is a discussion about applying, to MPEG, a technique of adding four projection planes to increase the number of projection planes to the total of 10 (eight planes in the horizontal direction and two planes in the vertical direction) (refer to Non Patent Literature 4).

With application of the compression method of compressing the virtual object data, the content distribution technology using MPEG-DASH will enable execution of content streaming giving a user virtual reality experience with higher comfort.

CITATION LIST

Non Patent Literature

Non Patent Literature 1: MPEG-DASH (Dynamic Adaptive Streaming over HTTP) (URL: http://mpeg.chiariglion-e.org/standards/mpeg-dash/media-presentation-description-and-segment-formats/text-isoiec-23009-12012-dam-1

Non Patent Literature 2: MPEG-I Part 5 Point Cloud Compression (ISO/IEC 23090-5)

Non Patent Literature 3: MPEG Contribution w17771, Third Working Draft for Video-based Point Cloud Coding, July 2018, Ljubljana, Slovenia Non Patent Literature 4: MPEG Contribution w17871, PCC Core Experiment on Patch packing, July 2018, Ljubljana, Slovenia

SUMMARY

Technical Problem

Here, examples of content that gives the user a virtual reality experience include known six degrees of freedom (6DoF) content. In the 6DoF content, the user can change the position and orientation of the viewpoint in a three-dimensional virtual space via a playback device adapted to play 6DoF content. A region in the three-dimensional virtual space displayed on a display or the like by the playback device is a region included in a viewing angle associated with the viewpoint when the inside of the three-dimensional virtual space is viewed from the position of the viewpoint in a direction according to the orientation of the viewpoint. Therefore, the user can view the inside of the three-dimensional virtual space from a desired position within the three-dimensional virtual space in a desired direction in the three-dimensional virtual space through the display or the like.

The state in the three-dimensional virtual space represented by the 6DoF content (for example, the position, orientation, and the like of the virtual object arranged in the three-dimensional virtual space) changes in synchronization with a point-of-time on a time axis associated with the 6DoF content. The time on the time axis represents the playback time of the 6DoF content. Since the state in the three-dimensional virtual space represented by the 6DoF content changes with the lapse of the playback time, the user can view the temporal change of the virtual object arranged in the three-dimensional virtual space from a position desired by the user in a direction desired by the user.

However, in a case where the user intends to view a certain scene in a three-dimensional virtual space, the state of the three-dimensional virtual space might change while the user is altering the position and orientation of the viewpoint in the three-dimensional virtual space, which would cause the user to miss the scene the user intends to view. Such missing of a scene is likely to occur when six-dimensional content is played at a high speed.

The present disclosure has been made in view of such a situation, and aims to suppress the user's missing of a scene desired by the user while viewing 6DoF content.

Solution to Problem

According to the present disclosure, a playback device is provided that performs playback of six degrees of freedom (6DoF) content according to a received operation, wherein the 6DoF content is information representing each of: a three-dimensional virtual space whose state changes in synchronization with a change in point-of-time on an associated playback time axis; and a virtual object arranged in the three-dimensional virtual space, wherein the playback device includes: a processing unit that generates a video in which frames from the point-of-time that has been set are arranged in chronological order based on at least a part of the acquired 6DoF content, based on a set position and orientation, that is, a position and orientation of a viewpoint in the three-dimensional virtual space, and based on the set point-of-time; and a control unit that sets the point-of-time in the processing unit according to the received operation, extracts the frame generated by the processing unit according to a set playback speed, and displays the extracted frames on a display unit in chronological order, wherein the control unit, when having acquired identification information, calculates a first point-of-time obtained by turning back a time from a current point-of-time for a first duration-of-time satisfying a first predetermined condition on the playback time axis based on the acquired identification information, and newly sets the calculated first point-of-time in the processing unit, and the processing unit generates a video in which the frames from the first point-of-time are arranged in chronological order based on at least a part of the acquired 6DoF content, the set position and orientation of the viewpoint, and the first point-of-time newly set by the control unit.

The playback speed is able to be a high playback speed obtained by multiplying a normal playback speed by a factor received from a user.

When having received position and orientation information indicating a position and orientation of the viewpoint, the control unit is able to further perform a viewpoint alteration process of setting the position and orientation of the viewpoint indicated by the received position and orientation information in the processing unit.

The control unit is able not to perform the viewpoint alteration process when having not received the position and orientation information indicating the position and orientation of the viewpoint.

When having acquired the identification information, the control unit is able to repeatedly perform: calculating the first point-of-time every time a second duration-of-time satisfying a second predetermined condition elapses on the playback time axis within a target period corresponding to the identification information in a period on the playback time axis; and newly setting the calculated first point-of-time in the processing unit.

The first duration-of-time is able to be shorter than the second duration-of-time.

The target period is able to be a period from a point-of-time at which the 6DoF content starts to a point-of-time at which the 6DoF content ends on the playback time axis.

The target period is able to be a part of a period from a point-of-time at which the 6DoF content starts to a point-of-time at which the 6DoF content ends on the playback time axis.

When having acquired the identification information, the control unit is able to newly set the first point-of-time in the processing unit after a third duration-of-time satisfying a third predetermined condition has elapsed from a third point-of-time of acquisition of the identification information on the playback time axis.

The 6DoF content is divided into files representing each of the three-dimensional virtual space and the object according to each of a plurality of time zones in a case where a time on the playback time axis is divided into the plurality of time zones, and the processing unit is able to include: a file selection control unit that selects, in chronological order, the files arranged in chronological order from the set point-of-time; and an image processing unit that generates a video in which the frames according to the files are arranged in chronological order for each of the files selected in chronological order by the file selection control unit, based on the files, the set position and orientation of the viewpoint, and the set point-of-time, and the third predetermined condition is a condition that the third duration-of-time is a duration-of-time between: a point-of-time associated with the frame located at a boundary between the file corresponding to the frame associated with the third point-of-time and the next file arranged in chronological order: and the third point-of-time.

The 6DoF content is divided into files representing each of the three-dimensional virtual space and the object according to each of a plurality of time zones in a case where a time on the playback time axis is divided into the plurality of time zones, and the processing unit is able to include: a file selection control unit that selects, in chronological order, the files arranged in chronological order from the set point-of-time; and an image processing unit that generates a video in which the frames according to the files are arranged in chronological order for each of the files selected in chronological order by the file selection control unit, based on the files, the set position and orientation of the viewpoint, and the set point-of-time.

The image processing unit is able to acquire the file selected by the file selection control unit by a method according to a playback quality indicated by playback quality information that has been set.

The image processing unit includes a buffer that stores the acquired file and holds the file before the frame is generated by the image processing unit as well as one or more files after the frame has been generated by the image processing unit, and in a case where the playback quality information indicating that a response speed is prioritized over a playback quality of the video has been set, and after the first point-of-time is newly set by the control unit, wherein the image processing unit is able to generate a video in which the frames from the first point-of-time are arranged in chronological order based on the files stored in the buffer.

The control unit is able to delete the file satisfying a predetermined deletion condition from the buffer among one or more of the files held in the buffer.

A distribution server stores the plurality of files for each of the two or more pieces of the 6DoF content having mutually different bitrates, and in a case where the playback quality information indicating that the quality of the video is prioritized over a response speed has been set and after the first point-of-time is newly set by the control unit, the image processing unit is able to acquire, from the distribution server in chronological order, the files of a bitrate according to the set position and orientation of the viewpoint and the position and orientation of one or more of the objects in the three-dimensional virtual space among the files selected by the file selection control unit, and then generate, for each of the acquired files, a video in which the frames according to the files are arranged in chronological order, based on the file, the set position and orientation of the viewpoint, and the set point-of-time.

The playback speed is a high playback speed obtained by multiplying a normal playback speed by a factor received from a user, and the control unit is able to extract the frames generated by the processing unit at intervals corresponding to the set playback speed, and displays the extracted frames on the display unit in chronological order, and in a case where the first point-of-time is newly set, wherein the control unit is able to preferentially extract the frames having a small number of times of extraction among the frames generated by the processing unit, and performs control to display the extracted frames on the display unit in chronological order.

The control unit is able to perform control to store, in a storage unit, history information indicating a latest history of the position and orientation of the viewpoint among the position and orientation of the viewpoint set in the processing unit at each point-of-time on the playback time axis, and set, at second or subsequent playback of the 6DoF content, the position and orientation of the viewpoint in the processing unit at each point-of-time on the playback time axis based on the history information stored in the storage unit.

The playback speed is a high playback speed obtained by multiplying a normal playback speed by a factor received from a user, wherein the 6DoF content is also information indicating a sound that changes in synchronization with a change in point-of-time on the playback time axis, the sound is a sound at each position in the three-dimensional virtual space, the processing unit is able to generate audio data in which audio waveforms from the set point-of-time are arranged in chronological order based on at least a part of the acquired 6DoF content, the set position and orientation of the viewpoint, and the set point-of-time, and the control unit is able to perform control to output the audio data generated by the processing unit from an audio output unit at the normal playback speed.

The identification information is able to be information identifying that at least one of the position of the viewpoint and the orientation of the viewpoint has changed.

The identification information is able to be information indicating at least one of each of one or more predetermined points-of-time on the playback time axis and each of one or more predetermined periods on the playback time axis, and is information associated with the 6DoF content.

BRIEF DESCRIPTION OF DRAWINGS

FIG. 12 is a diagram illustrating an example of Management table 1-1.

FIG. 13 is a diagram illustrating another example of Management table 1-1.

FIG. 14 is a diagram illustrating still another example of Management table 1-1.

FIG. 15 is a diagram illustrating an example of Management table 1-2.

FIG. 16 is a diagram illustrating another example of Management table 1-2.

FIG. 17 is a diagram illustrating still another example of Management table 1-2

DESCRIPTION OF EMBODIMENTS

Embodiments

Figure 1:
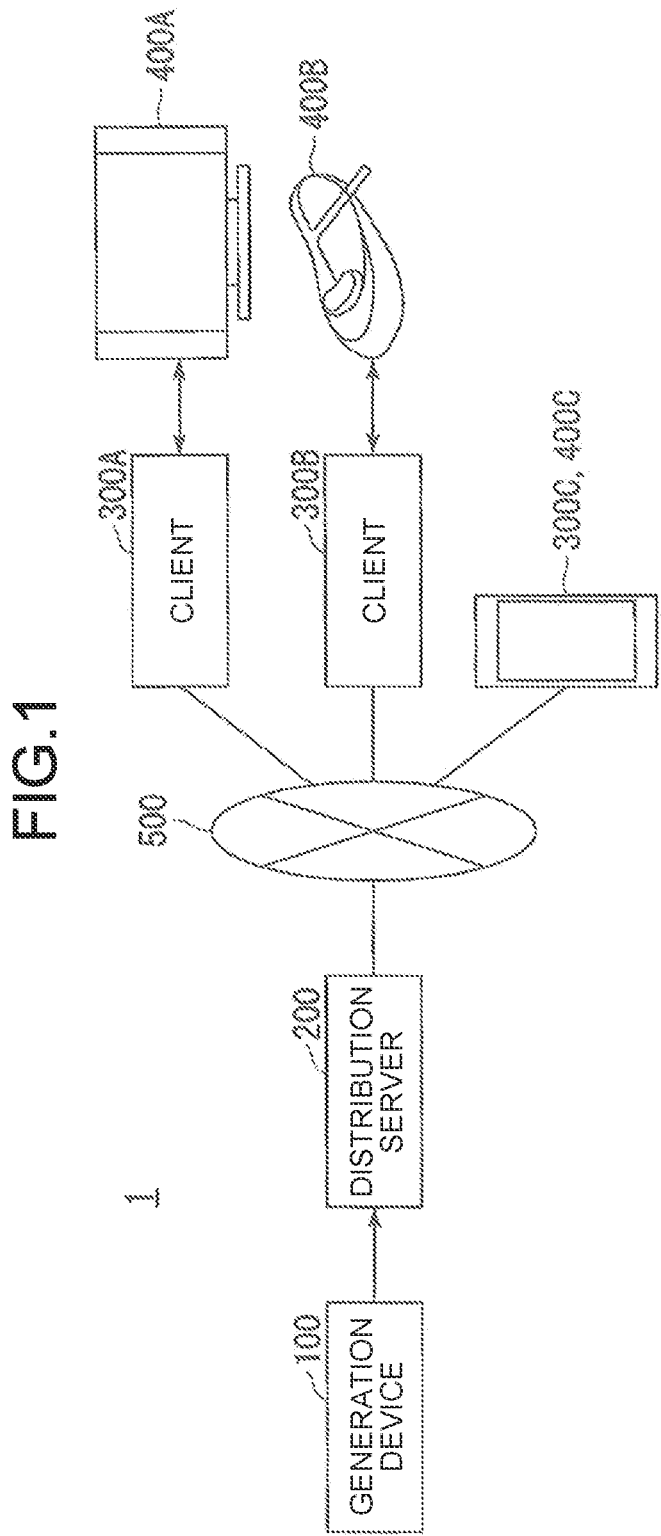
FIG. 1 is a diagram illustrating an example of a configuration of a playback system 1 according to an embodiment of the present disclosure.

Hereinafter, embodiments of the present disclosure will be described with reference to the drawings.

<Outline of Playback Device>

First, an outline of a playback device according to an embodiment of the present disclosure will be described.

The playback device plays six degrees of freedom (6DoF) content as content that gives a user a virtual reality experience. More specifically, the playback device plays 6DoF content corresponding to a received operation as the target content.

Here, the 6DoF content is information representing a three-dimensional virtual space whose state changes in synchronization with a change in a point-of-time on the playback time axis. Furthermore, the 6DoF content is also information indicating an object whose state changes in synchronization with a change in the point-of-time on the playback time axis. Furthermore, the 6DoF content is also information indicating a sound that changes in synchronization with a change in point-of-time on the playback time axis. Here, the playback time axis is a time axis associated with 6DoF content. The object is a virtual object arranged in a three-dimensional virtual space. Note that the sound represented by the 6DoF content is a sound at each position in the three-dimensional virtual space, and is characterized by the pitch of the sound, the tone of the sound, the loudness of the sound, and the like.

Hereinafter, for convenience of description, the three-dimensional virtual space represented by the target content will be simply referred to as a three-dimensional virtual space. In the present embodiment, when simply referred to as a point-of-time, it means a point-of-time on the playback time axis. Further, hereinafter, for convenience of description, the state of an object might be referred to as a state in a three-dimensional virtual space.

Furthermore, a playback device includes a processing unit and a control unit.

The processing unit generates a video in which frames from a set point-of-time are arranged in chronological order based on at least a part of acquired target content, set position and orientation of the viewpoint, and a set point-of-time. Furthermore, the processing unit generates audio data in which audio waveforms from the set point-of-time are arranged in chronological order based on the acquired target content, the set position and orientation of the viewpoint, and the set point-of-time.

The control unit sets a point-of-time in the processing unit according to the received operation. Furthermore, the control unit extracts the frame generated by the processing unit according to the set playback speed. The control unit performs control to display the extracted frames on the display unit in chronological order.

Furthermore, the control unit performs a viewpoint alteration process. The viewpoint alteration process is a process of setting the position and orientation of the viewpoint indicated by received position and orientation information in the processing unit when the position and orientation information indicating the position and orientation of the viewpoint has been received. Here, the viewpoint represents a virtual camera that captures a video in a three-dimensional virtual space. The position of the viewpoint indicates the position of the camera in the three-dimensional virtual space. The orientation of the viewpoint indicates an optical axis direction of the camera (line-of-sight direction when compared to a human eye) in the three-dimensional virtual space.

Furthermore, the control unit performs control to output audio data generated by the processing unit from the audio output unit.

The playback device performs control to display a video of the target content on the display unit by the processing unit and the control unit. Therefore, regarding the target content, the user can change the position and orientation of the viewpoint via the playback device. Furthermore, the region in the three-dimensional virtual space displayed on the display unit as a video by the playback device is a region included in the viewing angle associated with the viewpoint when the three-dimensional virtual space is viewed from the position of the viewpoint in the direction according to the orientation of the viewpoint. Therefore, the user can view the inside of the three-dimensional virtual space from a desired position within the three-dimensional virtual space in a desired direction in the three-dimensional virtual space through the display unit. Note that the viewing angle is an angle of view of the virtual camera described above.

Furthermore, the state inside the three-dimensional virtual space (for example, the position, orientation, and the like of the object) changes in synchronization with the point-of-time on the playback time axis as described above. Therefore, the user can view the temporal change of the object in the three-dimensional virtual space from the position desired by the user in the direction desired by the user.

However, it is sometimes difficult for the user to move the position and orientation of the viewpoint to the desired position and orientation according to the temporal change of the object in the three-dimensional virtual space. This is because operation of altering the position and orientation of the viewpoint in the three-dimensional virtual space might be complicated. As a result, the state in the three-dimensional virtual space might change while the user is altering the position and orientation of the viewpoint in the three-dimensional virtual space. For this reason, the user might miss a scene that the user intends to view while the user is altering the position and orientation of the viewpoint in the three-dimensional virtual space. Such missing of a scene cannot happen as long as the user is viewing a two-dimensional image (that is, an image in which the position and orientation of the viewpoint are always fixed). In other words, such missing of a scene can be considered as a phenomenon specific to 6DoF content. In addition, there is a high possibility that such missing of a scene occurs when a video of the target content is displayed at a speed higher than usual. Furthermore, in a case where such missing of a scene occurs, the user needs to rewind the playback time of the target content to be turned back to the point-of-time desired by the user and restart viewing of the scene the user wants to view from the viewpoint desired by the user. As a result, the viewing time of the user could increase even when the video of the target content is displayed at a speed higher than usual.

Therefore, in the playback device according to an embodiment of the present disclosure, when the control unit has acquired identification information, the control unit calculates a first point-of-time obtained by turning back the time from the current point-of-time by a first duration-of-time satisfying a first predetermined condition on the playback time axis based on the acquired identification information. The control unit newly sets the calculated first point-of-time in the processing unit. Next, the processing unit generates a video in which frames from the first point-of-time are arranged in chronological order based on at least a part of the acquired target content, the set position and orientation of the viewpoint, and the first point-of-time newly set by the control unit. With this configuration, the playback device can suppress a situation in which the user misses a scene desired by the user while suppressing an increase in viewing time in viewing the target content.

Hereinafter, a configuration of a playback system including a client as an example of such a playback device, a configuration of the client, and processing performed by the client will be individually described in detail. Hereinafter, for convenience of description, 6DoF content will be simply referred to as content. Furthermore, in the following description, for convenience of description, displaying a video of content will sometimes be referred to as playing or playback of content.

<Configuration of Playback System>

First, a configuration of a playback system 1 according to an embodiment will be described with reference to FIG. 1.

FIG. 1 is a diagram illustrating an example of a configuration of a playback system 1 according to an embodiment of the present disclosure. The playback system 1 is an example of the above-described playback system. The playback system 1 is a system that performs streaming distribution of content. For example, the playback system 1 may be configured to perform streaming distribution according to MPEG-DASH defined in ISO/IEC 23009-1, or may be configured to perform streaming distribution of content according to other standards. As illustrated in FIG. 1, the playback system according to the embodiment includes a generation device 100, a distribution server 200, a client 300, and an output device 400. In the playback system 1, the distribution server 200 is communicably connected to the client 300 via a communication network 500.

The generation device 100 is an information processing device. The generation device 100 generates a content file and a metadata file compliant with streaming distribution by MPEG-DASH. Note that the generation device 100 may be used for content creation (position determination of an audio object). Furthermore, the generation device 100 may be configured to receive an image signal, an audio signal, position information of an audio object, and the like from another content creation device. The functional configuration of the generation device 100 will be described below.

The distribution server 200 is an information processing device. The distribution server 200 functions as an HTTP server. The distribution server 200 performs streaming distribution based on MPEG-DASH. For example, the distribution server 200 performs streaming distribution of the content file and the metadata file generated by the generation device 100 to the client 300 based on MPEG-DASH. The functional configuration of the distribution server 200 will be described below.

The client 300 is an example of the above-described playback device (that is, an example of the client described above). The client 300 is an information processing device. The client 300 receives the content file and the metadata file generated by the generation device 100 from the distribution server 200. The client 300 performs playback of the received content file based on the received metadata file. FIG. 1 illustrates a client 300A connected to an installation type output device 400A as an example of the client 300. Furthermore, FIG. 1 illustrates a client 300B connected to an output device 400B worn by the user as the example. Furthermore, FIG. 1 illustrates a client 300C, which is a terminal also having a function as an output device 400C, as an example. The functional configuration of the client 300 will be described below.

The output device 400 is an example of the above-described display unit. The output device 400 is a device that displays an image and performs audio output under the playback control of the client 300. FIG. 1 illustrates the installation type output device 400A as an example of the output device 400. Furthermore, FIG. 1 illustrates the output device 400B worn by the user as the example. Furthermore, FIG. 1 illustrates, as the example, the output device 400C that is a terminal also having a function as the client 300C.

In the example illustrated in FIG. 1, the output device 400A is a television. The output device 400A may have a configuration capable of receiving an operation such as zoom or rotation from the user via a controller or the like connected to the output device 400A. In this case, the output device 400A transmits information of the operation performed by the user to the client 300A. Note that the output device 400A may be another installation type output device instead of the television.

Furthermore, in the example illustrated in FIG. 1, the output device 400B is a head mounted display (HMD) worn on the head of the user. In this case, the output device 400B includes a sensor for acquiring information indicating the position, orientation (direction), and the like of the head of the user wearing the device. In addition, the output device 400B transmits the information acquired by the sensor to the client 300B. Note that the output device 400B may be another output device that can be worn by the user.

In the example illustrated in FIG. 1, the output device 400C is a smartphone. In this case, the output device 400C includes a sensor for acquiring information indicating the position, orientation (direction), and the like in a case where the user holds and moves the output device 400C in the hand. Note that the output device 400C may be another portable display terminal such as a tablet personal computer (PC) instead of the smartphone.

The configuration of the playback system 1 according to the embodiment has been described above. Note that the above configuration described with reference to FIG. 1 is merely an example. Therefore, the configuration of the playback system 1 according to the embodiment is not limited to the above configuration. For example, part of the functions of the generation device 100 may be provided in the distribution server 200, another external device, or the like. The configuration of the playback system 1 according to the embodiment may be flexibly modified according to specifications, operation, and the like.

<Functional Configuration of Generation Device>

Figure 2:
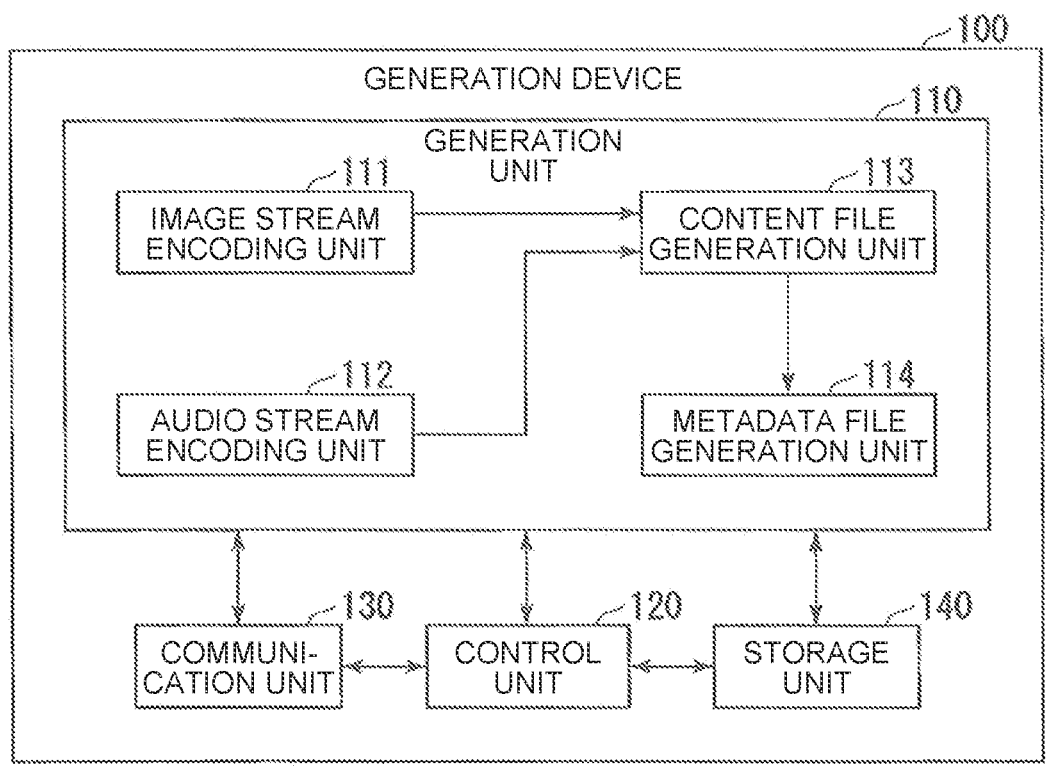
FIG. 2 is a diagram illustrating an example of a functional configuration of a generation device 100.

Hereinafter, a functional configuration of the generation device 100 will be described with reference to FIG. 2. FIG. 2 is a diagram illustrating an example of a functional configuration of the generation device 100. As illustrated in FIG. 2, the generation device 100 includes a generation unit 110, a control unit 120, a communication unit 130, and a storage unit 140.

The generation unit 110 performs processes related to an image and audio. The generation unit 110 generates a content file and a metadata file. As illustrated in FIG. 2, the generation unit 110 includes an image stream encoding unit 111, an audio stream encoding unit 112, a content file generation unit 113, and a metadata file generation unit 114.

The image stream encoding unit 111 acquires an image signal and a parameter at the time of shooting (for example, the shooting related information) from another device via the communication unit 130 (alternatively, from the storage unit 140 of the generation device 100), for example. The image stream encoding unit 111 performs an encoding process on the acquired image signal based on the parameter to generate an image stream. The image stream encoding unit 111 outputs the generated image stream to the content file generation unit 113. Note that the image stream encoding unit 111 may be configured to output other information to the content file generation unit 113 together with the image stream.

The audio stream encoding unit 112 acquires an object audio signal and position information of each object audio from another device via the communication unit 130 (alternatively, from the storage unit 140 of the generation device 100). The audio stream encoding unit 112 performs an encoding process on the acquired object audio signal based on the acquired position information to generate an audio stream. The audio stream encoding unit 112 outputs the generated audio stream to the content file generation unit 113. Note that the audio stream encoding unit 112 may be configured to output other information to the content file generation unit 113 together with the audio stream.

The content file generation unit 113 generates a content file based on the information (image stream and audio stream) acquired from the image stream encoding unit 111 and the audio stream encoding unit 112, respectively. The content file generated by the content file generation unit 113 is an MP4 file, for example. The content file may be a content file based on other standards instead of the MP4 file. Hereinafter, a case where the content file generation unit 113 generates an MP4 file will be described as an example. In the present specification, an MP4 file is an ISO Base Media File Format (ISOBMFF) file defined in ISO/IEC 14496-12 standard. Furthermore, in this specification, an MP4 file is a segment file which is data of a unit distributable by MPEG-DASH.

The content file generation unit 113 outputs the generated segment file to the communication unit 130 and the metadata file generation unit 114.

The metadata file generation unit 114 generates the above-described metadata file based on the segment file generated by the content file generation unit 113. Note that, in the present specification, the metadata file generated by the metadata file generation unit 114 is a Media Presentation Description (MPD) file defined in ISO/IEC 23009-1 standard.

The metadata file generation unit 114 outputs a generated MPD file to the communication unit 130.

The control unit 120 comprehensively controls overall processes performed by the generation device 100. Note that the control content of the control unit 120 is not particularly limited. For example, the control unit 120 may control processes generally performed in a general-purpose computer, a PC, a tablet PC, or the like.

The communication unit 130 performs various types of communication with the distribution server 200. For example, the communication unit 130 transmits the segment file and the MPD file generated by the generation unit 110 to the distribution server 200. Note that the communication content of the communication unit 130 is not limited to these.

The storage unit 140 stores various types of information. For example, the storage unit 140 stores an image signal, an audio object signal, a segment file, an MPD file, and the like.

Furthermore, for example, the storage unit 140 stores programs, parameters, or the like used by each functional configuration of the generation device 100. Note that the information to be stored in the storage unit 140 is not limited to these.

<Functional Configuration of Image Stream Encoding Unit>

Figure 3:
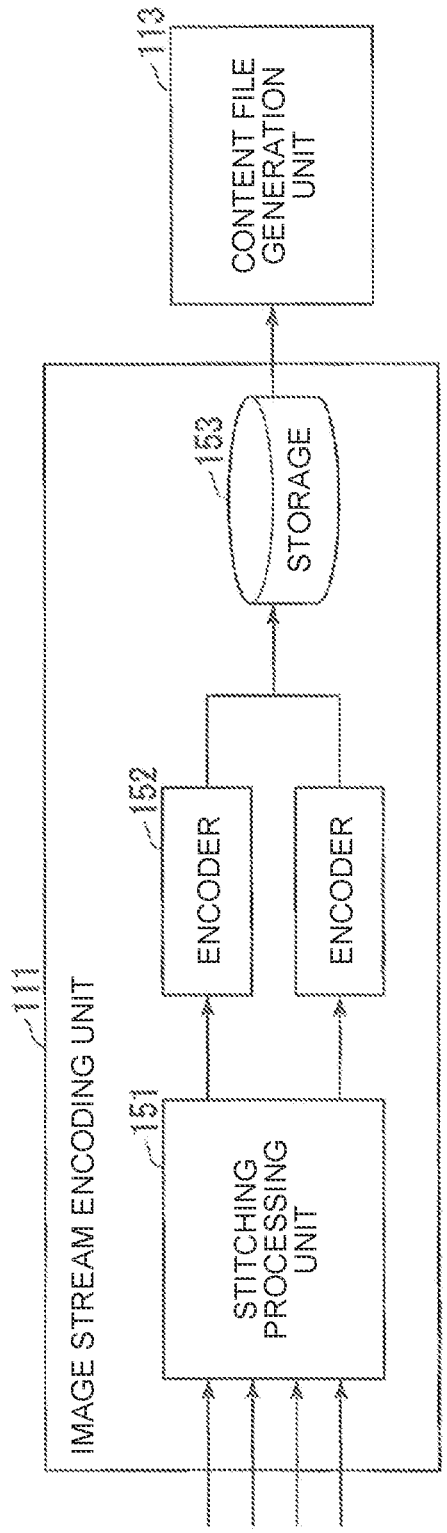
FIG. 3 is a diagram illustrating an example of a functional configuration of an image stream encoding unit 111.

Hereinafter, a functional configuration of the image stream encoding unit 111 will be described with reference to FIG. 3. FIG. 3 is a diagram illustrating an example of a functional configuration of the image stream encoding unit 111. As illustrated in FIG. 3, the image stream encoding unit 111 includes a stitching processing unit 151, an encoder 152, and storage 153.

The stitching processing unit 151 generates, by stitching, a full panoramic image of a subject captured from multiple directions by a multiple cameras (not illustrated) as object video data. Here, the processes performed by the stitching processing unit 151 will be described using an exemplary case where a certain object A is imaged from multiple directions by the multiple cameras. In this case, each of the multiple cameras outputs, to the stitching processing unit 151, each of captured images obtained by imaging the object A from individual directions among the multiple directions. The stitching processing unit 151 acquires a plurality of captured images of the object A (that is, captured images in which the object A are captured from multiple directions) from the multiple cameras. The stitching processing unit 151 equalizes the color tone and brightness of the plurality of acquired captured images, and connects the plurality of captured images to be a full panoramic image as object video data. The stitching processing unit 151 outputs the generated object video data to the encoder 152.

Bitrate setting is performed on the encoder 152. Furthermore, the encoder 152 acquires the object video data from the stitching processing unit 151. The encoder 152 performs compression encoding of the acquired object video data, and generates an encoded stream of a set bitrate as the above-described image stream. The encoder 152 can generate a high bitrate (high quality) image stream or a low bitrate (low quality) image stream according to the high/low level of the set bitrate. The encoder 152 performs control to store the generated image stream in the storage 153.

The storage 153 stores the image stream supplied from the encoder 152. The image stream stored in the storage 153 is transferred to the content file generation unit 113, and is converted into a segment file for each image stream (that is, converted into segment files).

Note that, in a case where image streams of a plurality of pieces of object video data are generated in the generation unit 110, it is allowable to configure the image stream encoding units 111 in parallel corresponding to the number of pieces of object video data, or configure one image stream encoding unit 111 to operate at a high speed. In a case where one image stream encoding unit 111 operates at a high speed, a plurality of pieces of object video data is sequentially input to the image stream encoding unit 111 in time division. Subsequently, the image stream encoding unit 111 sequentially generates an image stream for each of the pieces of object video data sequentially input.

<Functional Configuration of Distribution Server>

Figure 4:
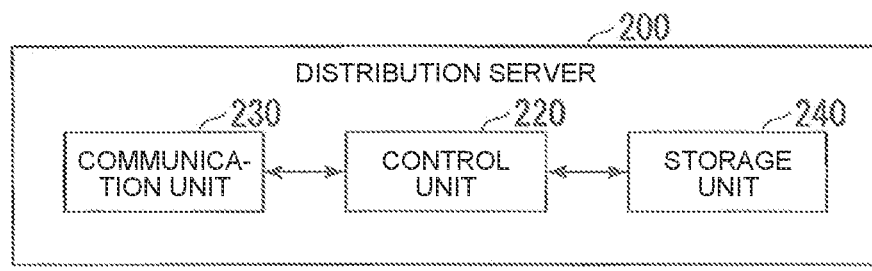
FIG. 4 is a diagram illustrating an example of a functional configuration of a distribution server 200.

Hereinafter, a functional configuration of the distribution server 200 will be described with reference to FIG. 4. FIG. 4 is a diagram illustrating an example of a functional configuration of the distribution server 200. As illustrated in FIG. 4, the distribution server 200 includes a control unit 220, a communication unit 230, and a storage unit 240.

The control unit 220 comprehensively controls overall processes performed by the distribution server 200. The control unit 220 performs control related to streaming distribution by MPEG-DASH. For example, the control unit 220 causes the communication unit 230 to transmit various types of information stored in the storage unit 240 to the client 300 based on request information and the like from the client 300 received via the communication unit 230. Note that the process to be controlled by the control unit 220 is not particularly limited. For example, the control unit 220 may control processes generally performed in a general-purpose computer, a PC, a tablet PC, or the like.

The communication unit 230 performs various types of communication with the distribution server 200. Furthermore, the communication unit 230 performs various types of communication with the client 300. For example, the communication unit 230 receives a segment file and an MPD file from the distribution server 200. In addition, under the control of the control unit 220, the communication unit 230 transmits the segment file, the MPD file, and the like according to the request information received from the client 300 to the client 300. Note that the communication performed by the communication unit 230 is not limited thereto.

The storage unit 240 stores various types of information. For example, the storage unit 240 stores the segment file, the MPD file, and the like received from the generation device 100. In addition, the storage unit 240 stores programs, parameters, and the like used by each functional configuration of the distribution server 200. Note that the information stored in the storage unit 240 is not limited to such an example.

<Functional Configuration of Client>

Figure 5:
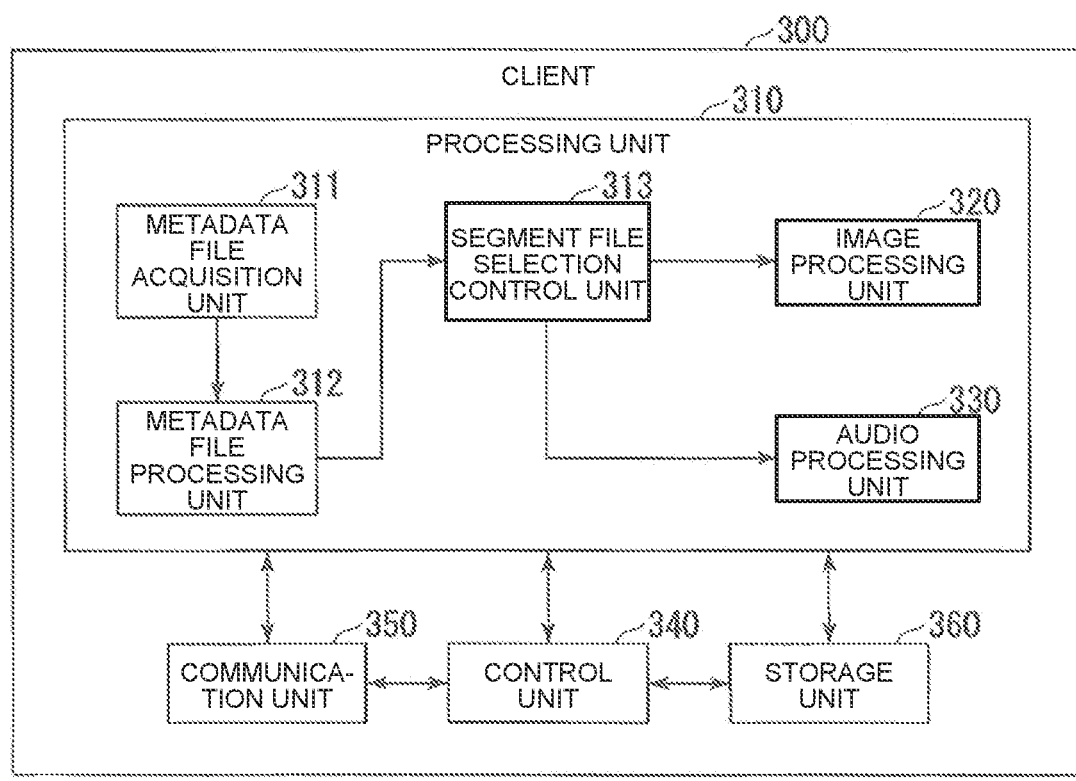
FIG. 5 is a diagram illustrating an example of a functional configuration of a client 300.

Hereinafter, a functional configuration of the client 300 will be described with reference to FIG. 5. FIG. 5 is a diagram illustrating an example of a functional configuration of a client 300. As illustrated in FIG. 5, the client 300 includes a processing unit 310, a control unit 340, a communication unit 350, and a storage unit 360.

The processing unit 310 is an example of the above-described processing unit. The processing unit 310 performs processes related to playback of content. The processing unit 310 further includes a metadata file acquisition unit 311, a metadata file processing unit 312, a segment file selection control unit 313, an image processing unit 320, and an audio processing unit 330.

The metadata file acquisition unit 311 acquires the MPD file (metadata file) from the distribution server 200 prior to the playback of the content. More specifically, the metadata file acquisition unit 311 generates the request information regarding the MPD file based on the operation or the like received from the user. The metadata file acquisition unit 311 causes the communication unit 350 to transmit the generated request information to the distribution server 200. The metadata file acquisition unit 311 acquires the MPD file from the distribution server 200 as a response to the transmission of the request information to the distribution server 200. The metadata file acquisition unit 311 outputs the acquired MPD file to the metadata file processing unit 312.

The metadata file processing unit 312 acquires the MPD file from the metadata file acquisition unit 311. The metadata file processing unit 312 performs processes related to the acquired MPD file. More specifically, based on an analysis of the MPD file, the metadata file processing unit 312 specifies information (for example, a Uniform Resource Locator (URL) and the like) necessary for acquiring the segment file and the like. The metadata file processing unit 312 outputs the specified information to the segment file selection control unit 313.

The segment file selection control unit 313 selects, in chronological order, files arranged in chronological order from a point-of-time set by the control unit 340 described below, as segment files to be acquired. More specifically, the segment file selection control unit 313 acquires information necessary for acquiring the segment file and the like (that is, information indicating the segment file to be acquired) from the metadata file processing unit 312. The segment file selection control unit 313 selects, in chronological order, segment files to be acquired based on the acquired information and the point-of-time. Furthermore, the segment file selection control unit 313 selects, in chronological order, the segment file to be acquired based on the information regarding the operation received from the user via the output device 400, information indicating the position and orientation of the user detected by the sensor, an instruction from the control unit 340 that has acquired the information indicating the position and orientation of the output device 400, and the like.

The image processing unit 320 acquires, in chronological order, the segment files selected by the segment file selection control unit 313. For each of the acquired segment files, the image processing unit 320 performs image processing based on the segment file, the set position and orientation of the viewpoint, and the point-of-time set by the control unit 340 to be described below, and generates a video in which frames corresponding to the segment files are arranged in chronological order.

The audio processing unit 330 acquires the segment file selected by the segment file selection control unit 313 and generates audio data to be described below.

The control unit 340 comprehensively controls overall processes performed by the client 300. For example, the control unit 340 controls various processes based on an input performed by the user using an input unit (not illustrated) such as a mouse or a keyboard. Note that the control content of the control unit 340 is not particularly limited. For example, the control unit 340 may control processes generally performed in a general-purpose computer, a PC, a tablet PC, or the like. More specifically, the control unit 340 sets the point-of-time in the processing unit 310 according to the received operation. Furthermore, the control unit 340 extracts the frame generated by the processing unit 310 according to the set playback speed. The control unit 340 performs control to display the extracted frames in chronological order on the output device 400. When acquiring the identification information, the control unit 340 performs processes based on the acquired identification information. The processes will be described below. Further, when having received the position and orientation information indicating the position and orientation of the viewpoint, the control unit 340 will further perform a viewpoint alteration process of setting the position and orientation of the viewpoint indicated by the received position and orientation information in the processing unit. In contrast, when not having received the position and orientation information indicating the position and orientation of the viewpoint, the control unit 340 will not perform the viewpoint alteration process.

The communication unit 350 performs various types of communication with the distribution server 200. For example, the communication unit 350 transmits the request information acquired from the processing unit 310 to the distribution server 200. Furthermore, the communication unit 350 also functions as a reception unit, and receives the MPD file, the segment file, and the like from the distribution server 200 as a response to the request information. Note that the communication performed by the communication unit 350 is not limited thereto.

The storage unit 360 stores various types of information. For example, the storage unit 360 stores the MPD file, the segment file, and the like acquired from the distribution server 200. Furthermore, for example, the storage unit 360 stores programs, parameters, and the like used by each functional configuration of the client 300. Note that the information stored in the storage unit 360 is not limited to such an example.

<Functional Configuration of Image Processing Unit>

Figure 6:
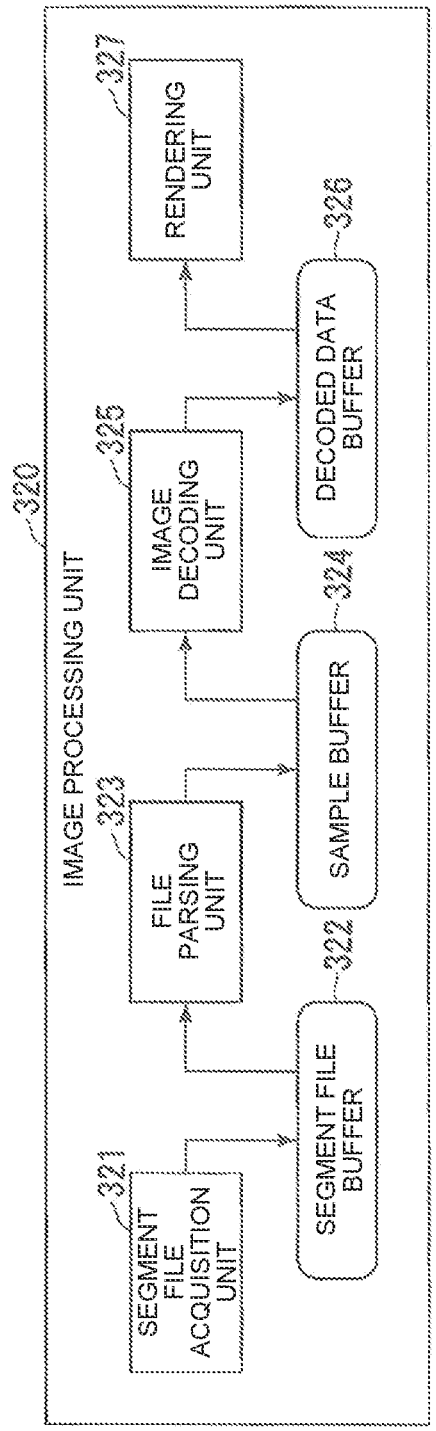
FIG. 6 is a diagram illustrating an example of a functional configuration of an image processing unit 320.

Here, a functional configuration of the above-described image processing unit 320 will be described with reference to FIG. 6. FIG. 6 is a diagram illustrating an example of a functional configuration of an image processing unit 320. As illustrated in FIG. 6, the image processing unit 320 includes a segment file acquisition unit 321, a segment file buffer 322, a file parsing unit 323, a sample buffer 324, an image decoding unit 325, a decoded data buffer 326, and a rendering unit 327.

The segment file acquisition unit 321 generates request information indicating the segment file selected by the segment file selection control unit 313. The segment file acquisition unit 321 causes the communication unit 350 to transmit the generated request information to the distribution server 200. The segment file acquisition unit 321 acquires the segment file indicated by the request information as a response to the transmission of the request information to the distribution server 200. The segment file acquisition unit 321 performs control to store the acquired segment file in the segment file buffer 322.

The segment file buffer 322 stores the segment file supplied from the segment file acquisition unit 321. The segment file stored in the segment file buffer 322 is transferred to the file parsing unit 323.

The file parsing unit 323 analyzes the segment file transferred from the segment file buffer 322 and divides the segment file into system layer metadata and an image stream. The file parsing unit 323 performs control to store the system layer metadata and the image stream in the sample buffer 324.

The sample buffer 324 stores the system layer metadata and the image stream supplied from the file parsing unit 323. The system layer metadata and the image stream stored in the sample buffer 324 are transferred to the image decoding unit 325.

The image decoding unit 325 performs a decoding process on the system layer metadata and the image stream transferred from the sample buffer 324, and generates image position metadata and a decoded image signal. The image decoding unit 325 stores the generated image position metadata and decoded image signal in the decoded data buffer 326.

The decoded data buffer 326 stores the image position metadata and the decoded image signal supplied from the file parsing unit 323. The image position metadata and the decoded image signal stored in the decoded data buffer 326 are transferred to the rendering unit 327.

The rendering unit 327 generates a video frames based on the image position metadata and the decoded image signal transferred from the decoded data buffer 326. More specifically, based on the position and orientation of the viewpoint set by the control unit 340, the rendering unit 327 determines, as a clipping range, a range to be clipped as a part of an image based on the image position metadata and the decoded image signal transferred from the decoded data buffer 326. The rendering unit 327 clips a portion included in the determined clipping range of the image as video frames. Under the control of the control unit 340, the frames clipped by the rendering unit 327 is transmitted to the output device 400 via the communication unit 350 and displayed on the output device 400.

Note that the point-of-time and order in which data is transferred from the segment file buffer 322, the sample buffer 324, and the decoded data buffer 326 are controlled by the segment file selection control unit 313 based on an instruction from the control unit 340.

<Functional Configuration of Audio Processing Unit>

Figure 7:
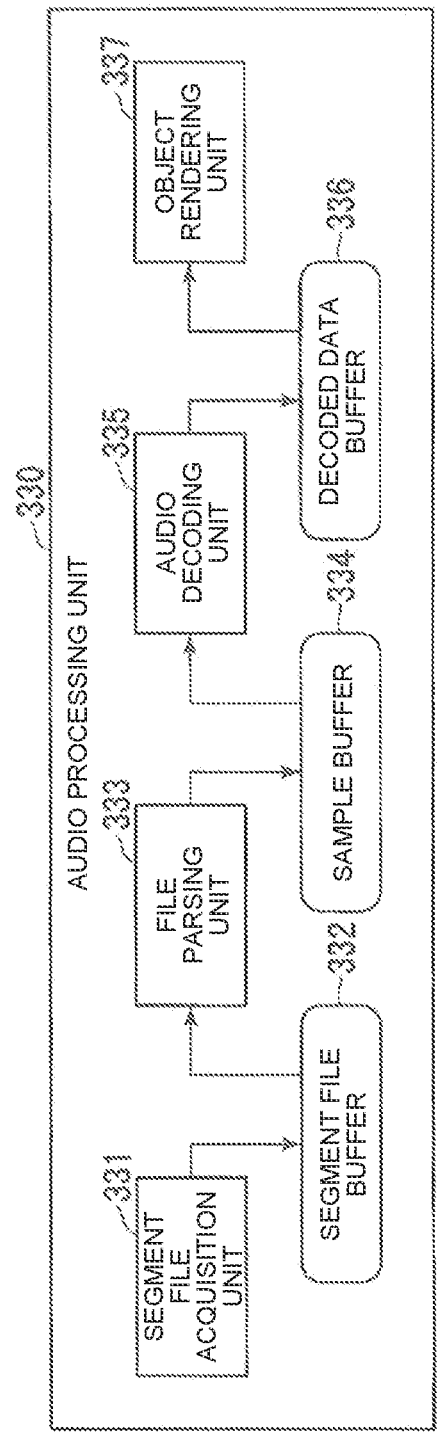
FIG. 7 is a diagram illustrating an example of a functional configuration of an audio processing unit 330.

Here, a functional configuration of the audio processing unit 330 will be described with reference to FIG. 7. FIG. 7 is a diagram illustrating an example of a functional configuration of an audio processing unit 330. As illustrated in FIG. 7, the audio processing unit 330 includes a segment file acquisition unit 331, a segment file buffer 332, a file parsing unit 333, a sample buffer 334, an audio decoding unit 335, a decoded data buffer 336, and an audio rendering unit 337.

The segment file acquisition unit 331 generates request information indicating the segment file selected by the segment file selection control unit 313. The segment file acquisition unit 331 causes the communication unit 350 to transmit the generated request information to the distribution server 200. The segment file acquisition unit 331 acquires the segment file indicated by the request information as a response to the transmission of the request information to the distribution server 200. The segment file acquisition unit 331 performs control to store the acquired segment file in the segment file buffer 332.

The segment file buffer 332 stores the segment file supplied from the segment file acquisition unit 331. The segment file stored in the segment file buffer 332 is transferred to the file parsing unit 333.

The file parsing unit 333 analyzes the segment file transferred from the segment file buffer 322 and divides the segment file into system layer metadata and an audio stream. The file parsing unit 333 performs control to store the system layer metadata and the audio stream in the sample buffer 334.

The sample buffer 334 stores the system layer metadata and the audio stream supplied from the file parsing unit 333. The system layer metadata and the audio stream stored in the sample buffer 334 are transferred to the audio decoding unit 335.

The audio decoding unit 335 performs a decoding process on the system layer metadata and the audio stream transferred from the sample buffer 334, and generates audio position metadata indicating the position of the audio object and a decoded audio signal. The audio decoding unit 335 performs control to store the generated audio position metadata and the decoded audio signal in the decoded data buffer 336.

The decoded data buffer 336 stores the audio position metadata and the decoded audio signal supplied from the file parsing unit 333. The audio position metadata and the decoded audio signal stored in the decoded data buffer 336 are transferred to the audio rendering unit 337.

The audio rendering unit 337 corrects the position information of the audio object based on the audio position metadata and the decoded audio signal transferred from the decoded data buffer 336. Based on the set position and orientation of the viewpoint, the corrected position information of the audio object, and the decoded audio signal, the audio rendering unit 337 generates audio data adapted to the position and orientation of the viewpoint and the audio playback environment. Under the control of the control unit 340, the audio data generated by the audio rendering unit 337 is transmitted to the output device 400 via the communication unit 350 and output from the output device 400.

Note that the point-of-time and order in which data is transferred from the segment file buffer 332, the sample buffer 334, and the decoded data buffer 336 are controlled by the segment file selection control unit 313 based on an instruction from the control unit 340.

<Hardware Configuration of Information Processing Device>

Figure 8:
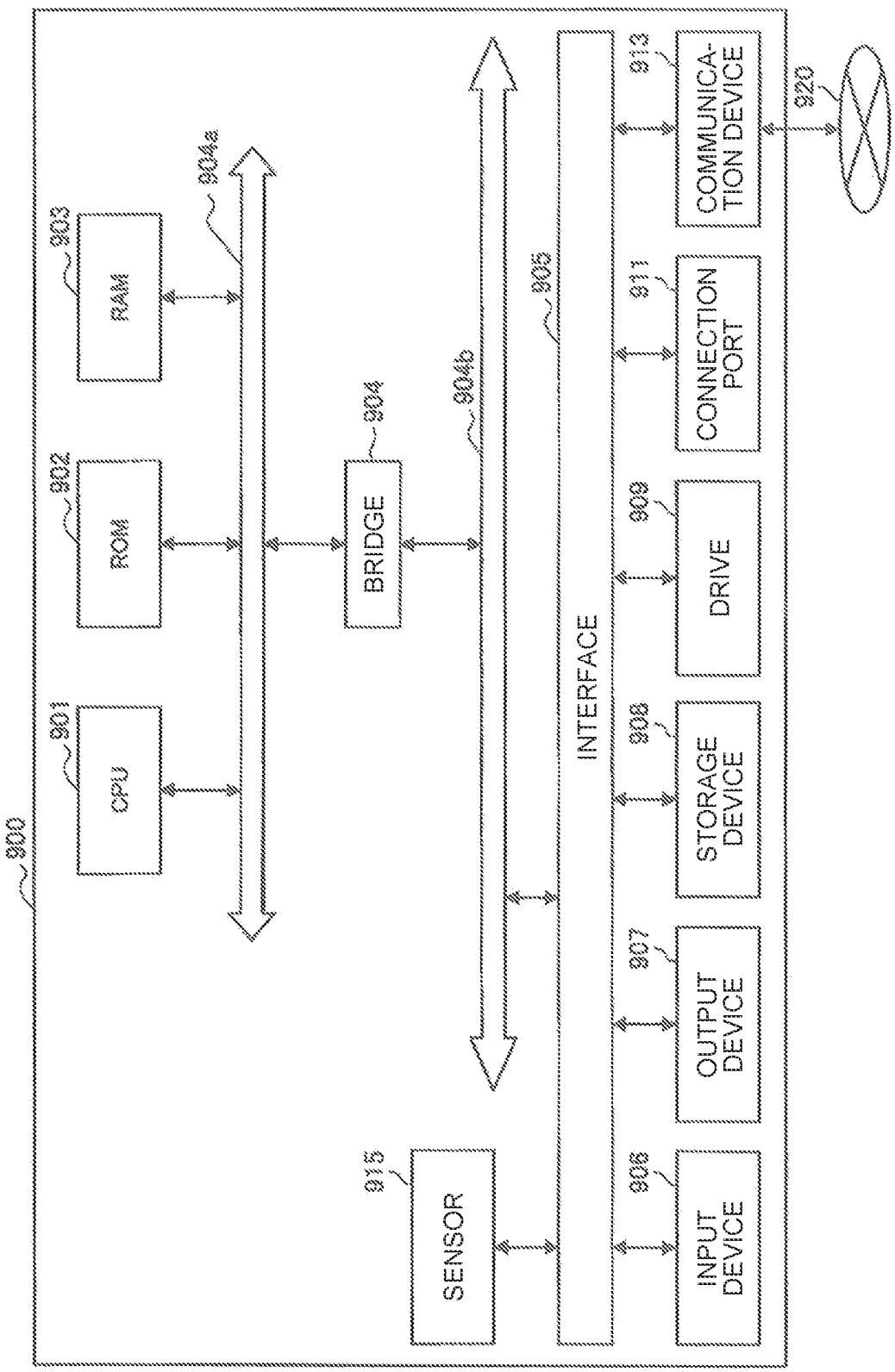
FIG. 8 is a block diagram illustrating a hardware configuration example of an information processing device according to an embodiment of the present disclosure.

Hereinafter, the hardware configuration of the information processing device according to the embodiment of the present disclosure will be described with reference to FIG. 8. FIG. 8 is a block diagram illustrating a hardware configuration example of an information processing device according to an embodiment of the present disclosure. Note that an information processing device 900 illustrated in FIG. 8 can actualize the generation device 100, the distribution server 200, the client 300, and the output device 400 illustrated in FIGS. 1 to 7, for example. Information processing performed by the generation device 100, the distribution server 200, the client 300, and the output device 400 according to the embodiment of the present disclosure is implemented by cooperation of software and hardware described below.

As illustrated in FIG. 8, the information processing device 900 includes a central processing unit (CPU) 901, read only memory (ROM) 902, random access memory (RAM) 903, and a host bus 904a. Furthermore, the information processing device 900 includes a bridge 904, an external bus 904b, an interface 905, an input device 906, an output device 907, a storage device 908, a drive 909, a connection port 911, a communication device 913, and a sensor 915. The information processing device 900 may have a configuration including a processing circuit such as a digital signal processor (DSP), or an application specific integrated circuit (ASIC) instead of or together with the CPU 901.

The CPU 901 functions as an arithmetic processing device and a control device, and controls the overall operation in the information processing device 900 according to various programs. In addition, the CPU 901 may be a microprocessor. The CPU 901 actualizes the generation unit 110, the control unit 120, the control unit 220, the processing unit 310, and the control unit 340, for example.

The ROM 902 stores programs and calculation parameters used by the CPU 901.

The RAM 903 temporarily stores a program used in the execution of the CPU 901, parameters that change appropriately in the execution of the programs by the CPU 901, and the like.

The CPU 901, ROM 902, and RAM 903 are communicably connected to each other by the host bus 904a including a CPU bus and the like. The host bus 904a is connected to the external bus 904b such as a Peripheral Component Interconnect/Interface (PCI) bus via the bridge 904. Note that, in the information processing device 900, the host bus 904a, the bridge 904, and the external bus 904b do not need to be separately configured, and these functions may be implemented in one bus.

The input device 906 is actualized by a device to which the user input information, such as a mouse, a keyboard, a touch panel, a button, a microphone, a switch, and a lever. Furthermore, the input device 906 may be, for example, a remote control device using infrared rays or other radio waves, or an externally connected device such as a mobile phone or a PDA that supports the operation of the information processing device 900. Furthermore, the input device 906 may include, for example, an input control circuit that generates an input signal based on the information input by the user using the above input means and outputs the input signal to the CPU 901. By operating the input device 906, the user of the information processing device 900 can input various data to the information processing device 900 and give an instruction regarding processing operations. The input device 906 is an example of the above-described input unit.

The output device 907 is formed by a device capable of visually or audibly outputting (notifying or reporting, etc.) acquired information to the user. Examples of such output device 907 include display devices such as CRT display devices, liquid crystal display devices, plasma display devices, EL display devices, and lamps, audio output devices such as speakers and headphones, and printer devices. The output device 907 outputs, for example, results obtained by various types of processes performed by the information processing device 900.

Specifically, the output device 400 is a display device that visually displays results obtained by various types of processes performed by the information processing device 900 in various formats such as text, images, tables, and graphs, for example. In addition, the output device 400 is an audio output device that converts an audio signal composed of played audio data, acoustic data, or the like into an analog signal and output the signal audibly.

The storage device 908 is a storage device for data storage formed as an example of a storage unit of the information processing device 900. The storage device 908 is actualized by a magnetic storage unit device such as a hard disk drive (HDD), a semiconductor storage device, an optical storage device, a magneto-optical storage device, or the like. The storage device 908 may have a configuration including a storage medium, a recording device that records data on a storage medium, a reading device that reads data from the storage medium, a deleting device that deletes the data recorded on the storage medium, and the like. The storage device 908 stores programs to be executed by the CPU 901, various data, as well as various data acquired from the outside, and the like. The storage device 908 actualizes the storage unit 140, the storage unit 240, and the storage unit 360, for example.

The drive 909 is a reader/writer adapted for a storage medium. The drive 909 is built in the information processing device 900, for example. Alternatively, the drive 909 may be configured to be externally attached to the information processing device 900. The drive 909 reads information recorded on a removable storage medium such as a mounted magnetic disc, optical disc, magneto-optical disc, or semiconductor memory, and stores the read information in the RAM 903. The drive 909 can also write information to the removable storage medium.

The connection port 911 is an interface connected to an external device. The connection port 911 is a connection port with an external device, capable of transmitting data by a Universal Serial Bus (USB), for example.

The communication device 913 is, for example, a communication interface formed by a communication device or the like for connecting to a network 920. The communication device 913 is, for example, a communication card for wired or wireless Local Area Network (LAN), Long Term Evolution (LTE), Bluetooth (registered trademark), Wireless Universal serial bus (WUSB), or the like. Furthermore, the communication device 913 may be an optical communication router, an Asymmetric Digital Subscriber Line (ADSL) router, a modem for various types of communication, or the like. Similarly to the transmission and reception of signals and the like through the Internet, for example the communication device 913 can exchange signals and the like according to a predetermined protocol such as transmission control protocol/Internet protocol (TCP/IP) with other communication devices. The communication device 913 actualizes the communication unit 130, the communication unit 230, and the communication unit 350, for example.

The sensor 915 is, for example, various types of sensors such as an acceleration sensor, a gyro sensor, a geomagnetic sensor, an optical sensor, a sound sensor, a distance measuring sensor, and a force sensor. The sensor 915 acquires information regarding the self-state of the information processing device 900, such as the orientation and moving speed of the information processing device 900, and information regarding the surrounding environment of the information processing device 900, such as brightness and noise around the information processing device 900. Furthermore, the sensor 915 may include a global positioning system (GPS) sensor that receives a GPS signal and measures the latitude, longitude, and altitude of the device.

The network 920 is an information transmission path of information transmitted in wired or wireless communication from a device connected to the network 920. For example, the network 920 may include a public network such as the Internet, a telephone network, or a satellite communication network, various types of LANs including Ethernet (registered trademark), a wide area network (WAN), or the like. Furthermore, the network 920 may include a dedicated network such as an Internet protocol-virtual private network (IP-VPN).

The hardware configuration capable of implementing the functions of the information processing device 900 according to the embodiment of the present disclosure has been described above. Each of the above-described components may be actualized by using a general-purpose member, or may be actualized by hardware devices specialized for the function of individual components. Therefore, in the hardware configuration capable of implementing the functions of the information processing device 900 according to the embodiment of the present disclosure, hardware to be used may be appropriately altered according to the technical level at the time of implementing the embodiment of the present disclosure.

Incidentally, it is possible to create a computer program for implementation of individual functions of the information processing device 900 according to the embodiment of the present disclosure and possible to install the created program on a PC or the like. Furthermore, it is also possible to provide a computer-readable recording medium storing such a computer program. Examples of the recording medium include a magnetic disk, an optical disk, a magneto-optical disk, a flash drive, or the like. Furthermore, the computer program described above may be distributed via a network, for example, without using a recording medium.

<Process of Repeated Playback Performed by Control Unit>

The control unit 340 of the client 300 described above starts repeated playback of one or more times with acquisition of identification information to be described below as a trigger. Here, in the embodiment, the repeated playback means turning back the time on the playback time axis by a first duration-of-time in the playback of the target content. The first duration-of-time is a temporal range of turning back the time on the playback time axis in the repeated playback. Note that the control unit 340 specifies a duration of time satisfying the first predetermined condition as the first duration-of-time.

The first predetermined condition is, for example, that the first duration-of-time is a duration of time preset in the target content. Note that the first predetermined condition may be another condition such as a duration of time set in advance in the client 300. Hereinafter, for convenience of description, a point-of-time obtained by turning back a first duration-of-time from a certain point-of-time on the playback time axis in repeated playback will be referred to as a first point-of-time.

By such repeated playback, the control unit 340 repeats playing at least a part of the target content As a result, the control unit 340 can suppress the user's missing of a scene desired by the user in the target content.

Figure 9:
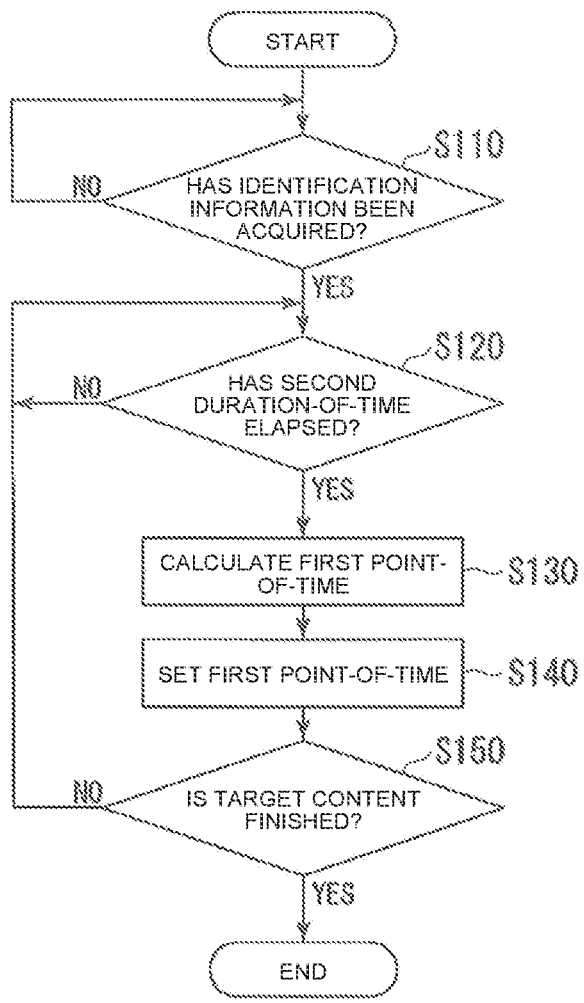
FIG. 9 is a diagram illustrating an example of a flow of processes of repeated playback performed by a control unit 340.

Hereinafter, processes of repeated playback performed by the control unit 340 will be described with reference to FIG. 9. FIG. 9 is a diagram illustrating an example of a flow of processes of repeated playback performed by the control unit 340.

The following will be an exemplary case in which the client 300 has received, from the user, an operation of causing the client 300 to play the target content at a timing before execution of the process of Step S110 illustrated in FIG. 9. With this configuration, the control unit 340 sets, in the processing unit 310, the playback start time at which the target content starts on the playback time axis. Furthermore, in the following, an exemplary case where the control unit 340 has specified the first duration-of-time (for example, based on an MPD file or the like) at the timing. Furthermore, the following will describe an exemplary case in which the control unit 340 starts processes of performing repeated playback every time a second duration-of-time elapses with the acquisition of identification information as a trigger. Moreover, the following will describe an exemplary case where the first duration-of-time is shorter than the second duration-of-time.

Here, the second duration-of-time is a duration of time satisfying a second predetermined condition. The second predetermined condition is, for example, that the second duration-of-time is a duration of time preset in the target content. In addition, in the example illustrated in FIG. 9, the second duration-of-time is a time range between the points of time at which repeated playback is performed on the playback time axis. Note that the first duration-of-time may be the same length as the second duration-of-time, or may be longer than the second duration-of-time. Furthermore, the second predetermined condition may be another condition such as a duration of time set in advance in the client 300.

The control unit 340 waits until identification information is acquired (Step S110).

Here, the identification information will be described. As described above, the identification information is information being a trigger for the control unit 340 to start repeated playback of one or more times.

For example, the identification information is viewpoint change information indicating that at least one of the position of the viewpoint and the orientation of the viewpoint has changed. In this case, the control unit 340 acquires the identification information each time at least one of the position of the viewpoint and the orientation of the viewpoint has changed. Furthermore, in this case, the information may be, for example, position and orientation information received by the client 300 from the user via the above-described input unit, or may be position and orientation information acquired by the above-described sensor according to the position and orientation of the user. The position and orientation information is information indicating the position and orientation of the viewpoint.

Furthermore, for example, the identification information is information indicating at least one of each of one or more predetermined point-of-times on the playback time axis and each of one or more predetermined periods on the playback time axis. In this case, the identification information is information associated with the target content. In a case where the identification information is information indicating a certain point-of-time on the playback time axis, the control unit 340 acquires, for example, information for causing the control unit 340 to start repeated playback one or more times at the point-of-time, as the identification information. Furthermore, in a case where the identification information is information indicating a certain period on the playback time axis, the control unit 340 acquires, as the identification information, information for causing the control unit 340 to perform repeated playback one or more times at the point-of-time at which the period starts on the playback time axis, for example.

With FIG. 9, a description will be given as an exemplary case where the identification information is information that causes the control unit 340 to perform repeated playback one or more times in a certain period SM on the playback time axis. Furthermore, with FIG. 9, a description will be given as an exemplary case where the period SM is a period from the point-of-time at which the target content starts to the point-of-time at which the target content ends on the playback time axis.

Having determined that the identification information has been acquired (Step S110—YES), the control unit 340 waits until the above-described second duration-of-time elapses (Step S120).

When having determined that the second duration-of-time has elapsed (Step S120—YES), the control unit 340 calculates the first point-of-time (Step S130). More specifically, in this case, the control unit 340 calculates, as the first point-of-time, a point-of-time obtained by turning back the time from the current point-of-time by the first duration-of-time on the playback time axis. The current point-of-time is a point-of-time at which the control unit 340 has determined that the second duration-of-time has elapsed, but may be a point-of-time deviated from the point-of-time due to an error, a design policy, or the like.

Next, the control unit 340 newly sets the first point-of-time calculated in Step S130 in the processing unit 310 (Step S140). When the first point-of-time is newly set in the processing unit 310, the segment file selection control unit 313 selects segment files arranged in chronological order from the set first point-of-time in chronological order. The image processing unit 320 generates a video in which frames corresponding to the segment files are arranged in chronological order for each of the segment files selected in chronological order by the segment file selection control unit 313 based on the segment file, the set position and orientation of the viewpoint, and the set first point-of-time. The control unit 340 then extracts the frames generated by the image processing unit 320 according to the set playback speed. The control unit 340 performs control to display the extracted frames in chronological order on the output device 400. However, the image processing unit 320 holds the position and orientation of the viewpoint at the point-of-time when the first point-of-time is designated, even after the point-of-time. This is because, as described above, when having not received the position and orientation information indicating the position and orientation of the viewpoint, the control unit 340 will not perform the viewpoint alteration process. With this configuration, even when the state of the three-dimensional virtual space has changed while the user is altering the position and orientation of the viewpoint when the user is going to see a certain scene in the three-dimensional virtual space, the client 300 can allow the user to view the scene that the user was about to miss from the viewpoint after the alteration. That is, the client 300 can suppress the user's missing of a scene desired by the user.

Next, the control unit 340 determines whether the target content has finished (Step S150). For example, in a case where the current point-of-time is a point-of-time after the point-of-time at which the target content ends on the playback time axis, the control unit 340 determines that the target content has finished. In contrast, when the current point-of-time is before the point-of-time at which the target content ends on the playback time axis, the control unit 340 determines that the target content has not finished. Furthermore, for example, in a case where the client 300 has received from the user an operation to finish playback of the target content, the control unit 340 determines that the target content has finished. In contrast, in a case where the client 300 has not received from the user any operation to finish playback of the target content, the control unit 340 determines that the target content has not finished.

When having determined that the target content has finished (Step S150—YES), the control unit 340 ends the process.

In contrast, when having determined that the target content has not finished (Step S150-NO), the control unit 340 proceeds to Step S120, and waits again until the second duration-of-time elapses.

Note that the control unit 340 may be configured to wait for a predetermined duration of time after the process of Step S120 described above has been performed until the process of Step S130 is started.

As described above, using the processes of the flowchart illustrated in FIG. 9, the control unit 340 of the client 300 performs repeated playback every time the second duration-of-time elapses with the acquisition of the identification information as a trigger. Here, FIG. 10 is a diagram illustrating an example of a state of repeated playback that is performed by the client 300 every time the second duration-of-time elapses using the processes illustrated in FIG. 9.

Figure 10:
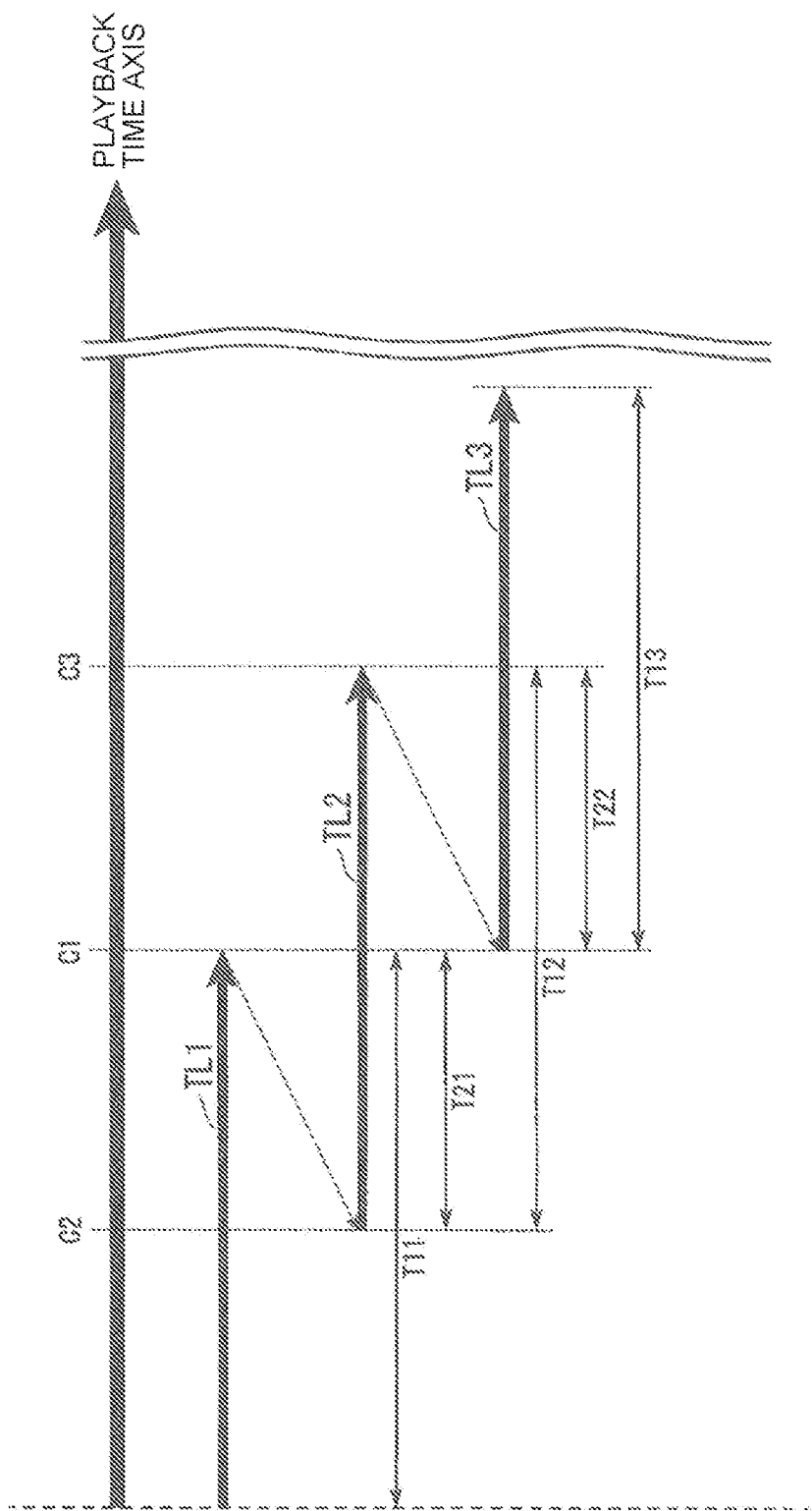
FIG. 10 is a diagram illustrating an example of a state of repeated playback that is performed by the client 300 every time the second duration-of-time elapses by the process illustrated in FIG. 9.

A period TL1 illustrated in FIG. 10 is an example of a period in which a video of the target content is continuously displayed with no repeated playback performed by the client 300 on the playback time axis. Similarly to the period TL1, a period TL2 and a period TL3 are also examples of a period in which a video of the target content is continuously displayed with no repeated playback performed by the client 300. That is, a length T11 of the period TL1 matches the above-described second duration-of-time. A length T12 of the period TL2 matches the second duration-of-time. Also, a length T13 of the period TL3 matches the second duration-of-time.

A point-of-time C1 illustrated in FIG. 10 is a point-of-time at which the period TL1 ends. That is, the control unit 340 calculates the first point-of-time (a point-of-time C2 in the example illustrated in FIG. 10) at the point-of-time C1. Subsequently, the control unit 340 newly sets the calculated first point-of-time in the processing unit 310. The point-of-time C2 illustrated in FIG. 10 indicates the first point-of-time newly set in the processing unit 310 by the control unit 340 at the point-of-time C1. A length T21 of the period from the point-of-time C1 to the point-of-time C2 matches the first duration-of-time described above. In a case where the point-of-time C2 is newly set as the first point-of-time in the processing unit 310, the client 300 starts playback of the target content from the point-of-time C2. That is, the period TL2 is a playback period of the target content started from the point-of-time C2 in this manner.

In addition, a point-of-time C3 illustrated in FIG. 10 is a point-of-time at which the period TL2 ends. That is, the control unit 340 calculates the first point-of-time at the point-of-time C3. Subsequently, the control unit 340 newly sets the calculated first point-of-time in the processing unit 310. In an example illustrated in FIG. 10, the point-of-time C1 also indicates the first point-of-time newly set in the processing unit 310 by the control unit 340 at the point-of-time C3. A length T22 of the period from the point-of-time C3 to the point-of-time C1 matches the first duration-of-time. In a case where the point-of-time C1 is newly set as the first point-of-time in the processing unit 310, the client 300 starts playback of the target content from the point-of-time C1. That is, the period TL3 is a playback period of the target content started from the point-of-time C1 in this manner.

The client 300 performs repeated playback on the playback time axis as illustrated in FIG. 10 every time the second duration-of-time elapses also at and after the point-of-time C2 in the period TL2.

Here, the time during which the user views the video of the target content in a case where the repeated playback is performed as described above increases as compared with a case where the repeated playback is not performed. However, the client 300 automatically performs repeated playback without receiving an operation from the user. Therefore, in the client 300, the user does not have to perform an operation for causing the client 300 to perform repeated playback. As a result, the user can reduce, on the client 300, the time required to perform the operation and reduce the trouble for performing the operation. Furthermore, it is possible, on the client 300, to reduce an increase of the time during which the user views the video as compared with a case where the user performs the operation. In other words, it is possible, on the client 300, to suppress an increase in the user's viewing time of the video of the target content as compared with the case where the user performs the operation.

Furthermore, automatically performing the repeated playback like this by the client 300 will be more beneficial for the user in a case where the client 300 performs high-speed playback of the target content. This is because, in a case where the client 300 performs high-speed playback of the target content, the user can frequently miss a scene that the user desires to view. Furthermore, by combining the high-speed playback and the repeated playback of the target content, it is possible, on the client 300, to further reduce the user's viewing time of the video of the target content while suppressing the user's missing of the scene.

Here, the high-speed playback of the target content means that the client 300 plays the target content in a case where the playback speed set in the client 300 is not a normal playback speed but a high playback speed. In a case where the playback speed set in the client 300 is the normal playback speed, the speed at which the time on the playback time axis passes in the playback of the target content matches the speed at which the time on a real time axis passes when no repeated playback is performed. In contrast, in a case where the playback speed set in the client 300 is the high playback speed, the speed at which the time on the playback time axis passes in the playback of the target content is higher than the speed at which the time on the real time axis passes when no repeated playback is performed. In this case, the difference in the passage speed of the time on the playback time axis with respect to the passage speed of the time on the real time in the playback of the target content varies depending on the factor received by the client 300 from the user. When the client 300 has received the magnification and the playback speed set in the client 300 is the high playback speed, the speed at which the time on the playback time axis passes in playback of the target content matches the speed obtained by multiplying the speed at which the time on the real time axis passes by the factor. The above-described high playback speed is the speed.

<Frame Extraction Process by Control Unit During High-Speed Playback of Target Content>

At the time of high-speed playback of the target content, the control unit 340 extracts the frames generated by the processing unit 310 according to the set high playback speed. Then, the control unit 340 performs control to display the extracted frames on the display unit in chronological order. Accordingly, the following will describe a frame extraction process by the control unit 340 at the time of high-speed playback of the target content.

At the time of high-speed playback of the target content, the control unit 340 extracts frames generated by the processing unit 310 one by one in an interval according to the set high playback speed. The control unit 340 then performs control to display the extracted frames in chronological order on the output device 400.

Figure 11:
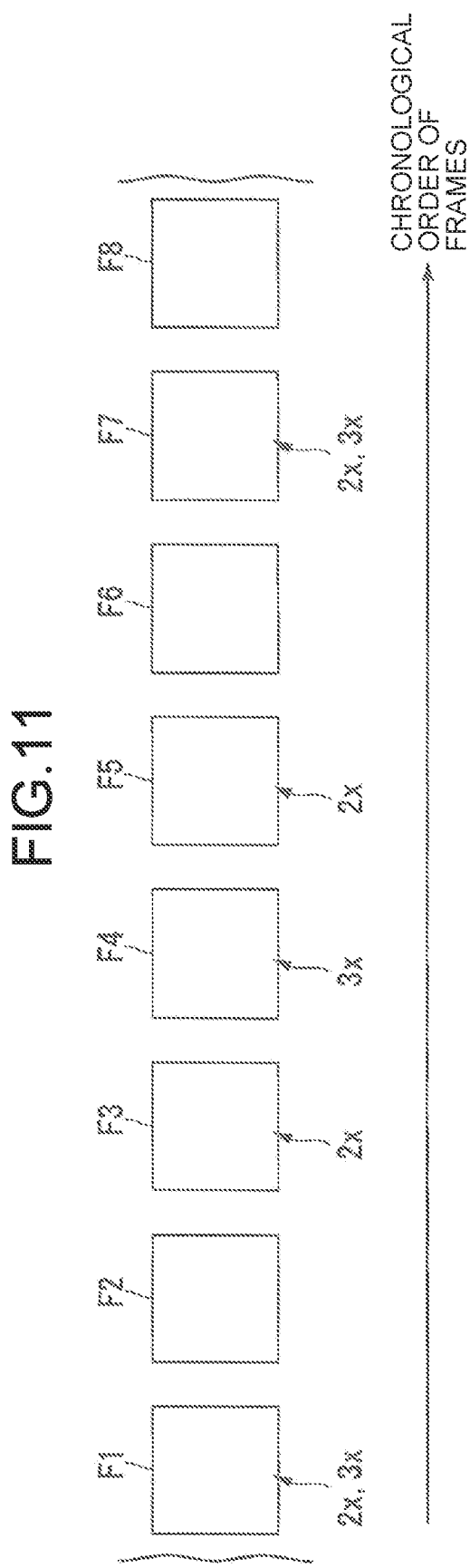
FIG. 11 is a diagram illustrating an example of a state in which video frames of target content are arranged in chronological order.

FIG. 11 is a diagram illustrating an example of a state in which video frames of target content are arranged in chronological order. Each of eight frames, namely, frame F1 to frame F8 illustrated in FIG. 11 is an example of the frame of the video of the target content. The frame F1 is a frame associated with the oldest point-of-time among the eight frames. In addition, the frame F8 is a frame associated with the latest point-of-time among the eight frames.

For example, in a case where the above-described factor is two, the control unit 340 extracts frames denoted by a reference numeral 2× with an interval of one frame in chronological order from among the eight frames illustrated in FIG. 11. Frames denoted by reference numeral 2× are a frame F1, a frame F3, a frame F5, and a frame F7. That is, in this case, the control unit 340 extracts frames every other frame. The control unit 340 then performs control to display the extracted frames in chronological order on the output device 400. That is, in this case, the client 300 plays the target content at a double (2×) speed. Here, in this case, in the high-speed playback of the target content by the client 300, the time on the playback time axis passes at twice the speed of the time on the real time axis. With this configuration, in the high-speed playback, synchronization between the passage speed of the frame associated with the time on the playback time axis and the passage speed of the point-of-time on the playback time axis is maintained.

In addition, for example, in a case where the above-described factor is three, the control unit 340 extracts frames denoted by a reference numeral 3× at an interval of two frames in chronological order from among the eight frames illustrated in FIG. 11. Frames denoted by reference numeral 3× are a frame F1, a frame F4, and a frame F7. That is, in this case, the control unit 340 extracts every two frames. The control unit 340 then performs control to display the extracted frames in chronological order on the output device 400. That is, in this case, the client 300 plays the target content at a triple (3×) speed. Here, in this case, in the high-speed playback of the target content by the client 300, the time on the playback time axis passes at a speed three times the speed of passage of the time on the real time axis.

With this configuration, in the high-speed playback, synchronization between the passage speed of the frame associated with the time on the playback time axis and the passage speed of the point-of-time on the playback time axis is maintained.

In the case of performing repeated playback of the target content in such high-speed playback, the control unit 340 may be configured to preferentially extract a frame having a small number of times of extraction among the frames generated by the image processing unit 320. With this configuration, the client 300 can reduce the number of frames that are not displayed on the output device 400 in high-speed playback of the target content. As a result, the client 300 can suppress a decrease of information obtained from the video by the user in the high-speed playback of the target content.

The control unit 340 performs such preferential extraction of a frame having a small number of times of extraction by using Management table 1-1, for example. Management table 1-1 is a table provided for the control unit 340 to manage the number of times of extraction of each of frames of the segment file for each of segment files. That is, Management table 1-1 includes information indicating the number of times of extraction of each of frames for each of the segment files. In the embodiment, each of the frames of the segment file represents each of frames of the video of the segment file.

FIG. 12 is a diagram illustrating an example of the Management table 1-1. Note that the number of times of extraction of each of frames for each of the segment files is also the number of times of playback of each of the frames for each of the segment files. Therefore, the number of times of extraction may be referred to as the number of times of playback of each of the frames for each of the segment files.

Management table 1-1 illustrated in FIG. 12 is a table in which segment identification information identifying a segment file is associated with extraction count information indicating the number of times of extraction of each of frames of the segment file indicated by the segment identification information. The segment identification information may be any information as long as individual segment files can be identified without duplication. In the example illustrated in FIG. 12, the segment identification information is a file name of the segment file. In addition, in Management table 1-1 illustrated in FIG. 12, pieces of the segment identification information identifying the segment file are arranged in chronological order of the segment files from the top to the bottom of Management table 1-1. The extraction count information may be any information as long as it can indicate the number of times of extraction of each of frames of each of segment files. In the present example, the extraction count information is information in which an extraction count of each of frame associated with the point-of-time on the playback time axis is arranged in chronological order of frames from left to right indicated by the arrow in FIG. 12. For example, in FIG. 12, the number of frames of the segment file indicated by the segment identification information "s001.m4s" is 15. Accordingly, the extraction count information associated with the segment identification information indicates information in which the extraction counts of each of the 15 frames associated with the point-of-time on the playback time axis are arranged in chronological order of the frame from the left to the right. Furthermore, in the present example, the extraction count of each of the 15 frames of the segment file is all "0". This indicates that all these 15 frames have never been extracted by the control unit 340.

Here, FIG. 13 is a diagram illustrating another example of Management table 1-1. The Management table 1-1 illustrated in FIG. 13 corresponds to Management table 1-1 illustrated in FIG. 12 after frame extraction is performed by the control unit 340 in the client 300 that plays the target content at the double speed. In the extraction count information illustrated in FIG. 13, each "1" indicates that the frame associated with each "1" has been extracted once by the control unit 340. That is, when performing repeated playback using the segment file indicated by the segment identification information illustrated in FIG. 13, the control unit 340 in the client 300 preferentially extracts the frame associated with "0" over the frame associated with "1".

FIG. 14 is a diagram illustrating still another example of Management table 1-1. Management table 1-1 illustrated in FIG. 14 corresponds to Management table 1-1 illustrated in FIG. 13 after the repeated playback is performed twice in the client 300 that plays the target content at the double speed. In the extraction count information illustrated in FIG. 14, each "2" indicates that the frame associated with each "2" has been extracted twice by the control unit 340. That is, when performing repeated playback using the segment file indicated by the segment identification information illustrated in FIG. 14, the control unit 340 in the client 300 preferentially extracts the frame associated with "1" over the frame associated with "2".

In this manner, by using Management table 1-1, the client 300 can reduce the number of frames that are not displayed on the output device 400 in high-speed playback of the target content. As a result, the client 300 can suppress a decrease of information obtained from the video by the user in the high-speed playback of the target content.

Furthermore, in a case where repeated playback is performed in the high-speed playback of the target content, the control unit 340 may be configured to preferentially extract a frame played earlier among the frames generated by the image processing unit 320. With this configuration, the client 300 can reduce the number of frames that are not displayed on the output device 400 in high-speed playback of the target content. As a result, the client 300 can suppress a decrease of information obtained from the video by the user in the high-speed playback of the target content.

The control unit 340 performs such preferential extraction of a frame extracted a small number of times by using Management table 1-2, for example. Management table 1-2 is a table provided for the control unit 340 to manage the latest occurrence of extraction of each of frames of the segment file for each of segment files. That is, Management table 1-2 includes information indicating the latest occurrence of extraction of each of frames for each of segment files.

FIG. 15 is a diagram illustrating an example of Management table 1-2. The latest occurrence of extraction of each of frames for each of segment files indicates the number of times of execution of repeated playback of the segment file as well as in which times of the repeated playback each of the frames have been played. For example, when the largest extraction occurrence among the latest extraction occurrences of each frame of a certain segment file is three, the segment file is played three times in repeated playback. Furthermore, in a case where the latest extraction occurrence of a certain frame of the segment file is two, the frame has been played in the second time among the playback times of the segment file played three times in repeated playback.

Management table 1-2 illustrated in FIG. 15 is a table in which segment identification information identifying a segment file is associated with extraction occurrence information indicating the number of extraction of each of frames of the segment file indicated by the segment identification information. The extraction occurrence information may be any information as long as it can indicate the number of extraction of each of frames of each of segment files. In the present example, the extraction occurrence information is information in which an extraction occurrence of each of frame associated with the point-of-time on the playback time axis is arranged in chronological order of frames from left to right indicated by the arrow in FIG. 15. For example, in FIG. 15, the number of frames of the segment file indicated by the segment identification information "s001.m4s" is 15. Accordingly, the extraction occurrence information associated with the segment identification information indicates information in which the latest extraction occurrences of each of the 15 frames associated with the point-of-time on the playback time axis are arranged in chronological order of the frame from the left to the right. Furthermore, in the present example, the extraction occurrence of each of the 15 frames of the segment file is all "0". This indicates that all these 15 frames have never been extracted by the control unit 340.

Here, FIG. 16 is a diagram illustrating another example of Management table 1-2. Management table 1-2 illustrated in FIG. 16 corresponds to Management table 1-2 illustrated in FIG. 15 after frame extraction is performed by the control unit 340 in the client 300 that plays the target content at the double speed. In the extraction occurrence information illustrated in FIG. 16, each "1" indicates that the frame associated with each "1" has been extracted by the control unit 340 at the time of the first playback of the segment file to which the frame belongs. That is, the control unit 340 in the client 300 preferentially extracts the frame associated with the smallest extraction occurrence at the time of the second playback of the segment file (that is, the frame associated with "0" is preferentially extracted over the frame associated with "1").

FIG. 17 is a diagram illustrating still another example of Management table 1-2. Management table 1-2 illustrated in FIG. 17 corresponds to Management table 1-2 illustrated in FIG. 15 after the repeated playback is performed twice in the client 300 that plays the target content at the double speed. In the extraction occurrence information illustrated in FIG. 17, each "2" indicates that the frame associated with each "2" has been extracted by the control unit 340 at the second playback of the segment file to which the frame belongs. That is, the control unit 340 in the client 300 preferentially extracts the frame associated with the smallest extraction occurrence at the time of the third playback of the segment file (that is, the frame associated with "1" is preferentially extracted over the frame associated with "2").

As described above, the client 300 can preferentially extract and play frames played in the past by using the Management table 1-2. In addition, the client 300 can reduce the number of frames not displayed on the output device 400 in the high-speed playback of the target content. As a result, the client 300 can suppress a decrease of information obtained from the video by the user in the high-speed playback of the target content.

<First Modification of Processes of Repeated Playback Performed by Control Unit>

Figure 18:
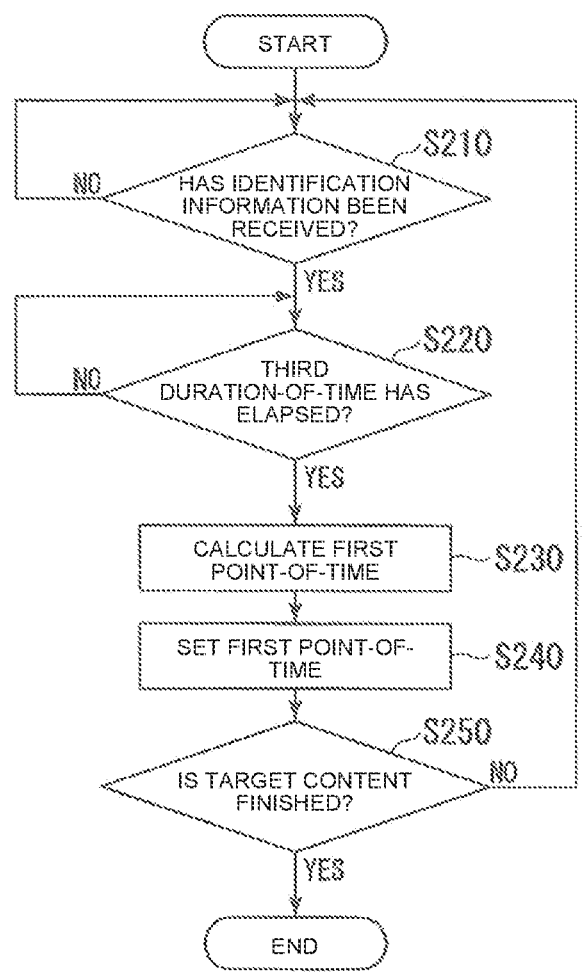
FIG. 18 is a diagram illustrating an example of a flow of processes of repeated playback performed by the control unit 340.

Hereinafter, a first modification of the process of repeated playback performed by the control unit 340 will be described with reference to FIG. 18. FIG. 18 is a diagram illustrating an example of a flow of processes of repeated playback performed by the control unit 340. FIG. 18 illustrates an example of a flow of the processes in a case where the identification information is the viewpoint change information described above.

The following is as an exemplary case in which the client 300 has received, from the user, an operation of causing the client 300 to play the target content at a timing before execution of the processes of Step S110 illustrated in FIG. 18. With this configuration, the control unit 340 sets, in the processing unit 310, the playback start time at which the target content starts on the playback time axis.

The control unit 340 waits until the identification information is acquired (Step S210).

Having determined that the identification information has been acquired (Step S210—YES), the control unit 340 waits until a third duration-of-time elapses (Step S220). The third duration-of-time is a duration of time satisfying a third predetermined condition. The third predetermined condition is, for example, that the third duration-of-time is a duration of time preset in the target content. In this case, the third duration-of-time is a waiting time from the time of acquisition of the identification information by the control unit 340 to the time at which the first point-of-time is designated on the playback time axis. In this case, the third duration-of-time may be any time of 0 seconds or more. Furthermore, the third predetermined condition may be another condition such as a duration of time set in advance in the client 300. Hereinafter, as an example, a case where the third duration-of-time has a length T3 will be described.

When having determined that the third duration-of-time has elapsed (Step S220—YES), the control unit 340 calculates the first point-of-time (Step S230). As described above, the first point-of-time is a point-of-time obtained by turning back the time from the current point-of-time by the first duration-of-time on the playback time axis. In the example in FIG. 18, the current point-of-time is a point-of-time at which the control unit 340 has determined that the third duration-of-time has elapsed, but may be a point-of-time deviated from the point-of-time due to an error, a design policy, or the like.

Next, the control unit 340 newly sets the first point-of-time calculated in Step S230 in the processing unit 310 (Step S240). Since the process of Step S240 is similar to the process of Step S140, the description thereof will be omitted.

Next, the control unit 340 determines whether the target content has finished (Step S250). Since the process of Step S250 is similar to the process of Step S150 illustrated in FIG. 9, the description thereof will be omitted.

When having determined that the target content has finished (Step S250—YES), the control unit 340 ends the process.

In contrast, when having determined that the target content has not finished (Step S250-NO), the control unit 340 proceeds to Step S210, and waits again until the identification information is acquired.

As described above, in the processes of the flowchart illustrated in FIG. 18, every time at least one of the position and orientation of the viewpoint changes from the start to the end of playback of the target content, the client 300 waits for the third duration-of-time on the playback time axis and then turns back the time on the playback time axis by the first duration-of-time. That is, in the processes, every time at least one of the position of the viewpoint and the orientation of the viewpoint changes, the client 300 repeats display of the video in the three-dimensional virtual space in the period from the third point-of-time when the third duration-of-time has elapsed to the first point-of-time obtained by turning back the time from the third point-of-time by the first duration-of-time. Here, FIG. 19 is a diagram illustrating an example of a state in which repeated playback is performed by the client 300 by the processes illustrated in FIG. 18.

Figure 19:
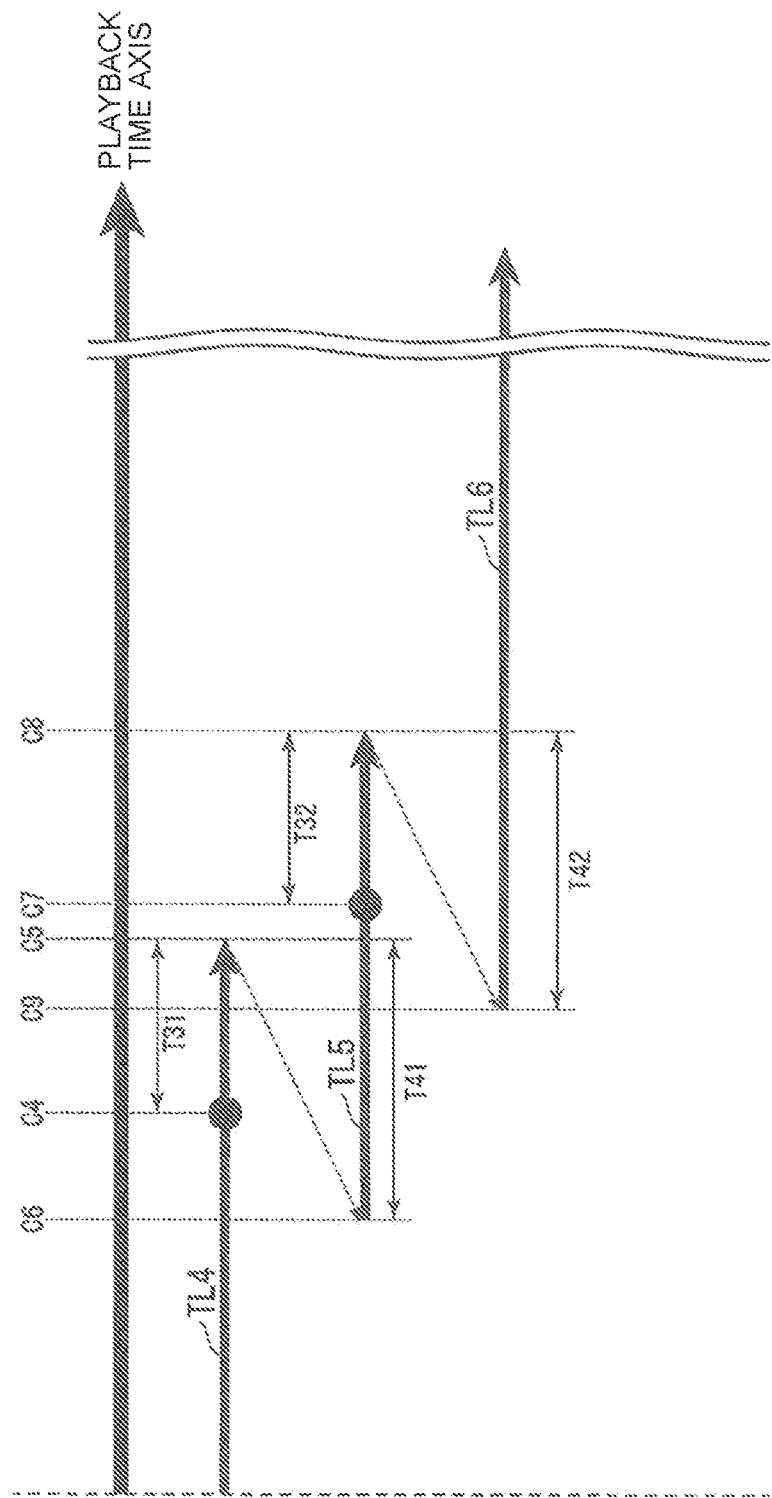
FIG. 19 is a diagram illustrating an example of a state in which repeated playback is performed by the client 300 by the processes illustrated in FIG. 15.

A period TL4 illustrated in FIG. 19 is an example of a period in which a video of the target content is continuously displayed with no repeated playback performed by the client 300 on the playback time axis. Similarly to the period TL4, a period TL5 and a period TL6 are also examples of a period in which a video of the target content is continuously displayed with no repeated playback performed by the client 300.

A point-of-time C4 illustrated in FIG. 19 is a point-of-time of acquisition of the viewpoint change information by the control unit 340 as identification information. That is, the control unit 340 waits for a third duration-of-time from the point-of-time C4. A point-of-time C5 illustrated in FIG. 19 indicates a point-of-time at which the third duration-of-times has elapsed from point-of-time C4 on the playback time axis. Therefore, a length T31 of the period from the point-of-time C4 to the point-of-time C5 matches the third duration-of-time. In addition, a point-of-time C6 illustrated in FIG. 19 indicates the first point-of-time newly set in the processing unit 310 by the control unit 340 at the point-of-time C5. That is, a length T41 of the period from the point-of-time C5 to the point-of-time C6 matches the first duration-of-time. In a case where the point-of-time C6 is newly set as the first point-of-time in the processing unit 310, the client 300 starts playback of the target content from the point-of-time C6. That is, the period TL5 is a playback period of the target content started from the point-of-time C6 in this manner.

Furthermore, a point-of-time C7 illustrated in FIG. 19 is a point-of-time of acquisition of the viewpoint change information by the control unit 340 as identification information. That is, the control unit 340 waits for the third duration-of-time from the point-of-time C7. A point-of-time C8 illustrated in FIG. 19 indicates a point-of-time at which the third duration-of-times has elapsed from point-of-time C7 on the playback time axis. Therefore, a length T32 of the period from the point-of-time C7 to the point-of-time C8 matches the third duration-of-time. In addition, a point-of-time C9 illustrated in FIG. 19 indicates the first point-of-time newly set in the processing unit 310 by the control unit 340 at the point-of-time C8. That is, a length T42 of the period from the point-of-time C8 to the point-of-time C9 matches the first duration-of-time. In a case where the point-of-time C9 is newly set as the first point-of-time in the processing unit 310, the client 300 starts playback of the target content from the point-of-time C9. That is, the period TL6 is a playback period of the target content started from the point-of-time C9 in this manner.

The client 300 performs the repeated playback on the playback time axis as illustrated in FIG. 19 every time at least one of the position of the viewpoint and the orientation of the viewpoint changes even at and after the point-of-time C9 in the period TL6.

Here, in the playback of the target content performed by the client 300, repeated playback of a part of the target content is performed every time at least one of the position of the viewpoint and the orientation of the viewpoint changes in this manner. More specifically, the client 300 performs repeated playback every time at least one of the position of the viewpoint and the orientation of the viewpoint changes, that is, every time the user performs an operation of changing at least one of the position of the viewpoint and the orientation of the viewpoint. Therefore, in a case where there is a high possibility that the user misses a scene that the user desires to view, the client 300 performs such repeated playback. As a result, the client 300 can suppress the user's missing of the scene that the user desires to view while suppressing unnecessary increase of the user's viewing time.

Figure 20:
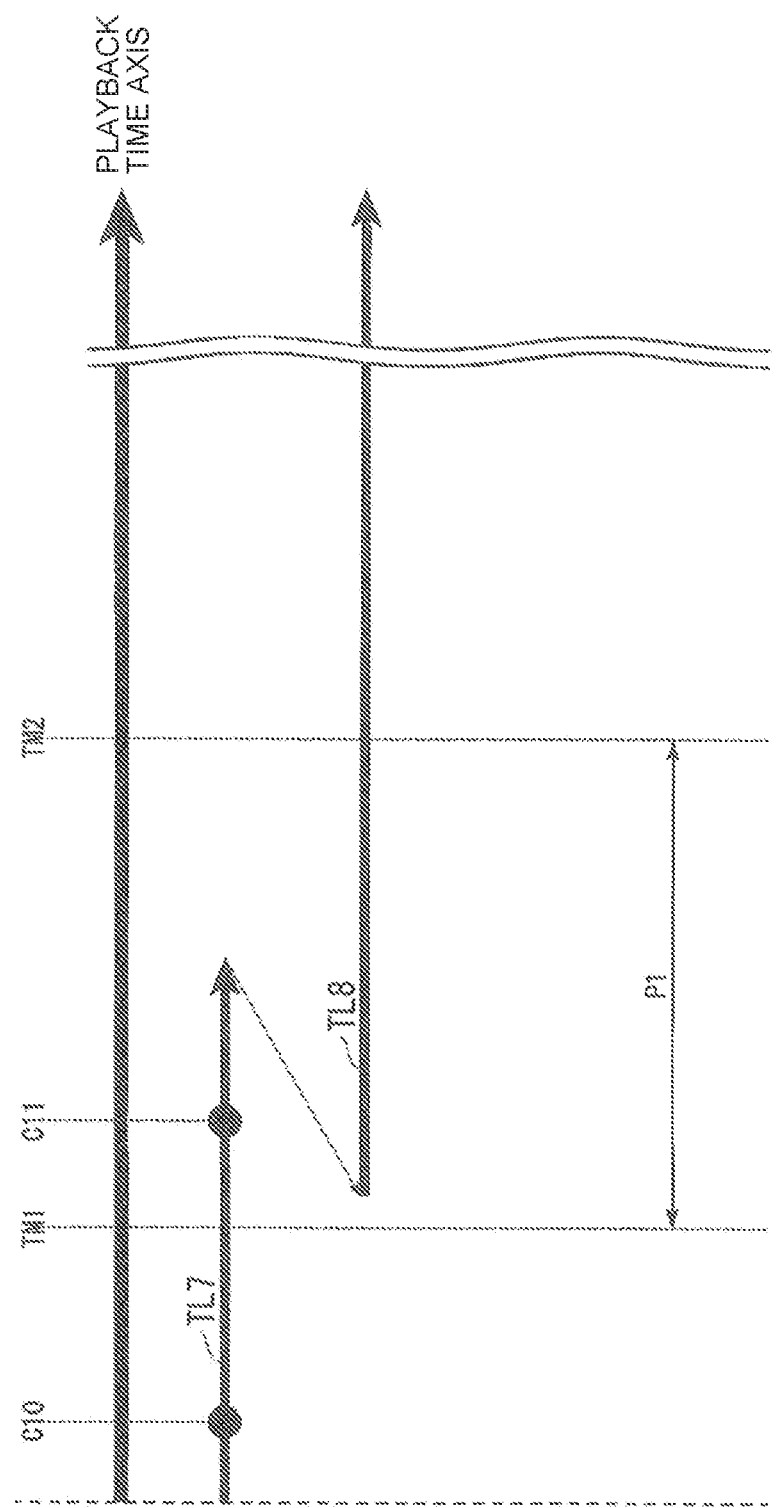
FIG. 20 is a diagram illustrating another example of a state in which repeated playback is performed by the client 300 by the processes illustrated in FIG. 15.

The control unit 340 may be configured to perform the repetitive processing in the processes of the flowchart of FIG. 19 only in a predetermined designated period on the playback time axis as illustrated in FIG. 20. FIG. 20 is a diagram illustrating another example of a state in which repeated playback is performed by the client 300 by the processes illustrated in FIG. 18. Note that the predetermined designated period may be set in advance on the playback time axis of the target content by a creator of the target content, may be settable to the client 300 by the user, or may be set by other methods.

A period TL7 illustrated in FIG. 20 is an example of a period in which a video of the target content is continuously displayed with no repeated playback performed by the client 300 on the playback time axis. Similarly to the period TL7, a period TL8 is also an example of a period in which a video of the target content is continuously displayed with no repeated playback performed by the client 300. In addition, the period P1 between the point-of-time TM1 and the point-of-time TM2 illustrated in FIG. 20 is an example of a predetermined designated period on the playback time axis.

A point-of-time C10 illustrated in FIG. 20 is a point-of-time of acquisition of the viewpoint change information by the control unit 340 as identification information. However, the point-of-time C10 is not included in the period P1. Therefore, the control unit 340 does not determine that the identification information has been acquired at the point-of-time C10 (alternatively, the control unit 340 discards the acquired identification information with no other operation). Note that the control unit 340 may be configured not to acquire the identification information at the point-of-time C10.

Meanwhile, a point-of-time C11 illustrated in FIG. 20 is a point-of-time of acquisition of the viewpoint change information by the control unit 340 as identification information. In addition, the point-of-time C11 is included in the period P1. Accordingly, as illustrated in FIG. 20, the control unit 340 calculates the first point-of-time after waiting until the third duration-of-time elapses from the point-of-time C11. Subsequently, the control unit 340 newly sets the calculated first point-of-time in the processing unit 310. Accordingly, a period TL8 illustrated in FIG. 20 is an example of a period in which a video of the target content is continuously displayed with no repeated playback performed by the client 300, subsequent to the period TL7, on the playback time axis.

Although the first duration-of-time has been described as a fixed time, the present disclosure is not limited thereto. The control unit 340 may be configured to be able to select the first point-of-time (that is, the control unit 340 can dynamically calculate the first duration-of-time). The client 300 may have a configuration in which the time selectable as the first point-of-time by the control unit 340 is determined beforehand according to the playback time axis. This can be easily realized, for example, by dividing the playback time axis into a plurality of time zones. Hereinafter, for convenience of description, each time zone after the playback time axis is divided will be simply referred to as a time zone.

In a case where the playback time axis is divided into a plurality of time zones, and in a case where the control unit 340 has acquired identification information at a certain point-of-time on the playback time axis, the control unit 340 newly sets the point-of-time at which the time zone including the point-of-time started in the processing unit 310 as the first point-of-time. That is, in this case, the first predetermined condition is that the first duration-of-time is a duration-of-time starting from the point-of-time of acquisition of the identification information by the control unit 340 to the point-of-time when the time zone including the point-of-time started on the playback time axis.

Figure 21:
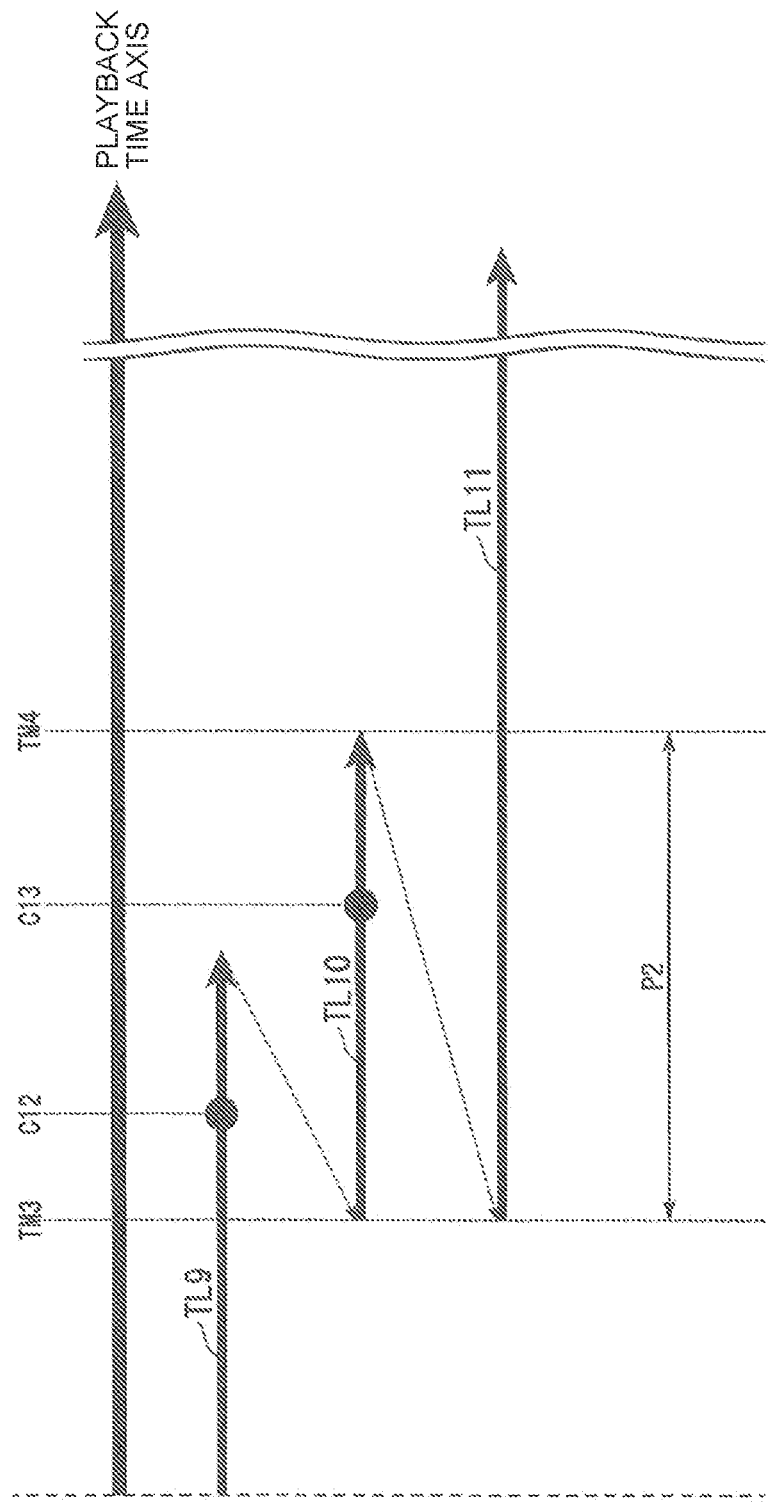
FIG. 21 is a diagram illustrating still another example of a state in which repeated playback is performed by the client 300 by the processes illustrated in FIG. 15.

Here, FIG. 21 is a diagram illustrating still another example of a state in which repeated playback is performed by the client 300 by the processes illustrated in FIG. 18. More specifically, FIG. 21 is a diagram illustrating an example of the state when the time selectable as the first point-of-time by the control unit 340 is determined beforehand according to the playback time axis.

A period TL9 illustrated in FIG. 21 is an example of a period in which a video of the target content is continuously displayed with no repeated playback performed by the client 300 on the playback time axis. Similarly to the period TL1, a period TL10 and a period TL11 are also examples of a period in which a video of the target content is continuously displayed with no repeated playback performed by the client 300.

A point-of-time TM3 illustrated in FIG. 21 is a time at which a time zone including the point-of-time TM3 ends. That is, the point-of-time TM3 is not included in a time zone represented by a period P2 illustrated in FIG. 21.

Alternatively, the point-of-time TM3 may be a point-of-time at which a time zone including the point-of-time TM3 starts among the point-of-times on the playback time axis. In this case, the point-of-time TM3 is included in the time zone represented by the period P2. In addition, a point-of-time TM4 illustrated in FIG. 21 is a point-of-time at which the time zone including the point-of-time TM4 ends. That is, the point-of-time TM4 is included in the time zone represented by the period P2. Alternatively, the point-of-time TM4 may be a point-of-time at which a time zone including the point-of-time TM4 starts. In this case, the point-of-time TM4 is not included in the time zone represented by the period P2.

Furthermore, a point-of-time C12 illustrated in FIG. 21 is a point-of-time of acquisition of the viewpoint change information by the control unit 340 as identification information. In the example illustrated in FIG. 21, after waiting for the third duration-of-time from the point-of-time C12, the control unit 340 calculates the point-of-time TM3 as the first point-of-time based on the first duration-of-time satisfying the first predetermined condition. Subsequently, the control unit 340 newly sets the point-of-time TM3 calculated as the first point-of-time in the processing unit 310. Due to this, a period TL10 illustrated in FIG. 21 is a period in which a video of the target content is continuously displayed with no repeated playback performed by the client 300, subsequent to the period TL9, on the playback time axis. Similarly, in the period TL10, when the control unit 340 has acquired the viewpoint change information as the identification information at the point-of-time C13 included in the period P2, the control unit 340 designates the point-of-time TM3 as the first point-of-time again after waiting for the third duration-of-time. A period TL11 illustrated in FIG. 21 is a period in which a video of the target content is continuously displayed with no repeated playback performed by the client 300, subsequent to the period TL10, on the playback time axis.

Note that dividing the playback time axis into a plurality of time zones can be easily implemented in a case where the target content is played in units of a plurality of segment files as in the embodiment. This is because the time on the playback time axis at which each segment file is played is determined in advance.

Figure 22:
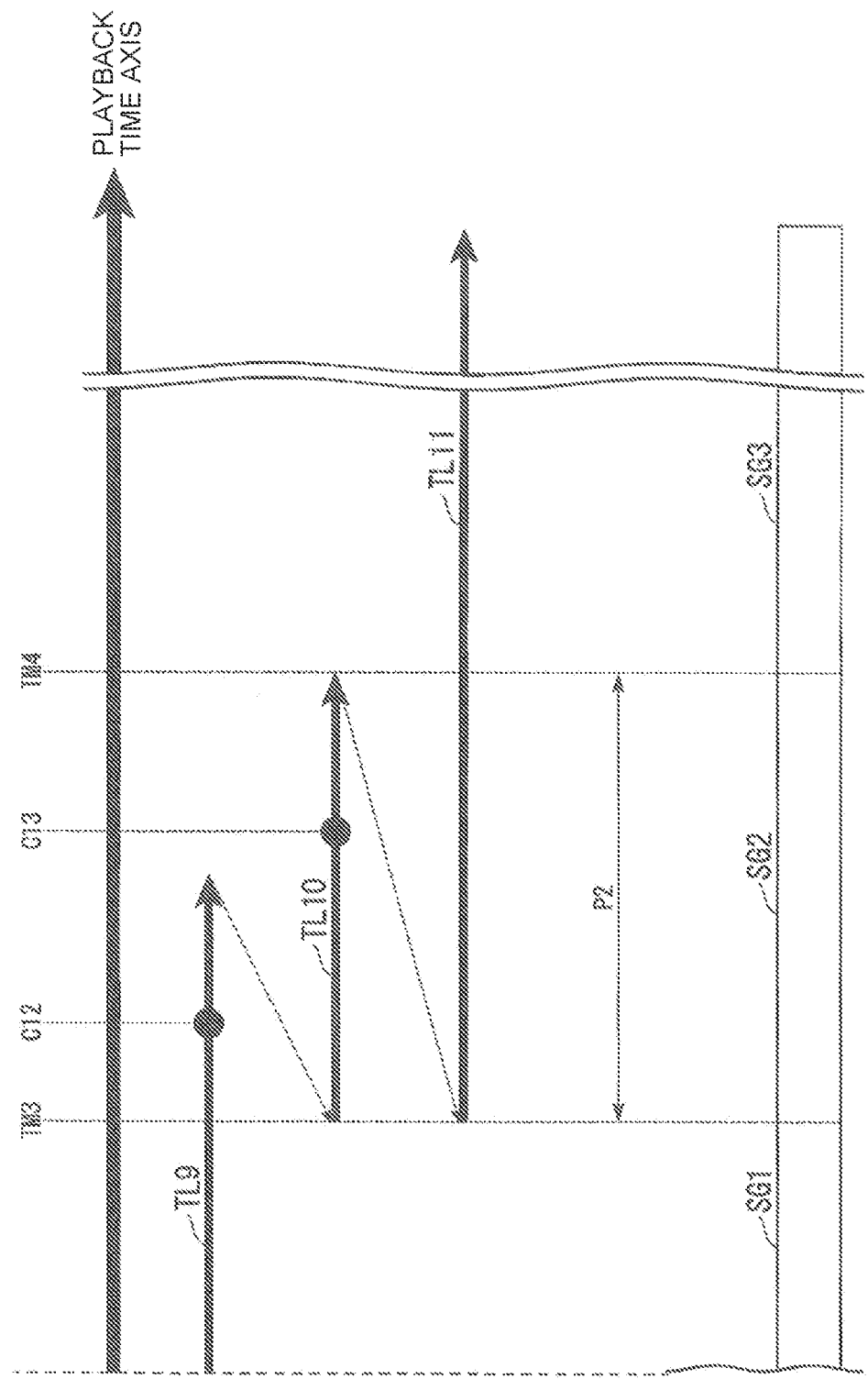
FIG. 22 is a diagram illustrating an example of a correspondence between a plurality of time zones and a plurality of segment files.

FIG. 22 is a diagram illustrating an example of a correspondence between a plurality of time zones and a plurality of segment files.

A period SG1 illustrated in FIG. 22 is a period in which a video of a certain segment file is displayed on the playback time axis. Furthermore, a period SG2 illustrated in FIG. 22 is a period in which a video of a segment file next to the segment file in chronological order is displayed on the playback time axis. Furthermore, a period SG3 illustrated in FIG. 22 is a period in which a video of a segment file next to the segment file in chronological order is displayed on the playback time axis.

As illustrated in FIG. 22, the point-of-time TM3 is a point-of-time at which the period SG1 ends. The point-of-time TM4 is a point-of-time at which the period SG2 ends. In addition, the client 300 can perform random access based on the segment file. Therefore, the client 300 can easily perform repeated playback as illustrated in FIG. 21 based on the segment file and the processes of the flowchart illustrated in FIG. 18.

<Relationship Between Playback Speed on Playback Time Axis and Playback Speed on Real Time Axis>

The relationship between the playback speed on the playback time axis of the target content and the playback speed on the real time axis will be described below. Hereinafter, for convenience of description, the playback speed on the real time axis will be referred to as a substantially real playback speed.

In the client 300, repeated playback is performed. Therefore, in the client 300, as described above, the viewing time during which the user views the target content increases as compared with the case where the repeated playback is not performed.

Figure 23:
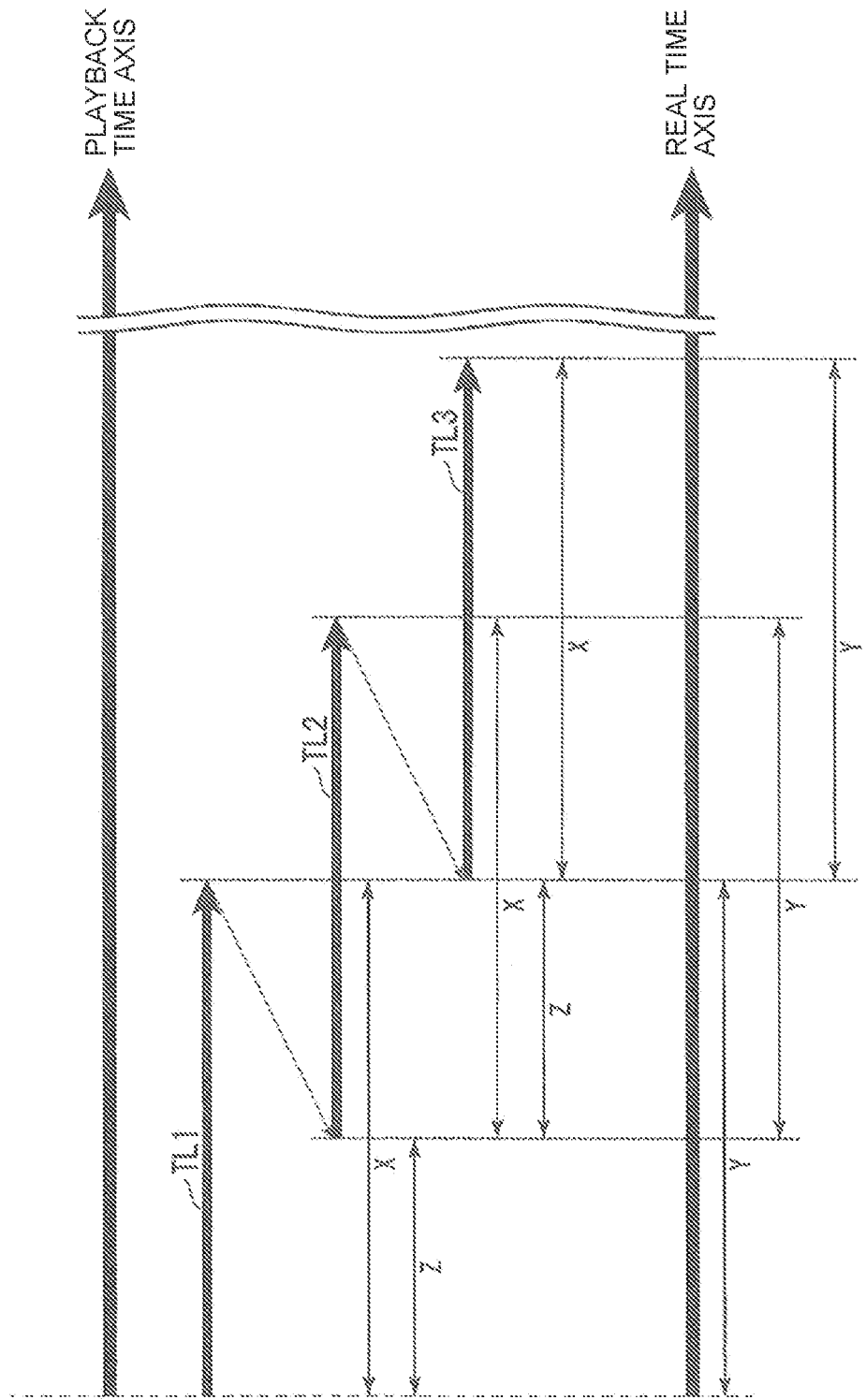
FIG. 23 is a diagram illustrating a relationship between a playback speed on a playback time axis of target content and a substantially real playback speed.

FIG. 23 is a diagram illustrating a relationship between a playback speed on a playback time axis of target content and the substantially real playback speed. Description of FIG. 23 will use, as an example, the repeated playback illustrated in FIG. 10. Each of periods X illustrated in FIG. 23 is a period in which a video of the target content is continuously displayed with no repeated playback performed by the client 300. In addition, a period Z illustrated in FIG. 23 is a period in which time on the playback time axis passes without turning back by one repeated playback performed in each period X. Therefore, a difference between the period X and the period Z matches the first duration-of-time in the example illustrated in FIG. 10. Therefore, a duration-of-time W1 on the playback time axis that elapses from the start to the end of the target content in one playback of the target content is expressed by the following formula (1).

$$W1 = Z \times (n-1) + X \qquad (1)$$

Here, n indicates the number of times of repeated playback performed in one playback of the target content. That is, n is an integer of 1 or more.

On the other hand, as illustrated in FIG. 23, when the period X elapses on the playback time axis, a period Y elapses in real time. Therefore, when the playback of the target content in which the repeated playback is performed n times is performed once, the time expressed by Y×n elapses on the real time axis.

Furthermore, a value P=(X/Y) obtained by dividing X by Y indicates how many times the speed of passage of time on the playback time axis with respect to the speed of passage of time on the real time axis. That is, P represents the factor described above. When P is 1, these speeds match, and the playback of the target content is performed at the normal playback speed. In contrast, when P is larger than 1, the target content is played at a high playback speed. Furthermore, in a case where P is smaller than 1, the target content is played at a low playback speed. The low playback speed represents the playback speed of the target content in a case where the above-described factor is smaller than 1.

From the above, it can be seen that, in a case where the target content including n repeated playbacks is played once, the user views the video of the target content displayed over the duration-of-time indicated by W1 described above over the time expressed by Y×n. From this, it can be seen that the value obtained by dividing W1 by Y×n represents the substantially real playback speed described above. Specifically, a substantially real playback speed W2 is expressed by the following Formula (2).

$$W2 = W1/(Y \times n) = (Z \times (n-1) + X)/(Y \times n) \quad (2)$$

<Process of Achieving Variable Substantially Real Playback Speed>

In a case where the target content is played by the repeated playback illustrated in FIG. 10, the control unit 340 can re-play the target content from the point-of-time desired by the user according to the operation received from the user. In such a case, for example, the control unit 340 may be configured to fix the point-of-time at which the playback of the target content is finished on the real time axis and to perform repeated playback by changing the substantially real playback speed described in FIG. 23.

In this case, when having started the playback of the target content, the control unit 340 calculates the point-of-time at which the playback of the target content ends among the points-of-time on the real time axis as the real end time based on the substantially real playback speed. The calculation of the real end time is performed on the premise that the control unit 340 does not newly set the point-of-time in the processing unit 310 by the operation received from the user. In a case where the control unit 340 has newly set the point-of-time in the processing unit 310 according to the operation received from the user, the control unit 340 calculates a difference between the calculated real end time and the time newly set in the processing unit 310 as a remaining playback time. The control unit 340 calculates first duration-of-time and second duration-of-time during which n times of repeated playback can be performed in the remaining playback time based on the remaining playback time and the number of times n of repeated playback. In this case, however, the control unit 340 calculates the first duration-of-time and the second duration-of-time by any one of a method of calculating the second duration-of-time while fixing the first duration-of-time, a method of calculating the first duration-of-time while fixing the second duration-of-time, and a method of calculating both the first duration-of-time and the second duration-of-time under a certain condition. Note that, in a case where a method of obtaining a plurality of solutions for the first duration-of-time and the second duration-of-time by such calculation is adopted, it is desirable to adopt a solution with a longer first duration-of-time. This is because reducing the first duration-of-time would increase the possibility that the user misses a scene that the user desires to view. The control unit 340 sets the calculated first duration-of-time and second duration-of-time in the client 300 as new first duration-of-time and second duration-of-time, and restarts the playback of the target content from the point-of-time. Note that the process of changing the substantially real playback speed in this manner is merely an example, and other methods may be used as long as the method is a method of changing the substantially real playback speed by fixing the point-of-time of finishing the playback of the target content on the real time axis.

In addition, the process of changing the substantially real playback speed in this manner may be applied to the repeated playback illustrated in FIGS. 19 to 21. The description of the method of applying the processes to the repeated playback illustrated in FIGS. 19 to 21 will be omitted because it is not only complicated, but the principle is the same as that of the method described above.

Note that, in a case where the playback of the target content is performed again from the point-of-time desired by the user according to the operation received from the user, the control unit 340 may change the point-of-time of finishing the playback of the target content on the real time axis by performing repeated playback n times from the point-of-time.

<Process of Generating Region of Interest (ROI) Information by Control Unit>

Hereinafter, process of generating a ROI by the control unit 340 will be described with reference to FIG. 24. In the embodiment, ROI information is information in which point-of-time information indicating the point-of-time on the playback time axis of the target content is associated with the position and orientation information indicating the position and orientation of the viewpoint at the point-of-time indicated by the point-of-time information. The control unit 340 may be configured to generate ROI information at the point-of-time when at least one of the position of the viewpoint and the orientation of the viewpoint has changed on the playback time axis in a case where the target content is played for the first time and configured to store the generated ROI information in the storage unit 360 as history information. With this configuration, in the second playback of the target content, the control unit 340 can allow the user to view the video of the target content from the viewpoint desired by the user at the time of the first playback of the target content at each point-of-time on the playback time axis without receiving an operation from the user based on the history information stored in the storage unit 360. Incidentally, the ROI information may be able to be generated in all periods on the playback time axis of the target content, or may be able to be generated in a part of the period on the playback time axis of the target content.

Figure 24:
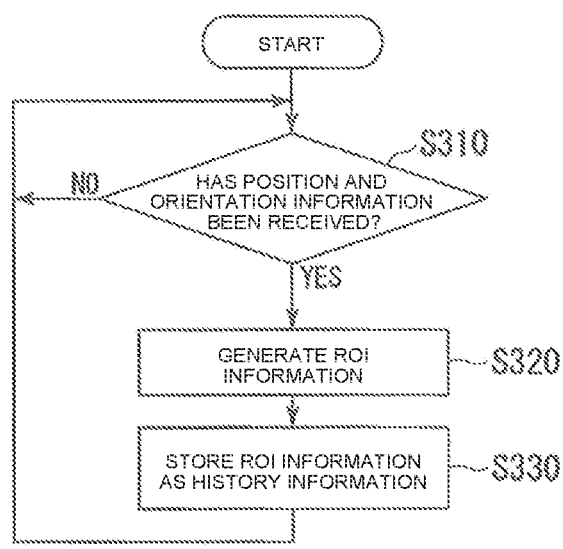
FIG. 24 is a diagram illustrating an example of a flow of processes in which the control unit 340 generates ROI information.

FIG. 24 is a diagram illustrating an example of a flow of processes in which a control unit 340 generates ROI information. The following is an exemplary case where playback of the target content is started at a timing before the process in Step S210 illustrated in FIG. 24 is performed. The processes of the flowchart illustrated in FIG. 24 are processes repeatedly performed during the playback of the target content.

The control unit 340 waits until reception of position and orientation information (Step S310).

When having determined that the position and orientation information is received (Step S310—YES), the control unit 340 generates ROI information (Step S320). More specifically, the control unit 340 specifies the current point-of-time on the playback time axis. Then, the control unit 340 generates ROI information in which the received position and orientation information is associated with point-of-time information indicating the specified point-of-time.

Next, the control unit 340 performs control to store the ROI information generated in Step S320 in the storage unit 360 as history information (Step S330). At this time, when the history information stored in the storage unit 360 includes history information including point-of-time information indicating the same point-of-time as the point-of-time indicated by the time information included in the ROI information, the control unit 340 deletes the history information and stores the ROI information as new history information. This means that, in a case where repeated playback is performed, the control unit 340 performs control to store, in the storage unit 360, history information indicating a history of the latest position and orientation of the viewpoint among the position and orientation of the viewpoint set in the processing unit 310 at each point-of-time on the playback time axis. Note that the control unit 340 may be configured to be able to prohibit the update of the history information by the new ROI information among the ROI information to be stored as the history information according to the operation received from the user. Furthermore, the control unit 340 may have a configuration in which history information including point-of-time information indicating a certain point-of-time on the playback time axis is to be stored in the plurality of storage units 360. In this case, the control unit 340 selects the history information desired by the user from the plurality of pieces of history information in the second playback of the target content based on the operation received from the user.

After execution of the process of Step S330, the control unit 340 proceeds to Step S310 and waits until the position and orientation information is received again.

As described above, the control unit 340 can generate ROI information and perform control to store the ROI information in the storage unit 360 as history information.

The ROI information may be associated with a predetermined point-of-time on the playback time axis of the target content in advance. That is, the ROI information may be included in a metadata file such as an MPD file, and the control unit 340 may acquire the ROI information through the metadata file. Hereinafter, for convenience of description, such ROI information will be referred to as first ROI information. The first ROI information is, for example, information for allowing the user to view the video in a three-dimensional virtual space from the position and orientation of the viewpoint desired by the creator of the target content at the point-of-time indicated by the point-of-time information included in the first ROI information. In this case, when having acquired the first ROI information from the metadata file, the control unit 340 sets the position and orientation of the viewpoint in the processing unit 310 based on the acquired first ROI information. Here, the first ROI information may include information indicating the point-of-time at which the application of the first ROI information ends. In the embodiment, applying the first ROI information means that the position and orientation of the viewpoint are brought into matching with the position and orientation of the viewpoint indicated by the position and orientation information included in the first ROI information. In addition, the process of changing the position and orientation of the viewpoint by the control unit 340 based on the received position and orientation information may be prioritized over the process of changing the position and orientation of the viewpoint by the control unit 340 based on the first ROI information.

<Process of Changing Position and Orientation of Viewpoint by Control Unit Based on First ROI Information>

Hereinafter, a process in which the control unit 340 changes the position and orientation of the viewpoint based on the first ROI information will be described with reference to FIG. 25. The following is as an exemplary case where the first ROI information includes information indicating the point-of-time at which the application of the first ROI information ends. Furthermore, the following will describe an exemplary a case where the process of changing the position and orientation of the viewpoint by the control unit 340 based on the received position and orientation information is prioritized over the process of changing the position and orientation of the viewpoint by the control unit 340 based on the first ROI information. In the embodiment, the first duration-of-time is shorter than the second duration-of-time. Therefore, the description of FIG. 25 will be a description that still holds with no change even when the control unit 340 performs repeated playback by acquiring the position and orientation information.

Figure 25:
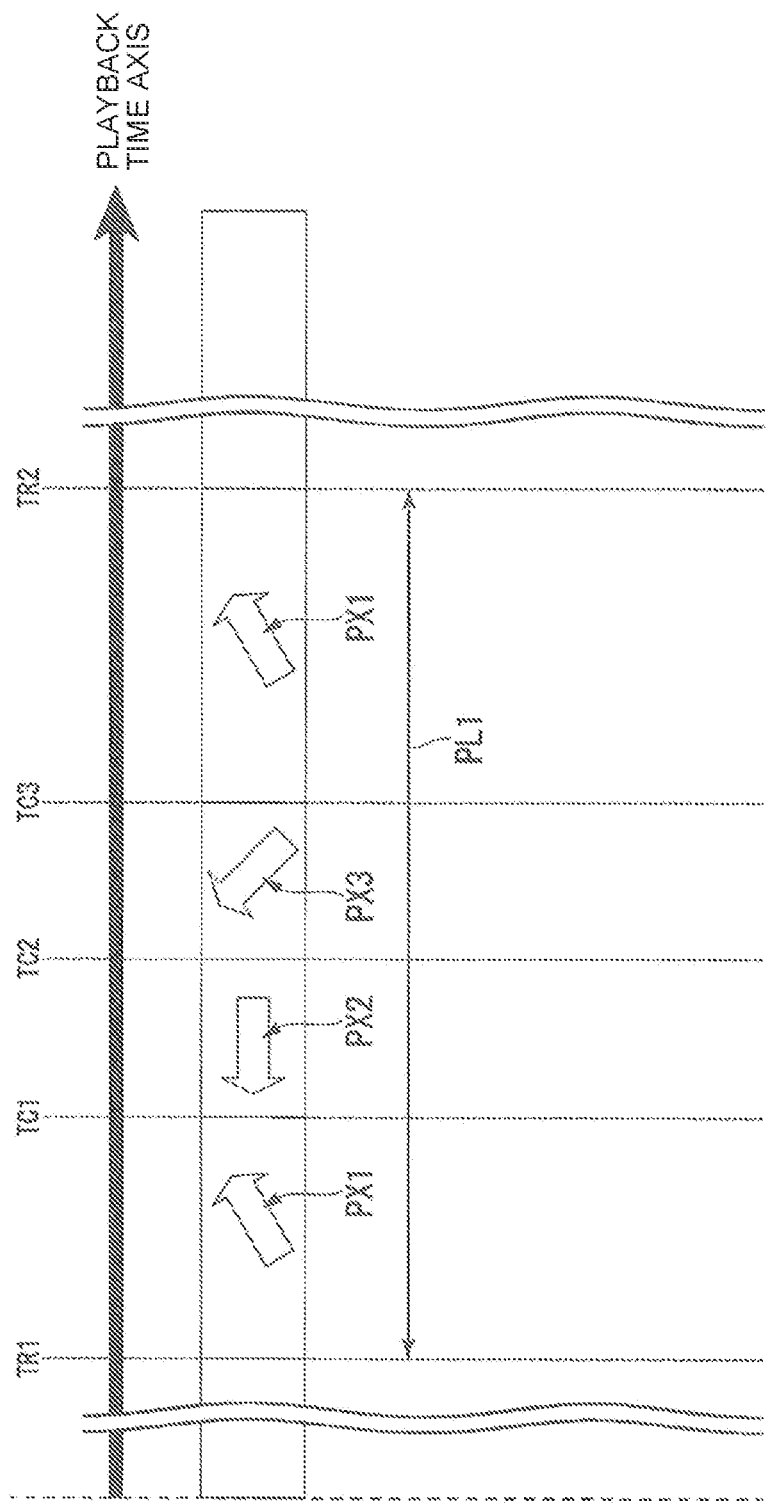
FIG. 25 is a diagram illustrating a position and orientation of a viewpoint at each point-of-time on a playback time axis, and a point-of-time on which the control unit 340 has changed the position and orientation of the viewpoint.

FIG. 25 is a diagram illustrating a position and orientation of a viewpoint at each point-of-time on a playback time axis, and a point-of-time on which the control unit 340 has changed the position and orientation of the viewpoint.

A point-of-time TR1 illustrated in FIG. 25 is an example of a point-of-time at which the control unit 340 has acquired the first ROI information and the control unit 340 sets, in the processing unit 310, the position and orientation of the viewpoint indicated by the position and orientation information included in the acquired first ROI information. In the example illustrated in FIG. 25, the position and orientation of the viewpoint have been changed to the position and orientation indicated by an arrow PX1 illustrated in FIG. 25 with the setting of the position and orientation of the viewpoint to the processing unit 310 by the control unit 340 at the point-of-time TR1. That is, the position and orientation indicated by the arrow PX1 indicate an example of the position and orientation of the viewpoint indicated by the position and orientation information included in the first ROI information. In addition, a point-of-time TR2 illustrated in FIG. 25 indicates an example of a point-of-time at which the application of the first ROI information ends. That is, the period PL1 illustrated in FIG. 25 illustrates an example of a period in which the first ROI information is applied on the playback time axis of the target content.

On the other hand, a point-of-time TC1 illustrated in FIG. 25 is an example of a point-of-time of reception of the position and orientation information by the control unit 340. In the example of FIG. 25, the process of changing the position and orientation of the viewpoint by the control unit 340 based on the received position and orientation information is prioritized over the process of changing the position and orientation of the viewpoint by the control unit 340 based on the first ROI information. Therefore, in this example, the position and orientation of the viewpoint have changed from the position and orientation of the viewpoint indicated by the arrow PX1 to the position and orientation of the viewpoint indicated by an arrow PX2 at the point-of-time TC1. The position and orientation of the viewpoint indicate an example of a point-of-time when the control unit 340 has set, in the processing unit 310, the position and orientation of the viewpoint indicated by the acquired position and orientation information.

In addition, a point-of-time TC2 illustrated in FIG. 25 is another example of a point-of-time of reception of the position and orientation information by the control unit 340. Due to the acquisition of such position and orientation information by the control unit 340, the position and orientation of the viewpoint have changed from the position and orientation of the viewpoint indicated by the arrow PX2 to the position and orientation of the viewpoint indicated by an arrow PX3 at the point-of-time TC2. The position and orientation of the viewpoint indicate an example of a point-of-time when the control unit 340 has set, in the processing unit 310, the position and orientation of the viewpoint indicated by the acquired position and orientation information.

In addition, a point-of-time TC3 illustrated in FIG. 25 indicates an example of a point-of-time of reception by the control unit 340 from the user within the period PL1, an operation of turning back the position and orientation of the viewpoint to the position and orientation of the viewpoint indicated by the position and orientation information included in the first ROI information. Having received the operation, the control unit 340 sets, in the processing unit 310, the position and orientation of the viewpoint indicated by the position and orientation information included in the first ROI information. With this configuration, the position and the orientation of the viewpoint turns back from the position and the orientation of the viewpoint indicated by the arrow PX3 to the position and the orientation of the viewpoint indicated by the arrow PX1 at the point-of-time TC3.

After passing the point-of-time TR2 on the playback time axis of the target content, the control unit 340 changes the position and orientation of the viewpoint by either acquiring the other first ROI information or acquiring the position and orientation information.

In this manner, in the control unit 340, the control unit 340 changes the position and orientation of the viewpoint based on the first ROI information. With this configuration, the client 300 can allow the user to view the video in the three-dimensional virtual space from the position and orientation of the viewpoint desired by the creator of the target content. Furthermore, even in the middle of user's viewing the video from the position and orientation of the viewpoint, the client 300 can allow the user to view the video from the position and orientation of the viewpoint desired by the user.

<Audio Data Playback Process Performed by Control Unit>

Figure 26:
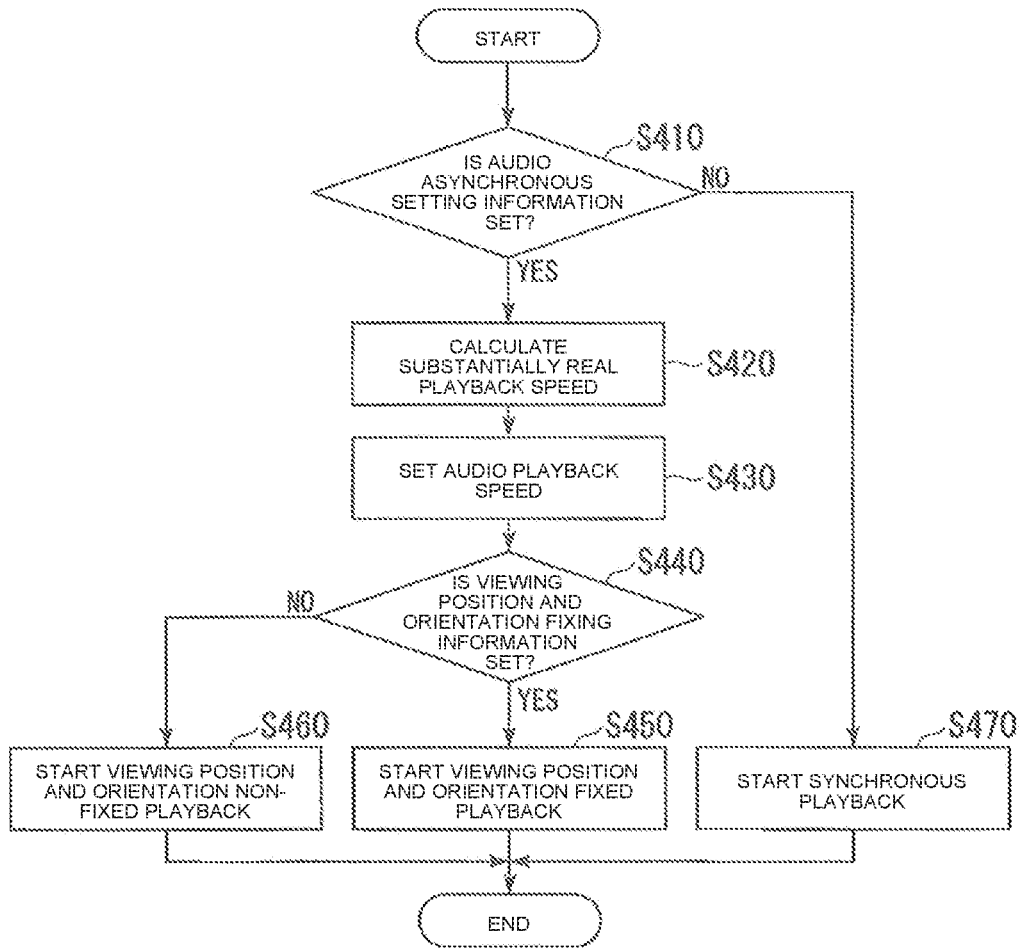
FIG. 26 is a diagram illustrating an example of a flow of processes in which the control unit 340 plays audio data.

Hereinafter, an audio data playback process performed by the control unit 340 will be described with reference to FIG. 26. FIG. 26 is a diagram illustrating an example of a flow of processes in which the control unit 340 plays audio data.

The following will be an exemplary case in which the client 300 has received, from the user, an operation of causing the client 300 to play the target content at a timing before execution of the process of Step S410 illustrated in FIG. 26. With this configuration, the control unit 340 sets, in the processing unit 310, the point-of-time at which the target content starts on the playback time axis. Furthermore, in the following, as an example, a case where the playback speed of the target content is a high playback speed will be described.

The control unit 340 determines whether audio asynchronous setting information is set in the client 300 (Step S410). The audio asynchronous setting information is information indicating a setting of not synchronizing a change in the point-of-time of the video of the target content with a change in the point-of-time of the audio data when the control unit 340 plays the target content.

In a case where the change in the point-of-time of the video of the target content and the change in the point-of-time of the audio data are synchronized with each other, when the point-of-time of the video proceeds from a point-of-time V1 to a point-of-time V2, the point-of-time of the audio data also proceeds from the point-of-time V1 to the point-of-time V2. Furthermore, in this case, when the point-of-time of the video turns back from the point-of-time V1 to a point-of-time V0 by repeated playback, the point-of-time of the audio data also turns back from the point-of-time V1 to the point-of-time V0. That is, in this case, when the audio data is output from the output device 400 at the same speed as the high playback speed of the video, and the point-of-time of the video on the playback time axis is turned back by the repeated playback, the point-of-time of the audio data (that is, sound) is also turned back in synchronization with the repeated playback of the video.

In contrast, in a case where the change in the point-of-time of the video of the target content and the change in the point-of-time of the audio data are not synchronized with each other, the point-of-time of the audio data does not necessarily proceed from the point-of-time V1 to the point-of-time V2 when the point-of-time of the video proceeds from the point-of-time V1 to the point-of-time V2. Furthermore, in this case, even when the point-of-time of the video turns back from the point-of-time V1 to the point-of-time V0 by repeated playback, the point-of-time of the audio data does not turn back. Furthermore, in this case, the speed at which the time of the audio data passes on the playback time axis does not necessarily match the speed at which the time of the video passes on the playback time axis. That is, in this case, even when the audio data is output from the output device 400 at a speed different from (or same as) the high playback speed of the video and the point-of-time of the video on the playback time axis has turned back by repeated playback, the point-of-time of the audio data (that is, sound) does not turn back.

In a case where the audio asynchronous setting information is set in the client 300, the control unit 340 does not synchronize the change in point-of-time of the video of the target content with the change in point-of-time of the audio data when the control unit 340 plays the target content. In contrast, in a case where the audio asynchronous setting information is not set in the client 300, the control unit 340 synchronizes the change in point-of-time of the video of the target content with the change in point-of-time of the audio data when the control unit 340 plays the target content.

When having determined that the audio asynchronous setting information is not set in the client 300 (Step S410-NO), the control unit 340 starts the synchronous playback together with the playback of the video of the target content (Step S470). The synchronous playback is a playback in which the audio processing unit 330 outputs audio data from the output device 400 while synchronizing the change in point-of-time of the audio data with the change in point-of-time of the video of the target content. After the playback of the target content is finished, the control unit 340 ends the process.

On the other hand, when having determined that the audio asynchronous setting information is set in the client 300 (Step S410—YES), the control unit 340 calculates the substantially real playback speed described above (Step S420).

Next, the control unit 340 sets the audio playback speed to the audio processing unit 330 (Step S430). Here, the control unit 340 sets the substantially real playback speed calculated in Step S420 as the audio playback speed. With this configuration, the client 300 can reduce the deviation between the point-of-time on the playback time axis of the video subjected to repeated playback and the point-of-time on the playback time axis of the audio data, and can suppress a monotonic increase of the deviation. Incidentally, the control unit 340 may be configured to set the audio playback speed set to the audio processing unit 330 to the same playback speed as the playback speed of the video of the target content instead of the substantially real playback speed, may be configured to set the same speed as the normal playback speed described above, or may be configured to set the speed according to the operation received from the user.

Next, the control unit 340 determines whether the viewing position and orientation fixing information is set in the client 300 (Step S440). The viewing position and orientation fixing information is information indicating that the audio processing unit 330 is controlled to output audio data from the output device 400 at a predetermined viewing position and viewing orientation in a three-dimensional virtual space when the control unit 340 plays the target content. In a case where the viewing position and orientation fixing information is set in the client 300, the audio processing unit 330 outputs the audio data from the output device 400 at a predetermined viewing position and viewing orientation in the three-dimensional virtual space according to the audio playback speed set in Step S430. In contrast, in a case where the viewing position and orientation fixing information is not set in the client 300, the audio processing unit 330 outputs the audio data from the output device 400 at a position and orientation of the viewpoint according to the audio playback speed set in Step S430.

Having determined that the viewing position and orientation fixing information is set in the client 300 (Step S440—YES), the control unit 340 starts the viewing position and orientation fixed playback (Step S450). The viewing position and orientation fixed playback is a playback in which the audio processing unit 330 outputs audio data from the output device 400 at a predetermined viewing position and viewing orientation in the three-dimensional virtual space. After the playback of the target content is finished, the control unit 340 ends the process.

In contrast, having determined that the viewing position and orientation fixing information is not set in the client 300 (Step S440-NO), the control unit 340 starts the viewing position and orientation non-fixed playback (Step S460). The viewing position and orientation fixed playback is a playback in which the audio processing unit 330 outputs audio data from the output device 400 at the position and orientation of the viewpoint at each point-of-time on the playback time axis. After the playback of the target content is finished, the control unit 340 ends the process.

Figure 27:
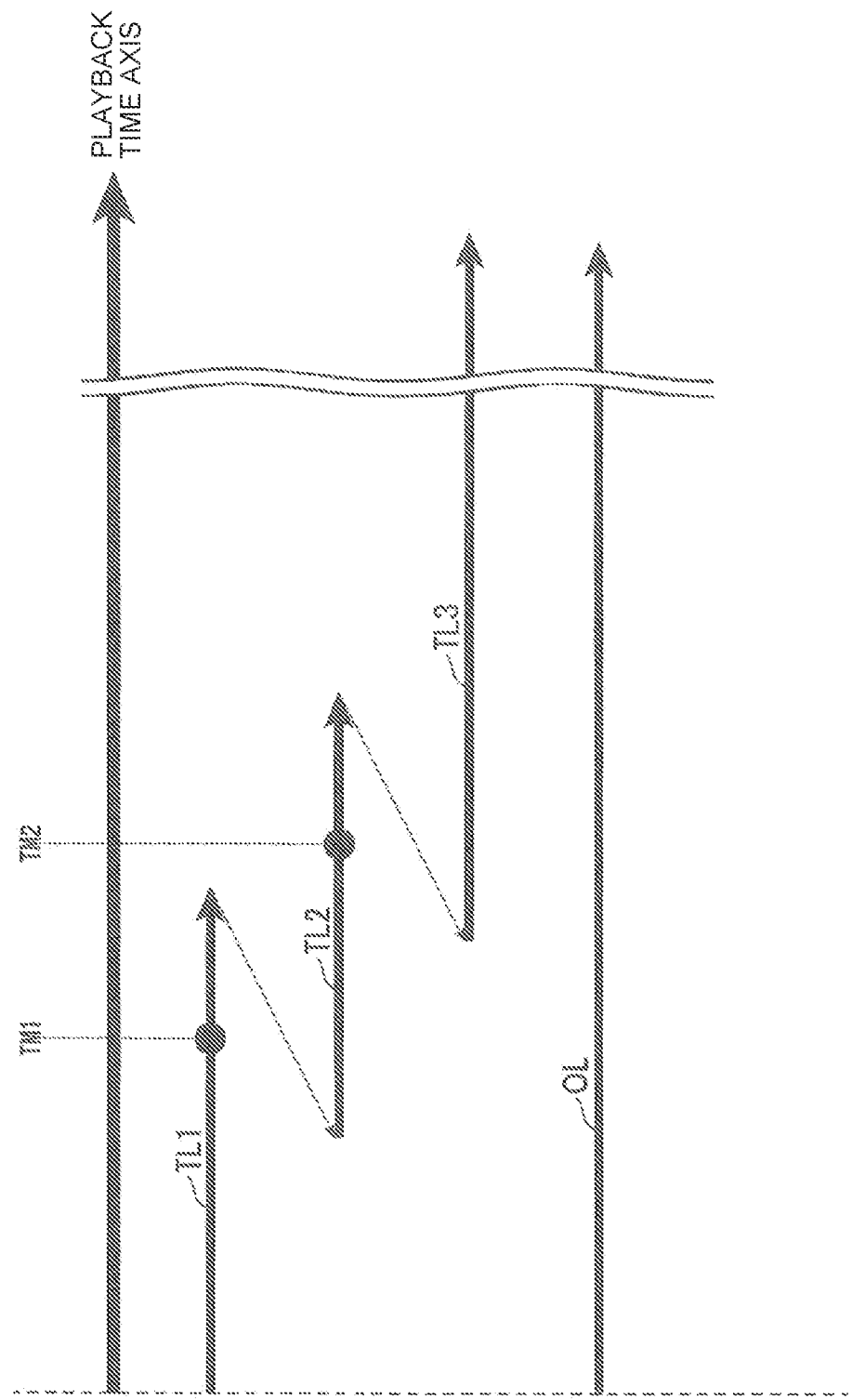
FIG. 27 is a diagram comparing a time passage of a video on a playback time axis of target content of repeated playback with a time passage on a playback time axis of audio data.

Here, FIG. 27 is a diagram comparing a time passage of a video on a playback time axis of target content of repeated playback with a time passage on a playback time axis of audio data. FIG. 27 illustrates, as an example, state of passage of time of the video in the repeated playback illustrated in FIG. 10. A period OL illustrated in FIG. 27 is an example of a period in which the audio data is continuously output from the output device 400 by the client 300. As illustrated in FIG. 27, the video of the target content undergoes repeated playback twice and turns back in time in each occasion. However, audio data is continuously output from the output device 400 according to the substantially real playback speed without being synchronized with the turning back of time due to the repeated playback performed twice. Therefore, in a case where the audio asynchronous setting information is set in the client 300, and in a case where the playback speed of the target content is the substantially real playback speed, the client 300 can reduce the difference between the passage of time of the video on the playback time axis and the passage of time of the audio data on the playback time axis. In addition, the client 300 can match the timing at which the playback of the video ends with the timing at which the output of the audio data ends. Furthermore, the substantially real playback speed can be set to a speed lower than the high playback speed of the video.

Therefore, in the client 300, the output of the audio data from the output device 400 according to the substantially real playback speed can improve the ease of sound recognition for the user. Furthermore, by such asynchronous playback, the client 300 can suppress output of discontinuously connected sound (may be referred to as noise), which is considered to be uncomfortable for the user, from the output device 400.

<Transmission Rate of Segment File from Distribution Server to Client>

Hereinafter, the transmission rate of the segment file from the distribution server 200 to the client 300 will be described.

As described above, in the client 300 that performs repeated playback, the video of the target content is played at a substantially real playback speed. Therefore, even when the playback speed of the target content is the high playback speed, the transmission rate of the segment file from the distribution server 200 to the client 300 is a transmission rate which is proportional to the substantially real playback speed and is lower than the transmission rate proportional to the high playback speed.

Figure 28:
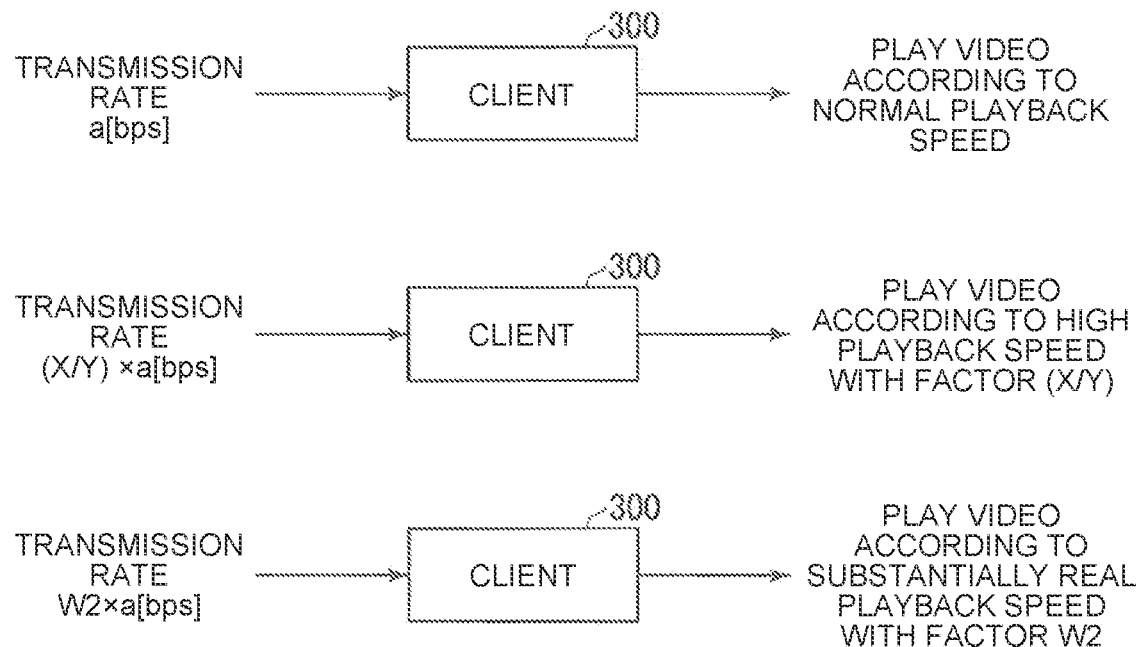
FIG. 28 is a diagram illustrating an example of a relationship between the playback speed of the target content and the transmission rate of a segment file from the distribution server 200 to the client 300.

FIG. 28 is a diagram illustrating an example of a relationship between the playback speed of the target content and the transmission rate of a segment file from the distribution server 200 to the client 300. In FIG. 28, transmission of a segment file with a bitrate of a[bps] will be described as an example. Furthermore, in FIG. 28, an exemplary a case where the bandwidth of the network 920 described above is greater than the transmission rate described in FIG. 28 will be described.

In the example illustrated in FIG. 28, in a case where the playback speed of the target content is the normal playback speed, the transmission rate of the segment file from the distribution server 200 to the client 300 is a value obtained by multiplying the bitrate a[bps] of the segment file by 1, that is, a[bps]. In contrast, as illustrated in FIG. 28, in a case where the repeated playback is not performed and the playback speed of the target content is the high playback speed, using (X/Y) as a factor of speed as described above, the transmission rate is calculated as a value obtained by multiplying the bitrate a[bps] by the factor (X/Y), that is, a×(X/Y) [bps]. In addition, in a case where the repeated playback is performed and the playback speed of the target content is the high playback speed, using the substantially real playback speed W2 as a factor of speed as described above, the transmission rate is calculated as a value obtained by multiplying the bitrate a[bps] by the substantially real playback speed W2, that is, a×W2 [bps]. Since the definition of W2 is described in the above formula (2), the description thereof is omitted here.

In this manner, the transmission rate of the segment file from the distribution server 200 to the client 300 changes in accordance with the playback speed of the target content in the client 300.

<Processes Performed by Image Processing Unit According to Bandwidth of Network>

Hereinafter, processes performed by the image processing unit 320 according to the bandwidth of the network 920 will be described.

Figure 29:
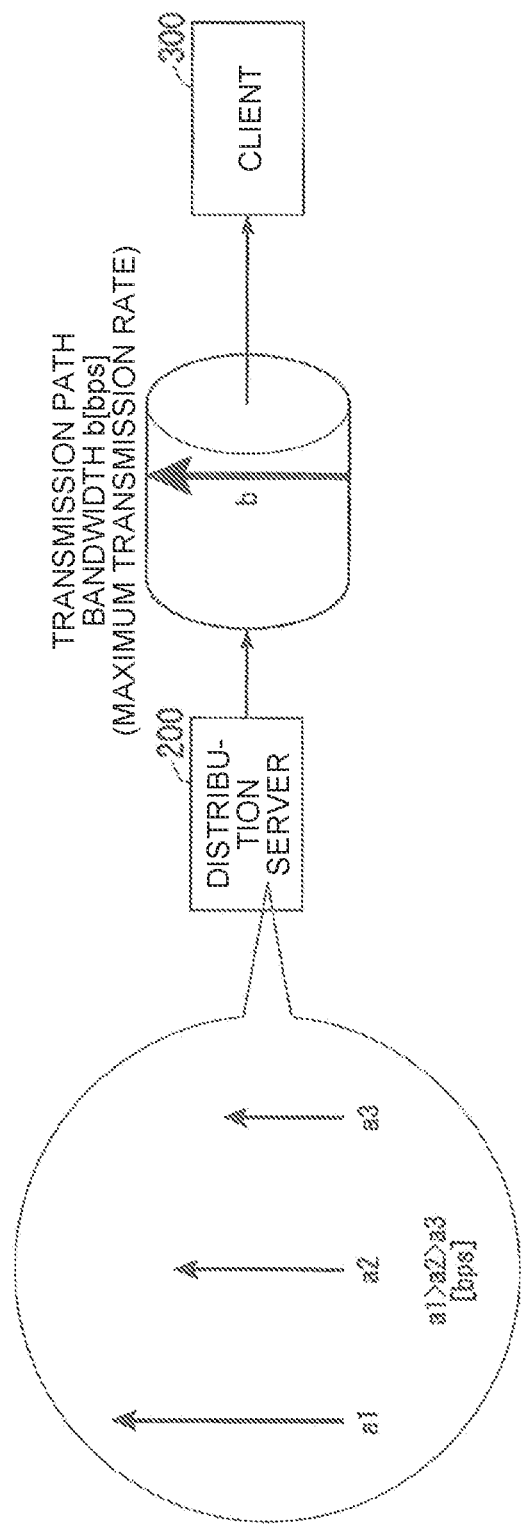
FIG. 29 is a diagram illustrating a state in which a plurality of segment files for each of two or more pieces of 6DoF content having different bitrates is stored in the distribution server 200 and a bandwidth of a network 920.

As illustrated in FIG. 29, the playback system 1 may have a configuration in which the distribution server 200 stores a plurality of segment files for each of two or more pieces of 6DoF content each having different bitrates.

FIG. 29 is a diagram illustrating a state in which a plurality of segment files for each of two or more pieces of 6DoF content having different bitrates is stored in the distribution server 200 and a bandwidth of a network 920. An arrow a1 illustrated in FIG. 29 indicates an example of the segment file of the target content having the highest bitrate among the plurality of pieces of target content. The length of the arrow a1 indicates the magnitude of the bitrate of the segment file. An arrow a2 illustrated in FIG. 29 indicates an example of the segment file of the target content having the second highest bitrate among the plurality of pieces of target content. The length of the arrow a2 indicates the magnitude of the bitrate of the segment file. An arrow a3 illustrated in FIG. 29 indicates an example of the segment file of the target content having the lowest bitrate among the plurality of pieces of target content. The length of the arrow a3 represents the magnitude of the bitrate of the segment file. A value obtained by multiplying the magnitudes of the bitrates by the above-described factor will be the transmission rate.

An arrow b illustrated in FIG. 29 indicates an example of the bandwidth of the network 920. The length of the arrow b represents the magnitude of the bandwidth.

Here, the transmission rate of the segment file from the distribution server 200 to the client 300 changes in accordance with the playback speed of the target content in the client 300, as described above. Therefore, the image processing unit 320 selects one or more segment files with the transmission rate not exceeding the bandwidth among the segment files stored in the distribution server 200 based on the transmission rate of the segment file and the bandwidth of the network 920. Subsequently, the image processing unit 320 selects one segment file having the highest bitrate from the selected one or more segment files. The image processing unit 320 acquires the selected segment file from the distribution server 200.

Figure 30A:
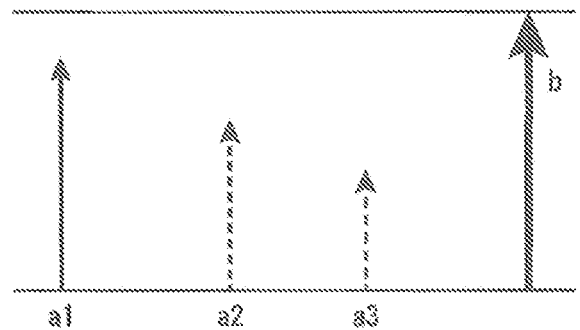
FIGS. 30A, 30B, and 30C are diagrams comparing a transmission rate and a bandwidth of each of three segment files having different bitrates.
Figure 30B:
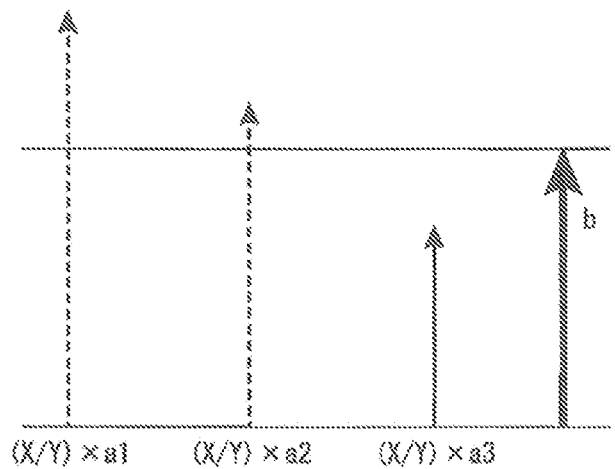
Figure 30C:
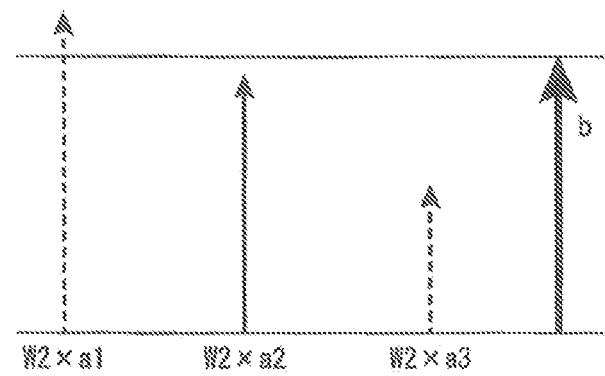

FIGS. 30A, 30B, and 30C are diagrams comparing a transmission rate and a bandwidth of each of three segment files having different bitrates. FIG. 30A is a diagram illustrating a case where the client 300 plays the target content at the normal playback speed. FIG. 30B is a diagram illustrating a case where the client 300 plays the target content at the high playback speed without performing repeated playback. FIG. 30C is a diagram illustrating a case where the client 300 plays the target content at the high playback speed while performing repeated playback.

In FIG. 30A, the image processing unit 320 selects and acquires a segment file having a bitrate of a1 [bps]. In FIG. 30B, the image processing unit 320 selects and acquires a segment file having a bitrate of a3[bps]. This is because the transmission rate of the segment file is (X/Y) x a3[bps], and only the transmission rate of the segment file is smaller than the bandwidth indicated by the arrow b (that is, the bandwidth of the network 920). In FIG. 30C, the image processing unit 320 selects and acquires a segment file having a bitrate of a2[bps]. This is because a2[bps] is a bitrate greater than a3[bps], the transmission rate of the segment file whose bitrate is a2[bps] is W2×a2[bps], and this transmission rate is smaller than the bandwidth.

By performing such process by the image processing unit 320, the client 300 can increase the quality of the video of the target content in accordance with the bandwidth of the network 920. As a result, the client 300 can provide a video with higher quality to the user.

<Processes of Improving Quality of Video when Client Performs Repeated Playback>

Hereinafter, processes of improving the quality of the video when the client 300 performs repeated playback will be described.

Here, the repeated playback illustrated in FIG. 19 will be described as an example. In the client 300, in the repeated playback illustrated in FIG. 19, when the period TL4 is referred to as a first video playback period and the period TL5 is referred to as a second video playback period, the first video playback period and the second video playback period have a period overlapping each other (for example, the period P2 in FIG. 22). Hereinafter, the period overlapping each other will be referred to as an overlapping period. The client 300 can improve the quality of the video in the overlapping period in the second playback period to be higher than the quality of the video in the overlapping period in the first playback period.

For example, in a case where the position and orientation information has been acquired at the point-of-time C4 illustrated in FIG. 19, the control unit 340 specifies whether a segment file having a higher bitrate exists in the distribution server 200 for the segment file used to generate the frame of the video in the first overlapping period. When having determined that a segment file having a higher bitrate exists in the distribution server 200, the control unit 340 controls the image processing unit 320 to perform a process of re-acquiring the segment file from the distribution server 200 within a period from the point-of-time C4 to the point-of-time C5 at which the third duration-of-time elapses (that is, a period from the point-of-time C13 to the point-of-time TM4 in FIG. 22). The image processing unit 320 re-acquires the segment file within the period, and generates a frame based on the re-acquired segment file. With this configuration, the control unit 340 can perform control to display a video with higher quality on the output device 400 in the second overlapping period. The repeated playback illustrated in FIG. 19 is performed in a case where the position and orientation of the viewpoint has changed. Therefore, there is a high possibility that the user desires to view the video in the second overlapping period with a video of higher quality. The client 300 can satisfy such a user's request by such a process of improving the quality of the video.

In addition, the segment file exists for each of objects in the three-dimensional virtual space. Therefore, the quality improvement of the video may be performed for each of the objects. For example, in a case where the playback of the video in the first overlapping period is compared with the playback of the video in the second overlapping period, there might be a change in the distance in the three-dimensional virtual space between the position of the viewpoint and each of the objects. By performing a process similar to the process of improving the quality of the video described above on a segment file of the object for which the distance becomes less than a predetermined threshold due to the change in the distance, the control unit 340 can control the image processing unit 320 to re-acquire the segment file of a higher bitrate.

Figure 31:
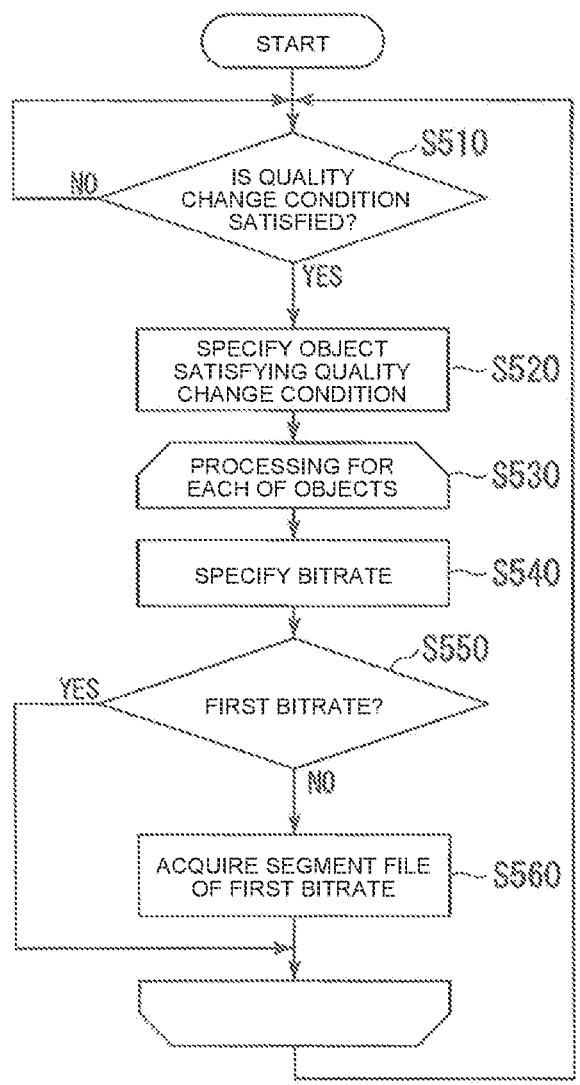
FIG. 31 is a diagram illustrating an example of a flow of processes of improving image quality for each object when the control unit 340 performs repeated playback.

FIG. 31 is a diagram illustrating an example of a flow of processes of improving image quality for each object when the control unit 340 performs repeated playback.

The following is an exemplary case where the control unit 340 calculates the distance between the position of the viewpoint after the change and the position of each object in the three-dimensional virtual space every time at least one of the position of the viewpoint and the orientation of the viewpoint changes. Furthermore, the following will describe as an exemplary case where the control unit 340 performs repeated playback every time the position and orientation information is acquired. In addition, for convenience of description, the following is a case where there are only two types of bitrates of the segment file for each object, that is, a first bitrate and a second bitrate. The first bitrate is a bitrate greater than the second bitrate. Furthermore, the processes of the flowchart illustrated in FIG. 31 are repeatedly performed while the client 300 plays the target content.

The control unit 340 waits until a quality change condition is satisfied (Step S510). Here, the quality change condition is a change of at least one of the distances between the position of the current viewpoint and the position of each of objects in the three-dimensional virtual space from a distance being a predetermined threshold or more to a distance less than the predetermined threshold. The quality change condition can be satisfied when the position of the viewpoint changes.

When having determined that the quality change condition is satisfied (Step S510—YES), the control unit 340 specifies one or more objects satisfying the quality change condition (Step S520).

Next, the control unit 340 specifies the bitrate of the segment file for the object for each of one or more objects specified in Step S520 (Step S530).

Next, the control unit 340 repeats the processes of Steps S540 to S560 for each of the one or more objects specified in Step S520 (Step S530).

The control unit 340 specifies the bitrate of the segment file for the object selected in Step S530 (Step S540).

Next, the control unit 340 determines whether the bitrate specified in Step S540 is the first bitrate (Step S550).

In a case where the bitrate specified in Step S540 is the first bitrate (Step S550—YES), the control unit 340 proceeds to Step S530 and selects the next object. Note that, in a case where there is no unselected object in Step S530, the control unit 340 proceeds to Step S510 and waits again until the quality change condition is satisfied.

In contrast, in a case where the bitrate specified in Step S540 is not the first bitrate (Step S550-NO), the control unit 340 controls the image processing unit 320 to perform a process of re-acquiring the segment file of the first bitrate for the object selected in Step S530 from the distribution server 200 (Step S560). With this process, the image processing unit 320 generates a frame based on the re-acquired segment file. After the process of Step S560 is performed, the control unit 340 proceeds to Step S530 and selects the next object. Note that, in a case where there is no unselected object in Step S530, the control unit 340 proceeds to Step S510 and waits again until the quality change condition is satisfied.

Figure 32:
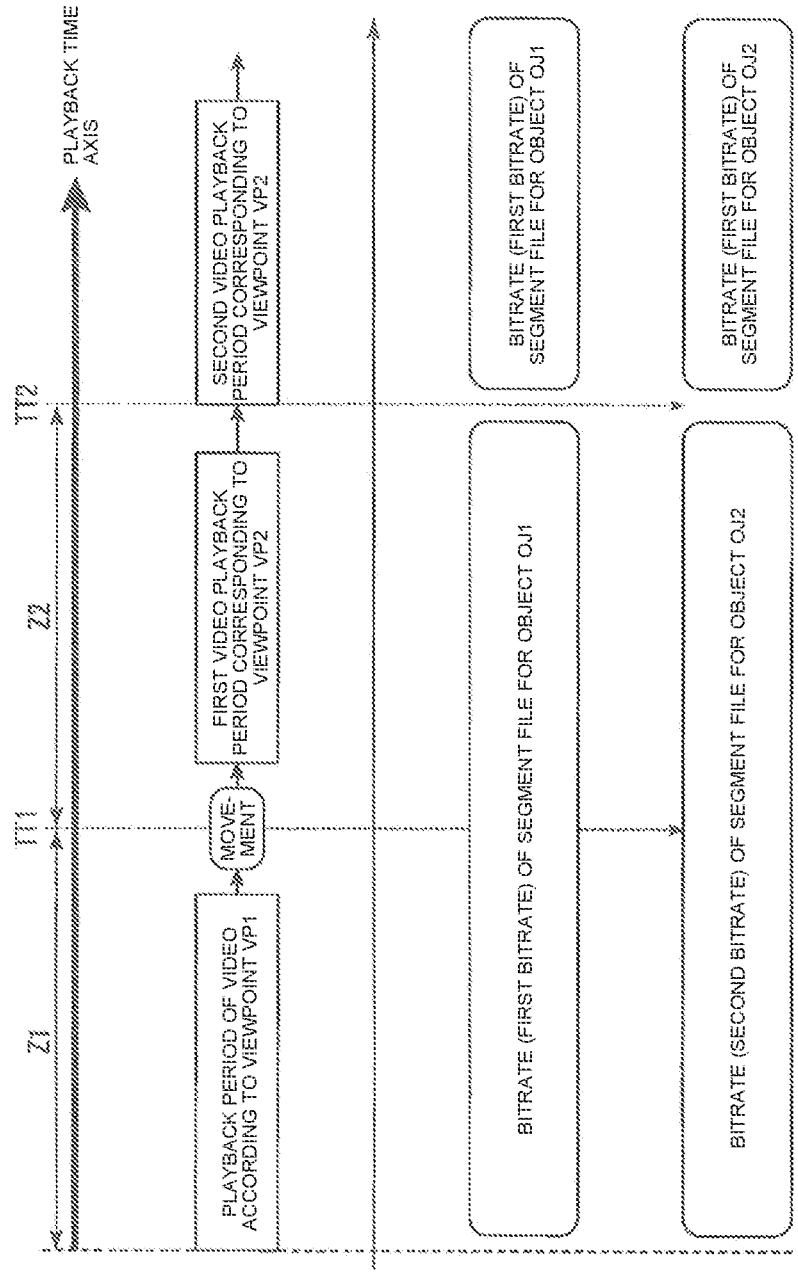
FIG. 32 is a diagram illustrating an example of a state of change in image quality of an object displayed on an output device 400 in a case where the control unit 340 performs the processes of the flowchart illustrated in FIG. 28.

Here, in a case where the control unit 340 performs the processes of the flowchart illustrated in FIG. 31, the image quality of the object displayed on the output device 400 changes as illustrated in FIG. 32, for example. FIG. 32 is a diagram illustrating an example of a state of change in image quality of an object displayed on an output device 400 in a case where the control unit 340 performs the processes of the flowchart illustrated in FIG. 31.

In the example illustrated in FIG. 32, within a period Z1 in which a video corresponding to a certain viewpoint VP1 is played, the viewpoint changes from the viewpoint VP1 to a viewpoint VP2 at a point-of-time TT1 on the playback time axis. In this case, within a period Z2 from the point-of-time TT1 until the third duration-of-time elapses, the video is played according to the viewpoint VP2. Then, the video in the period Z2 is played again in the second overlapping period. Accordingly, in FIG. 32, the period Z2 is illustrated as a first video playback period corresponding to the viewpoint VP2. Furthermore, in this example, the video playback period of the second overlapping period corresponding to the viewpoint VP2 starts from a point-of-time TT2 at which the period Z2 ends on the playback time axis.

At the time of repeated playback as illustrated in FIG. 32, for example, in a case where an object OJ1 (not illustrated) is specified as an object satisfying the above-described quality change condition at the point-of-time TT1, the control unit 340 specifies the bitrate of the segment file for the object OJ1 in Step S540. FIG. 32 illustrates the bitrates in the period Z1 and the period Z2. In the example illustrated in FIG. 32, the bitrates in the period Z1 and the period Z2 are the first bitrate. In this case, the control unit 340 does nothing as described with reference to FIG. 31. Therefore, as illustrated in FIG. 32, the bitrate of the segment file remains at the first bitrate even in the period after the point-of-time TT2.

Furthermore, at the time of repeated playback as illustrated in FIG. 32, for example, in a case where an object OJ2 (not illustrated) is specified as an object satisfying the above-described quality change condition at the point-of-time TT1, the control unit 340 specifies the bitrate of the segment file for the object OJ2 in Step S540. FIG. 32 illustrates the bitrates in the period Z1 and the period Z2. In the example illustrated in FIG. 32, the bitrates in the period Z1 and the period Z2 are the second bitrate. In this case, as described with reference to FIG. 31, the control unit 340 controls the image processing unit 320 to perform the process of re-acquiring the segment file of the first bitrate for the object OJ2 from the distribution server 200. Therefore, as illustrated in FIG. 32, the bitrate of the segment file for the object OJ2 has changed to the first bitrate in the period after passing the point-of-time TT2.

In this manner, the client 300 performs the process of improving the image quality of each object when performing repeated playback. With this configuration, the client 300 can provide the user with a high image quality video of the object in which the user pays attention.

Figures 33, 34, 35:
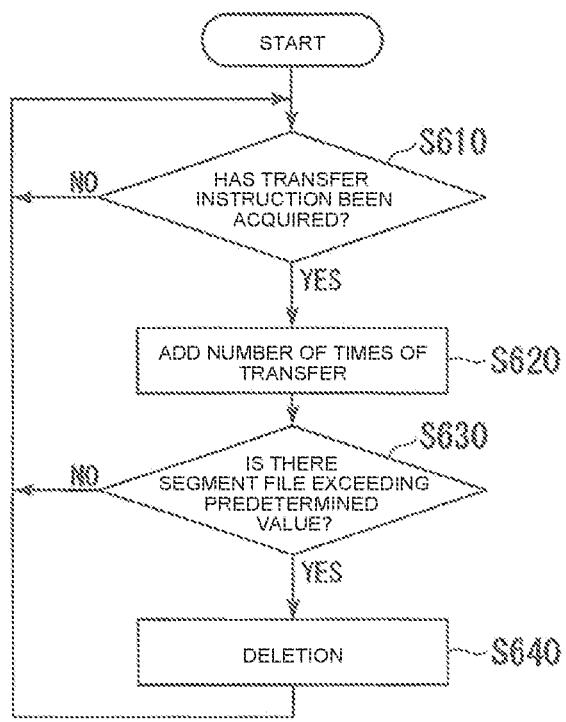
FIG. 33 is a diagram illustrating an example of a relationship between a low bitrate file, a difference file, and a segment file of a first bitrate.
FIG. 34 is a diagram illustrating an example of Management table 2.
FIG. 35 is a diagram illustrating an example of a flow of processes in which the control unit 340 manages segment files stored in a segment file buffer 322 using Management table 2.

Note that such a process of improving the quality of the video is also applicable to a case where the segment file for a certain object includes a low bitrate file at the second bitrate and a difference file corresponding to the low bitrate file. As illustrated in FIG. 33, the difference file is a file that, by being decoded together with the low bitrate file, is capable of generating an object having a quality similar to the object based on the segment file of the first bitrate. FIG. 33 is a diagram illustrating an example of a relationship between a low bitrate file, a difference file, and a segment file of the first bitrate. Such a low bitrate file and a difference file can be realized by a data coding method referred to as scalable coding, hierarchical coding, progressive coding, or the like. In scalable coding, a segment file of a first bitrate is decomposed into base data and difference data and each of the pieces of data are coded. The coded base data is the above-described low bitrate file. The result of coding of the difference data is the above-described difference file. A low bitrate file is a file that can be independently decoded without other files, and can generate, by decoding, an object with low image quality (that is, an object having a quality similar to that of the object based on the segment file of the second bitrate). In contrast, the difference file cannot be independently decoded and thus, by decoding the difference file together with a low bitrate file, it is possible to generate a high image quality object (that is, an object having a quality similar to that of the object based on the segment file of the first bitrate).

Here, examples of applying scalable coding to objects include mesh data and point cloud compression (PCC) data.

For example, in a case where the model data constituting the object is constituted by mesh data, the model data can be divided into two datasets, namely, a coarse base mesh dataset and a fine dataset and stored in this divided states in the distribution server 200. The coarse mesh dataset corresponds to the above-described low bitrate file, and the fine dataset corresponds to the above-described difference file. The client 300 can reconstruct a coarse mesh with the acquisition of only the base mesh dataset. Furthermore, by acquiring the fine dataset at the time of repeated playback, the client 300 can generate original high-definition mesh data. The fine dataset has a data size smaller than that of high-definition mesh data. Therefore, the client 300 can acquire the fine dataset from the distribution server 200 in a short time.

A case where the model data forming the object data is constituted with Video-based Point Cloud Compression (V-PCC) data is described in detail in Non Patent Literature 2 to 4, and thus description thereof is omitted. In this case, in the first playback in a certain period on the playback time axis, the client 300 acquires a dataset of a 6-plane projection plane with a low bitrate or a part of the dataset. At this time, by suppressing the client 300 from acquiring the information of the point invisible from the position and orientation of the viewpoint at the time of the first playback in the overlapping period among the points included in the data set, the client 300 does not need to acquire the entire data set of six surfaces in some cases. Therefore, in the second and subsequent playback in the overlapping period, the client 300 acquires difference data (all or part of data set of additional four surfaces) such that the video viewed from the position and orientation of the viewpoint after the viewpoint will have higher quality. Consequently, the client 300 can generate a higher-quality object with less holes formed in the object surface based on both the already-acquired surface data set and the newly acquired surface data set.

<Process of Client's Reusing Segment File in Repeated Playback>

Hereinafter, a process in which the client 300 reuses the acquired segment file in the repeated playback will be described.

In execution of repeated playback, the control unit 340 can also control the image processing unit 320 to re-acquire the segment file from the distribution server 200. This is because the segment file transferred to the file parsing unit 323 among the segment files stored in the segment file buffer 322 is deleted immediately after being transferred. However, such re-acquisition of the segment file might slow down the response speed of display of the video on the output device 400 in repeated playback. Therefore, in the client 300, the segment file buffer 322 may be configured to continue storing the segment file after being transferred to the file parsing unit 323. However, in this case, with no management, the number of segment files stored in the segment file buffer 322 would monotonically increase. To handle this, the control unit 340 manages the segment file buffer in the segment file buffer 322 based on Management table 2 as illustrated in FIG. 34.

FIG. 34 is a diagram illustrating an example of Management table 2. As illustrated in FIG. 34, Management table 2 is information in which the segment identification information described above is associated with transfer count information for the segment file indicated by the segment identification information. The transfer count information for a certain segment file is information indicating the number of times the segment file has been transferred from the segment file buffer 322 to the file parsing unit 323. When the segment file is stored in the segment file buffer 322, the control unit 340 adds a record of the segment file to Management table 2. The record includes the segment identification information and transfer count information associated with the segment identification information. The transfer count information is "0" at a timing before the segment file is transferred to the file parsing unit 323. In the example illustrated in FIG. 34, the transfer count information associated with the segment identification information of "s004.m4s" is "0". That is, this means that the segment file indicated by the segment identification information has never been transferred to the file parsing unit 323. Subsequently, when one of the segment files indicated by the segment identification information stored in the segment file buffer 322 has been transferred to the file parsing unit 323, the control unit 340 updates the transfer count information associated with the segment identification information indicating the segment file transferred to the file parsing unit 323. Specifically, the control unit 340 replaces the transfer count information associated with the segment identification information with transfer count information indicating a value obtained by adding 1 to the value indicated by the transfer count information.

When the value indicated by the transfer count information associated with a certain segment identification information exceeds a predetermined value, the control unit 340 deletes the segment file indicated by the segment identification information from the segment file buffer 322. In this case, the control unit 340 deletes the record including the segment identification information from Management table 2. In this manner, the control unit 340 manages the segment file stored in the segment file buffer 322. Furthermore, since the segment file is stored in the segment file buffer 322 in this manner, the control unit 340 can control the image processing unit 320 to re-acquire a necessary segment file from the segment file buffer 322 without causing the image processing unit 320 to re-acquire the segment file when performing repeated playback.

Here, FIG. 35 is a diagram illustrating an example of a flow of processes in which the control unit 340 manages segment files stored in a segment file buffer 322 using Management table 2. The control unit 340 repeats the processes of the flowchart illustrated in FIG. 35 during the playback of the target content.

The control unit 340 waits until the image processing unit 320 acquires an instruction to transfer the segment file stored in the segment file buffer 322 to the file parsing unit 323 from the segment file selection control unit 313 (Step S610).

When having determined that the image processing unit 320 has acquired an instruction to transfer the segment file stored in the segment file buffer 322 to the file parsing unit 323 from the segment file selection control unit 313 (Step S610—YES), the control unit 340 waits until the image processing unit 320 performs a process of transferring the segment file according to the instruction from the segment file buffer 322 to the file parsing unit 323. After the process is performed, the control unit 340 specifies a record including the segment identification information indicating the segment file from Management table 2. The control unit 340 replaces the transfer count information included in the specified record with transfer count information indicating a value obtained by adding 1 to the value indicated by the transfer count information. That is, the control unit 340 adds the number of times of transfer of the segment file to Management table 2 (Step S620).

Next, the control unit 340 determines whether there is a segment file exceeding a predetermined value in Management table 2 (Step S630). The segment file exceeding the predetermined value is a segment file indicated by the segment identification information associated with the transfer count information indicating the number of times of transfer exceeding the predetermined value.

When having determined that there is no segment file exceeding the predetermined value in Management table 2 (Step S630-NO), the control unit 340 proceeds to Step S610 and waits again until the image processing unit 320 acquires an instruction to transfer the segment file stored in the segment file buffer 322 to the file parsing unit 323 from the segment file selection control unit 313.

In contrast, when having determined that there is a segment file exceeding the predetermined value in Management table 2 (Step S630—YES), the control unit 340 deletes the segment file exceeding the predetermined value from the segment file buffer 322 (Step S640). In addition, the control unit 340 deletes the record including the segment identification information indicating the segment file exceeding the predetermined value from Management table 2. Subsequently, the control unit 340 proceeds to Step S610, and waits again until the image processing unit 320 acquires an instruction to transfer the segment file stored in the segment file buffer 322 to the file parsing unit 323 from the segment file selection control unit 313.

By managing the segment file stored in the segment file buffer 322 according to Management table 2, the client 300 can improve the response speed of the display of the video on the output device 400 in the repeated playback.

Note that the segment file described above is an example of a file. That is, the target content may be divided into files of other formats instead of the segment file. In this case, the segment file described above is replaced with a file of another format.

Furthermore, the present disclosure can be configured as follows.

(1)

A playback device that performs playback of six degrees of freedom (6DoF) content according to a received operation, the 6DoF content being information representing each of: a three-dimensional virtual space whose state changes in synchronization with a change in point-of-time on an associated playback time axis; and a virtual object arranged in the three-dimensional virtual space, the playback device comprising:

a processing unit that generates a video in which frames from the point-of-time that has been set are arranged in chronological order based on at least a part of the acquired 6DoF content, based on a set position and orientation, that is, a position and orientation of a viewpoint in the three-dimensional virtual space, and based on the set point-of-time; and a control unit that sets the point-of-time in the processing unit according to the received operation, extracts the frame generated by the processing unit according to a set playback speed, and displays the extracted frames on a display unit in chronological order, wherein the control unit, when having acquired identification information, calculates a first point-of-time obtained by turning back a time from a current point-of-time for a first duration-of-time satisfying a first predetermined condition on the playback time axis based on the acquired identification information, and newly sets the calculated first point-of-time in the processing unit, and the processing unit generates a video in which the frames from the first point-of-time are arranged in chronological order based on at least a part of the acquired 6DoF content, the set position and orientation of the viewpoint, and the first point-of-time newly set by the control unit.

(2)

The playback device according to (1), wherein the playback speed is a high playback speed obtained by multiplying a normal playback speed by a factor received from a user.

(3)

The playback device according to (1) or (2), wherein, when having received position and orientation information indicating a position and orientation of the viewpoint, the control unit further performs a viewpoint alteration process of setting the position and orientation of the viewpoint indicated by the received position and orientation information in the processing unit.

(4)

The playback device according to (3), wherein the control unit does not perform the viewpoint alteration process when having not received the position and orientation information indicating the position and orientation of the viewpoint.

(5)

The playback device according to any one of (1) to (4), wherein, when having acquired the identification information, the control unit repeatedly performs: calculating the first point-of-time every time a second duration-of-time satisfying a second predetermined condition elapses on the playback time axis within a target period corresponding to the identification information in a period on the playback time axis; and newly setting the calculated first point-of-time in the processing unit.

(6)

The playback device according to (5), wherein the first duration-of-time is shorter than the second duration-of-time.

(7)

The playback device according to (5) or (6), wherein the target period is a period from a point-of-time at which the 6DoF content starts to a point-of-time at which the 6DoF content ends on the playback time axis.

(8)

The playback device according to (5) or (6), wherein the target period is a part of a period from a point-of-time at which the 6DoF content starts to a point-of-time at which the 6DoF content ends on the playback time axis.

(9)

The playback device according to any one of (1) to (8), wherein, when having acquired the identification information, the control unit newly sets the first point-of-time in the processing unit after a third duration-of-time satisfying a third predetermined condition has elapsed from a third point-of-time of acquisition of the identification information on the playback time axis.

(10)

The playback device according to (9), wherein the 6DoF content is divided into files representing each of the three-dimensional virtual space and the object according to each of a plurality of time zones in a case where a time on the playback time axis is divided into the plurality of time zones, and the processing unit includes:

a file selection control unit that selects, in chronological order, the files arranged in chronological order from the set point-of-time; and an image processing unit that generates a video in which the frames according to the files are arranged in chronological order for each of the files selected in chronological order by the file selection control unit, based on the files, the set position and orientation of the viewpoint, and the set point-of-time, and the third predetermined condition is a condition that the third duration-of-time is a duration-of-time between: a point-of-time associated with the frame located at a boundary between the file corresponding to the frame associated with the third point-of-time and the next file arranged in chronological order: and the third point-of-time.

(11)

The playback device according to any one of (1) to (9), wherein the 6DoF content is divided into files representing each of the three-dimensional virtual space and the object according to each of a plurality of time zones in a case where a time on the playback time axis is divided into the plurality of time zones, and the processing unit includes:

a file selection control unit that selects, in chronological order, the files arranged in chronological order from the set point-of-time; and an image processing unit that generates a video in which the frames according to the files are arranged in chronological order for each of the files selected in chronological order by the file selection control unit, based on the files, the set position and orientation of the viewpoint, and the set point-of-time.

(12)

The playback device according to (11), wherein the image processing unit acquires the file selected by the file selection control unit by a method according to a playback quality indicated by playback quality information that has been set.

(13)

The playback device according to (12), wherein the image processing unit includes a buffer that stores the acquired file and holds the file before the frame is generated by the image processing unit as well as one or more files after the frame has been generated by the image processing unit, and in a case where the playback quality information indicating that a response speed is prioritized over a playback quality of the video has been set, and after the first point-of-time is newly set by the control unit, the image processing unit generates a video in which the frames from the first point-of-time are arranged in chronological order based on the files stored in the buffer.

(14)

The playback device according to (13), wherein the control unit deletes the file satisfying a predetermined deletion condition from the buffer among one or more of the files held in the buffer.

(15)

The playback device according to (12), wherein a distribution server stores the plurality of files for each of the two or more pieces of the 6DoF content having mutually different bitrates, and in a case where the playback quality information indicating that the quality of the video is prioritized over a response speed has been set and after the first point-of-time is newly set by the control unit, the image processing unit acquires, from the distribution server in chronological order, the files of a bitrate according to the set position and orientation of the viewpoint and the position and orientation of one or more of the objects in the three-dimensional virtual space among the files selected by the file selection control unit, and then generates, for each of the acquired files, a video in which the frames according to the files are arranged in chronological order, based on the file, the set position and orientation of the viewpoint, and the set point-of-time.

(16)

The playback device according to any one of (1) to (15), wherein the playback speed is a high playback speed obtained by multiplying a normal playback speed by a factor received from a user, and the control unit extracts the frames generated by the processing unit at intervals corresponding to the set playback speed, and displays the extracted frames on the display unit in chronological order, and in a case where the first point-of-time is newly set, the control unit preferentially extracts the frames having a small number of times of extraction among the frames generated by the processing unit, and performs control to display the extracted frames on the display unit in chronological order.

(17)

The playback device according to any one of (1) to (16), wherein the control unit performs control to store, in a storage unit, history information indicating a latest history of the position and orientation of the viewpoint among the position and orientation of the viewpoint set in the processing unit at each point-of-time on the playback time axis, and sets, at second or subsequent playback of the 6DoF content, the position and orientation of the viewpoint in the processing unit at each point-of-time on the playback time axis based on the history information stored in the storage unit.

(18)

The playback device according to any one of (1) to (17), wherein the playback speed is a high playback speed obtained by multiplying a normal playback speed by a factor received from a user, the 6DoF content is also information indicating a sound that changes in synchronization with a change in point-of-time on the playback time axis, the sound is a sound at each position in the three-dimensional virtual space, the processing unit generates audio data in which audio waveforms from the set point-of-time are arranged in chronological order based on at least a part of the acquired 6DoF content, the set position and orientation of the viewpoint, and the set point-of-time, and the control unit performs control to output the audio data generated by the processing unit from an audio output unit at the normal playback speed.

(19)

The playback device according to any one of (1) to (18), wherein the identification information is information identifying that at least one of the position of the viewpoint and the orientation of the viewpoint has changed.

(20)

The playback device according to any one of (1) to (18), wherein the identification information is information indicating at least one of each of one or more predetermined points-of-time on the playback time axis and each of one or more predetermined periods on the playback time axis, and is information associated with the 6DoF content.

Although the embodiment of the present disclosure has been described in detail with reference to the drawings, the specific configuration is not limited to this embodiment, and may be altered, replaced, deleted, or the like without departing from the scope and spirit of the present disclosure.

REFERENCE SIGNS LIST

1 PLAYBACK SYSTEM
100 GENERATION DEVICE
110 GENERATION UNIT
111 IMAGE STREAM ENCODING UNIT
112 AUDIO STREAM ENCODING UNIT
113 CONTENT FILE GENERATION UNIT
114 METADATA FILE GENERATION UNIT
120, 220, 340 CONTROL UNIT
130, 230, 350 COMMUNICATION UNIT
140, 240, 360 STORAGE UNIT
151 STITCHING PROCESSING UNIT
152 ENCODER
153 STORAGE
200 DISTRIBUTION SERVER
300, 300A, 300B, 300C CLIENT
310 PROCESSING UNIT
311 METADATA FILE ACQUISITION UNIT
312 METADATA FILE PROCESSING UNIT
313 SEGMENT FILE SELECTION CONTROL UNIT
320 IMAGE PROCESSING UNIT
321 SEGMENT FILE ACQUISITION UNIT
322 SEGMENT FILE BUFFER
323 FILE PARSING UNIT
324 SAMPLE BUFFER
325 IMAGE DECODING UNIT
326 DECODED DATA BUFFER
327 RENDERING UNIT
330 AUDIO PROCESSING UNIT
331 SEGMENT FILE ACQUISITION UNIT
332 SEGMENT FILE BUFFER
333 FILE PARSING UNIT
334 SAMPLE BUFFER
335 AUDIO DECODING UNIT
336 DECODED DATA BUFFER
337 AUDIO RENDERING UNIT
400, 400A, 400B, 400C OUTPUT DEVICE
500 COMMUNICATION NETWORK
900 INFORMATION PROCESSING DEVICE
904 BRIDGE
904a HOST BUS
904b EXTERNAL BUS
905 INTERFACE
906 INPUT DEVICE
907 OUTPUT DEVICE
908 STORAGE DEVICE
909 DRIVE
911 CONNECTION PORT
913 COMMUNICATION DEVICE
915 SENSOR
920 NETWORK

The invention claimed is:

1. A playback device that performs playback of six degrees of freedom (6DoF) content according to a received operation,
the 6DoF content being information representing each of:
a three-dimensional virtual space whose state changes in synchronization with a change in point-of-time on an associated playback time axis; and a virtual object arranged in the three-dimensional virtual space,
the playback device comprising:
a processing unit that generates a video in which frames from the point-of-time that has been set are arranged in chronological order based on at least a part of the 6DoF content, based on a set position and orientation, that is, a position and orientation of a viewpoint in the three-dimensional virtual space, and based on the set point-of-time; and
a control unit that sets the point-of-time in the processing unit according to the received operation, extracts the frame generated by the processing unit according to a set playback speed, and displays the extracted frames on a display unit in chronological order,
wherein
the control unit, when having acquired identification information, calculates a first point-of-time obtained by turning back a time from a current point-of-time for a first duration-of-time satisfying a first predetermined condition on the associated playback time axis based on the acquired identification information, and newly sets the calculated first point-of-time in the processing unit, and
the processing unit generates a video in which the frames from the first point-of-time are arranged in chronological order based on at least a part of the 6DoF content, the set position and orientation of the viewpoint, and the first point-of-time newly set by the control unit.

2. The playback device according to claim 1, wherein the playback speed is a high playback speed obtained by multiplying a normal playback speed by a factor received from a user.

3. The playback device according to claim 1, wherein, when having received position and orientation information indicating a position and orientation of the viewpoint, the control unit further performs a viewpoint alteration process of setting the position and orientation of the viewpoint indicated by the received position and orientation information in the processing unit.

4. The playback device according to claim 3, wherein the control unit does not perform the viewpoint alteration process when having not received the position and orientation information indicating the position and orientation of the viewpoint.

5. The playback device according to claim 1, wherein, when having acquired the identification information, the control unit repeatedly performs: calculating the first point-of-time every time a second duration-of-time satisfying a second predetermined condition elapses on the associated playback time axis within a target period corresponding to the identification information in a period on the associated playback time axis; and newly setting the calculated first point-of-time in the processing unit.

6. The playback device according to claim 5, wherein the first duration-of-time is shorter than the second duration-of-time.

7. The playback device according to claim 5, wherein the target period is a period from a point-of-time at which the 6DoF content starts to a point-of-time at which the 6DoF content ends on the associated playback time axis.

8. The playback device according to claim 5, wherein the target period is a part of a period from a point-of-time at which the 6DoF content starts to a point-of-time at which the 6DoF content ends on the associated playback time axis.

9. The playback device according to claim 1,
wherein, when having acquired the identification information, the control unit newly sets the first point-of-time in the processing unit after a third duration-of-time satisfying a third predetermined condition has elapsed from a third point-of-time of acquisition of the identification information on the associated playback time axis.

10. The playback device according to claim 9,
wherein the 6DoF content is divided into files representing each of the three-dimensional virtual space and the object according to each of a plurality of time zones in a case where a time on the associated playback time axis is divided into the plurality of time zones, and
the processing unit includes:
a file selection control unit that selects, in chronological order, the files arranged in chronological order from the set point-of-time; and
an image processing unit that generates a video in which the frames according to the files are arranged in chronological order for each of the files selected in chronological order by the file selection control unit, based on the files, the set position and orientation of the viewpoint, and the set point-of-time, and
the third predetermined condition is a condition that the third duration-of-time is a duration-of-time between: a point-of-time associated with the frame located at a boundary between the file corresponding to the frame associated with the third point-of-time and the next file arranged in chronological order: and the third point-of-time.

11. The playback device according to claim 1,
wherein the 6DoF content is divided into files representing each of the three-dimensional virtual space and the object according to each of a plurality of time zones in a case where a time on the associated playback time axis is divided into the plurality of time zones, and
the processing unit includes:
a file selection control unit that selects, in chronological order, the files arranged in chronological order from the set point-of-time; and
an image processing unit that generates a video in which the frames according to the files are arranged in chronological order for each of the files selected in chronological order by the file selection control unit, based on the files, the set position and orientation of the viewpoint, and the set point-of-time.

12. The playback device according to claim 11,
wherein the image processing unit acquires the file selected by the file selection control unit by a method according to a playback quality indicated by playback quality information that has been set.

13. The playback device according to claim 12, wherein the image processing unit
includes a buffer that stores the acquired file and holds the file before the frame is generated by the image processing unit as well as one or more files after the frame has been generated by the image processing unit, and
in a case where the playback quality information indicating that a response speed is prioritized over a playback quality of the video has been set, and after the first point-of-time is newly set by the control unit, the image processing unit generates a video in which the frames from the first point-of-time are arranged in chronological order based on the files stored in the buffer.

14. The playback device according to claim 13,
wherein the control unit deletes the file satisfying a predetermined deletion condition from the buffer among one or more of the files held in the buffer.

15. The playback device according to claim 12,
wherein a distribution server stores plurality of files for each of two or more pieces of the 6DoF content having mutually different bitrates, and
in a case where the playback quality information indicating that the quality of the video is prioritized over a response speed has been set and after the first point-of-time is newly set by the control unit, the image processing unit acquires, from the distribution server in chronological order, the files of a bitrate according to the set position and orientation of the viewpoint and the position and orientation of one or more of the objects in the three-dimensional virtual space among the files selected by the file selection control unit, and then generates, for each of the acquired files, a video in which the frames according to the files are arranged in chronological order, based on the file, the set position and orientation of the viewpoint, and the set point-of-time.

16. The playback device according to claim 1,
wherein the playback speed is a high playback speed obtained by multiplying a normal playback speed by a factor received from a user, and
the control unit
extracts the frames generated by the processing unit at intervals corresponding to the set playback speed, and displays the extracted frames on the display unit in chronological order, and
in a case where the first point-of-time is newly set, the control unit preferentially extracts the frames having a small number of times of extraction among the frames generated by the processing unit, and performs control to display the extracted frames on the display unit in chronological order.

17. The playback device according to claim 1,
wherein the control unit
performs control to store, in a storage unit, history information indicating a latest history of the position and orientation of the viewpoint among the position and orientation of the viewpoint set in the processing unit at each point-of-time on the associated playback time axis, and
sets, at second or subsequent playback of the 6DoF content, the position and orientation of the viewpoint in the processing unit at each point-of-time on the associated playback time axis based on the history information stored in the storage unit.

18. The playback device according to claim 1,
wherein the playback speed is a high playback speed obtained by multiplying a normal playback speed by a factor received from a user,
the 6DoF content is also information indicating a sound that changes in synchronization with a change in point-of-time on the associated playback time axis,
the sound is a sound at each position in the three-dimensional virtual space,
the processing unit generates audio data in which audio waveforms from the set point-of-time are arranged in chronological order based on at least a part of the 6DoF content, the set position and orientation of the viewpoint, and the set point-of-time, and
the control unit performs control to output the audio data generated by the processing unit from an audio output unit at the normal playback speed.

19. The playback device according to claim 1, wherein the identification information is information identifying that at least one of the position of the viewpoint and the orientation of the viewpoint has changed.

20. The playback device according to claim 1, wherein the identification information is information indicating at least one of each of one or more predetermined points-of-time on the associated playback time axis and each of one or more predetermined periods on the associated playback time axis, and is information associated with the 6DoF content.

* * * * *